(12) United States Patent
Baird, III

(10) Patent No.: US 11,657,036 B2
(45) Date of Patent: May 23, 2023

(54) METHODS AND APPARATUS FOR A DISTRIBUTED DATABASE THAT ENABLES DELETION OF EVENTS

(71) Applicant: Hedera Hashgraph, LLC, Richardson, TX (US)

(72) Inventor: Leemon C. Baird, III, Richardson, TX (US)

(73) Assignee: Hedera Hashgraph, LLC, Las Vegas, NV (US)

( * ) Notice: Subject to any disclaimer, the term of this patent is extended or adjusted under 35 U.S.C. 154(b) by 0 days.

(21) Appl. No.: 17/571,707

(22) Filed: Jan. 10, 2022

(65) Prior Publication Data

US 2022/0129438 A1   Apr. 28, 2022

Related U.S. Application Data

(62) Division of application No. 15/846,402, filed on Dec. 19, 2017, now Pat. No. 11,222,006.

(Continued)

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC .... G06F 16/2365; G06F 16/27; G06F 16/273; G06F 16/182; H04L 67/1097
See application file for complete search history.

(56) References Cited

U.S. PATENT DOCUMENTS 4,309,569 A    1/1982  Merkle
5,701,480 A   12/1997  Raz
(Continued)

FOREIGN PATENT DOCUMENTS

CA    2845306 A1    2/2013
CN  101627395 A    1/2010
(Continued)

OTHER PUBLICATIONS

Office Action for Chinese Application No. 201780078523 dated Sep. 9, 2022, 22 pages.

(Continued)

*Primary Examiner* — Dangelino N Gortayo
(74) *Attorney, Agent, or Firm* — Cooley LLP

(57) ABSTRACT

In some embodiments, an apparatus includes a memory associated with an instance of a distributed database at a compute device configured to be included within a first group of compute devices. The apparatus is configured to determine an order for each event from the set of events based on different configurations of an event consensus protocol. The different configurations are logically related to different configurations of compute devices that implement the distributed database. The apparatus is configured to determine a current state of the instance of the distributed database based on the order determined for each event from the set of events and generate a signed state associated with the instance of the distributed database based on a hash value associated with the current state. The apparatus sends a signal to post into the instance of the distributed database an event that includes a transaction indicative of the signed state.

20 Claims, 19 Drawing Sheets

Related U.S. Application Data

(60) Provisional application No. 62/436,066, filed on Dec. 19, 2016.

(56) References Cited

U.S. PATENT DOCUMENTS

| | | | |
|---|---|---|---|
| 5,991,414 | A | 11/1999 | Garay et al. |
| 6,446,092 | B1 | 9/2002 | Sutter |
| 6,457,007 | B1 | 9/2002 | Kikuchi et al. |
| 6,584,476 | B1 | 6/2003 | Chatterjee et al. |
| 6,694,328 | B1 | 2/2004 | Bennett |
| 6,966,836 | B1 | 11/2005 | Rush et al. |
| 7,062,490 | B2 | 6/2006 | Adya et al. |
| 7,240,060 | B2 | 7/2007 | Adya et al. |
| 7,555,516 | B2 | 6/2009 | Lamport |
| 7,558,883 | B1 | 7/2009 | Lamport |
| 7,590,632 | B1 | 9/2009 | Caronni et al. |
| 7,797,457 | B2 | 9/2010 | Lamport |
| 7,844,745 | B1 | 11/2010 | Darbyshire et al. |
| 7,849,223 | B2 | 12/2010 | Malkhi et al. |
| 7,890,508 | B2 | 2/2011 | Gerber et al. |
| 8,037,279 | B2 | 10/2011 | Schuba et al. |
| 8,112,452 | B2 | 2/2012 | Adya et al. |
| 8,285,689 | B2 | 10/2012 | Du et al. |
| 8,423,678 | B2 | 4/2013 | Darbyshire et al. |
| 8,478,114 | B1 | 7/2013 | Beach et al. |
| 8,533,169 | B1 | 9/2013 | Bailey et al. |
| 8,533,582 | B2 | 9/2013 | Rao et al. |
| 8,571,519 | B2 | 10/2013 | Ginzboorg |
| 8,600,944 | B2 | 12/2013 | Bryant et al. |
| 8,612,386 | B2 | 12/2013 | Tien et al. |
| 8,654,650 | B1 | 2/2014 | Vermeulen et al. |
| 8,713,038 | B2 | 4/2014 | Cohen et al. |
| 8,732,140 | B2 | 5/2014 | Bird et al. |
| 8,766,980 | B2 | 7/2014 | Miyashita et al. |
| 8,775,464 | B2 | 7/2014 | Bulkowski et al. |
| 8,799,248 | B2 | 8/2014 | Bulkowski et al. |
| 8,862,617 | B2 | 10/2014 | Kesselman |
| 8,868,467 | B2 | 10/2014 | Serebrennikov |
| 8,880,486 | B2 | 11/2014 | Driesen et al. |
| 8,886,601 | B1 | 11/2014 | Landau et al. |
| 8,914,333 | B2 | 12/2014 | Bird et al. |
| 9,189,342 | B1 | 11/2015 | Von Thenen et al. |
| 9,244,717 | B2 | 1/2016 | Pissay et al. |
| 9,251,235 | B1 | 2/2016 | Hurst et al. |
| 9,280,591 | B1 | 3/2016 | Kharatishvili et al. |
| 9,390,154 | B1 | 7/2016 | Baird, III |
| 9,407,516 | B2 | 8/2016 | Gordon |
| 9,529,923 | B1 | 12/2016 | Baird, III |
| 9,568,943 | B1 | 2/2017 | Carman |
| 9,646,029 | B1 | 5/2017 | Baird, III |
| 9,842,031 | B1 | 12/2017 | Kharatishvili |
| 10,097,356 | B2 | 10/2018 | Zinder |
| 10,318,505 | B2 | 6/2019 | Baird, III |
| 10,353,888 | B1 * | 7/2019 | Cogan ................ G06F 16/2365 |
| 10,354,325 | B1 | 7/2019 | Skala et al. |
| 10,375,037 | B2 | 8/2019 | Baird, III et al. |
| 10,489,385 | B2 | 11/2019 | Baird, III et al. |
| 10,572,455 | B2 | 2/2020 | Baird, III |
| 10,747,753 | B2 | 8/2020 | Baird, III |
| 10,887,096 | B2 | 1/2021 | Baird, III |
| 11,222,006 | B2 | 1/2022 | Baird, III |
| 11,232,081 | B2 | 1/2022 | Baird, III |
| 11,256,832 | B2 | 2/2022 | Rorato et al. |
| 11,475,150 | B2 | 10/2022 | Baird, III |
| 11,537,593 | B2 | 12/2022 | Baird, III et al. |
| 2001/0025351 | A1 | 9/2001 | Kursawe et al. |
| 2002/0129087 | A1 | 9/2002 | Cachin et al. |
| 2002/0143800 | A1 | 10/2002 | Lindberg et al. |
| 2002/0186848 | A1 | 12/2002 | Shaik |
| 2003/0147536 | A1 | 8/2003 | Andivahis et al. |
| 2004/0012630 | A1 | 1/2004 | Carels et al. |
| 2004/0172421 | A1 | 9/2004 | Saito et al. |
| 2005/0038831 | A1 | 2/2005 | Souder et al. |
| 2005/0102268 | A1 | 5/2005 | Adya et al. |
| 2005/0114666 | A1 | 5/2005 | Sudia |
| 2006/0047720 | A1 | 3/2006 | Kulkarni et al. |
| 2006/0136369 | A1 | 6/2006 | Douceur et al. |
| 2006/0168011 | A1 | 7/2006 | Lamport |
| 2007/0050415 | A1 | 3/2007 | Armangau et al. |
| 2007/0165865 | A1 | 7/2007 | Talvitie |
| 2008/0220873 | A1 | 9/2008 | Lee et al. |
| 2008/0256078 | A1 | 10/2008 | Bhashyam |
| 2008/0298579 | A1 | 12/2008 | Abu-Amara |
| 2009/0150566 | A1 | 6/2009 | Malkhi et al. |
| 2009/0158413 | A1 | 6/2009 | Gentry et al. |
| 2009/0248624 | A1 | 10/2009 | Lammel et al. |
| 2010/0172504 | A1 | 7/2010 | Allen et al. |
| 2010/0198914 | A1 | 8/2010 | Gehrke et al. |
| 2010/0257198 | A1 | 10/2010 | Cohen et al. |
| 2011/0029689 | A1 | 2/2011 | Darbyshire et al. |
| 2011/0173455 | A1 | 7/2011 | Spalka et al. |
| 2011/0191251 | A1 | 8/2011 | Al-Herz et al. |
| 2011/0196834 | A1 | 8/2011 | Kesselman |
| 2011/0196873 | A1 | 8/2011 | Kesselman |
| 2011/0250974 | A1 | 10/2011 | Shuster |
| 2012/0078847 | A1 | 3/2012 | Bryant et al. |
| 2012/0131093 | A1 | 5/2012 | Hamano et al. |
| 2012/0150802 | A1 | 6/2012 | Popov et al. |
| 2012/0150844 | A1 | 6/2012 | Lindahl et al. |
| 2012/0198450 | A1 | 8/2012 | Yang et al. |
| 2012/0209822 | A1 | 8/2012 | Prabhakar et al. |
| 2012/0233134 | A1 | 9/2012 | Barton et al. |
| 2012/0254163 | A1 | 10/2012 | Bandyopadhyay et al. |
| 2012/0278293 | A1 | 11/2012 | Bulkowski et al. |
| 2012/0303631 | A1 | 11/2012 | Bird et al. |
| 2013/0110767 | A1 | 5/2013 | Tatemura et al. |
| 2013/0145426 | A1 | 6/2013 | Wright et al. |
| 2013/0246377 | A1 | 9/2013 | Gaitonde |
| 2013/0263119 | A1 | 10/2013 | Xiao et al. |
| 2013/0290249 | A1 | 10/2013 | Merriman et al. |
| 2013/0311422 | A1 | 11/2013 | Walker et al. |
| 2014/0012812 | A1 | 1/2014 | Zunger |
| 2014/0025443 | A1 | 1/2014 | Onischuk |
| 2014/0108415 | A1 | 4/2014 | Bulkowski et al. |
| 2014/0222829 | A1 | 8/2014 | Bird et al. |
| 2014/0310243 | A1 | 10/2014 | McGee et al. |
| 2014/0324905 | A1 | 10/2014 | Matsumoto |
| 2014/0337393 | A1 | 11/2014 | Burchall et al. |
| 2015/0067002 | A1 | 3/2015 | Shvachko et al. |
| 2015/0067819 | A1 | 3/2015 | Shribman et al. |
| 2015/0074050 | A1 | 3/2015 | Landau et al. |
| 2015/0172412 | A1 | 6/2015 | Escriva et al. |
| 2015/0186497 | A1 * | 7/2015 | Patton ................ H04W 4/21 707/740 |
| 2015/0200774 | A1 | 7/2015 | Le Saint |
| 2015/0242478 | A1 | 8/2015 | Cantwell et al. |
| 2015/0277969 | A1 | 10/2015 | Strauss et al. |
| 2015/0281344 | A1 | 10/2015 | Grootwassink et al. |
| 2015/0294308 | A1 | 10/2015 | Pauker et al. |
| 2016/0085772 | A1 | 3/2016 | Vermeulen et al. |
| 2016/0088424 | A1 | 3/2016 | Polo et al. |
| 2016/0091988 | A1 | 3/2016 | Skowronski et al. |
| 2016/0140548 | A1 | 5/2016 | Ahn |
| 2016/0205218 | A1 | 7/2016 | Tan et al. |
| 2016/0218875 | A1 | 7/2016 | Le Saint et al. |
| 2016/0241392 | A1 | 8/2016 | Vandervort |
| 2016/0283920 | A1 | 9/2016 | Fisher et al. |
| 2016/0292213 | A1 | 10/2016 | Stanfill |
| 2016/0328429 | A1 | 11/2016 | Lipcon |
| 2016/0342976 | A1 | 11/2016 | Davis |
| 2017/0006097 | A1 | 1/2017 | Johnson |
| 2017/0048261 | A1 | 2/2017 | Gmach et al. |
| 2017/0075938 | A1 | 3/2017 | Black et al. |
| 2017/0116095 | A1 | 4/2017 | Schatz et al. |
| 2017/0132257 | A1 | 5/2017 | Baird, III |
| 2017/0180367 | A1 | 6/2017 | Warren |
| 2017/0300550 | A1 | 10/2017 | Emberson et al. |
| 2017/0308548 | A1 | 10/2017 | Baird, III |
| 2018/0005186 | A1 | 1/2018 | Hunn |
| 2018/0006820 | A1 | 1/2018 | Arasu et al. |
| 2018/0018370 | A1 | 1/2018 | Feiks et al. |
| 2018/0026782 | A1 | 1/2018 | Xiao et al. |
| 2018/0101777 | A1 | 4/2018 | Benja-Athon |
| 2018/0173747 | A1 | 6/2018 | Baird, III |

(56) References Cited

U.S. PATENT DOCUMENTS

| | | |
|---|---|---|
| 2019/0020629 A1 | 1/2019 | Baird, III et al. |
| 2019/0034517 A1 | 1/2019 | Byrd |
| 2019/0042619 A1 | 2/2019 | Baird, III |
| 2019/0129893 A1 | 5/2019 | Baird, III et al. |
| 2019/0235946 A1 | 8/2019 | Guo et al. |
| 2019/0268147 A1 | 8/2019 | Baird, III |
| 2019/0286623 A1 | 9/2019 | Baird, III |
| 2020/0012676 A1 | 1/2020 | Singh Narang et al. |
| 2020/0073758 A1 | 3/2020 | Natarajan et al. |
| 2020/0097459 A1 | 3/2020 | Baird, III et al. |
| 2020/0125538 A1 | 4/2020 | Baird, III |
| 2020/0145387 A1 | 5/2020 | Baird, III et al. |
| 2020/0320064 A1 | 10/2020 | Baird, III |
| 2020/0372015 A1 | 11/2020 | Baird, III |
| 2021/0126780 A1 | 4/2021 | Baird, III |
| 2021/0209885 A1 | 7/2021 | Lundin et al. |
| 2022/0107960 A1 | 4/2022 | Baird, III |
| 2022/0237312 A1 | 7/2022 | Baird, III et al. |
| 2022/0391358 A1 | 12/2022 | Baird, III et al. |

FOREIGN PATENT DOCUMENTS

| | | |
|---|---|---|
| CN | 102419764 A | 4/2012 |
| CN | 102474682 A | 5/2012 |
| CN | 102567453 A | 7/2012 |
| CN | 102819585 A | 12/2012 |
| CN | 103842995 A | 6/2014 |
| CN | 103858123 A | 6/2014 |
| CN | 105681301 A | 6/2016 |
| CN | 106022917 A | 10/2016 |
| CN | 106789095 A | 5/2017 |
| JP | H09509268 A | 9/1997 |
| JP | 2003202964 A | 7/2003 |
| JP | 2005216167 A | 8/2005 |
| JP | 2010033227 A | 2/2010 |
| JP | 2010146103 A | 7/2010 |
| JP | 2010225148 A | 10/2010 |
| JP | 2012027685 A | 2/2012 |
| JP | 5211342 B2 | 6/2013 |
| JP | 2014506345 A | 3/2014 |
| JP | 2015526832 A | 9/2015 |
| JP | 2016096547 A | 5/2016 |
| JP | 2016519379 A | 6/2016 |
| JP | 2017510002 A | 4/2017 |
| KR | 20100014941 A | 2/2010 |
| KR | 20160140800 A | 12/2016 |
| RU | 2376635 C2 | 12/2009 |
| RU | 2417426 C2 | 4/2011 |
| RU | 2449358 C1 | 4/2012 |
| RU | 2510623 C2 | 4/2014 |
| RU | 2560810 C2 | 8/2015 |
| RU | 2595493 C2 | 8/2016 |
| WO | WO-9514279 A1 | 5/1995 |
| WO | WO-2014037901 A1 | 3/2014 |
| WO | WO-2015008377 A1 | 1/2015 |
| WO | WO-2015094329 A1 | 6/2015 |
| WO | WO-2015111152 A1 | 7/2016 |
| WO | WO-2016143095 A1 | 9/2016 |
| WO | WO-2017176523 A1 | 10/2017 |
| WO | WO-2017040313 A1 | 7/2020 |

OTHER PUBLICATIONS

Office Action issued by the Japanese Patent Office for Application No. 2019-525948, dated Apr. 18, 2022, 11 pages including English translation.

Alfred V. Aho, John E. Hopcroft, and Jeffrey Ullman. 1983. Data Structures and Algorithms (1st ed.). Addison-Wesley Longman Publishing Co., Inc., Boston, MA, USA, 620 pages.

Anonymous: "SAMMANTICS," Oct. 30, 2016 (Oct. 30, 2016), pp. 1-169, Retrieved from the Internet: URL:https://web.archive.org/web/20161030182822/https://web.archive.org/web/2016103018 [retrieved on Apr. 11, 2022].

[Author Unknown] "Merkle Tree". Wikipedia (May 17, 2020), https://en.wikipedia.org/w/index.php?title=Merkle_tree&oldid=957154565; 5 pages.

Baird et al., "Hedera: A Governing Council & Public Hashgraph Network," Whitepaper, v.1.4, dated Oct. 17, 2018, 76 pages.

Baird et al., "Hedera: A Public Hashgraph Network and Governing Council," WhitePaper V 2.0, Aug. 29, 2019, available from http://tokeninsight.com/api/upload/content/whitepaper/HBAR_en.pdf (Year: 2019), 97 pages.

Baird, "Hashgraph Consensus: Detailed Examples," Swirlds Tech Report Swirlds-TR-2016-02, dated Dec. 11, 2016, 29 pages.

Baird, "Hashgraph Consensus: Fair, Fast Byzantine Fault Tolerance," Swirlds Tech Report TR-2016-01, dated May 31, 2016, 24 pages.

Bitcoin—"you-need-to-know" archived Sep. 5, 2015 and retrieved from https://web.archive.org/web/20150905115130/https://bitcoin.org/en/you-need-to-know on Jul. 13, 2020, 2 pages.

Boneh, "Functional Encryption: A New Vision for Public-Key Cryptography,"Communication of the ACM 55:56-64 (2012).

Bonneau et al., SoK: Research Perspectives and Challenges for Bitcoin and Cryptocurrencies, International Association for Cryptologic Research vol. 20150323:173252, 18 pages (2015), DOI: 10.1109/SP.2015.14 [retrieved on Mar. 23, 2015].

Defago, Xavier, et al., "Total Order broadcast and multicast algorithms: Taxonomy and survey." ACM Computing Surveys (CSUR) 36.4 (2004): 372-421.

Final Office Action issued by The United States Patent and Trademark Office for U.S. Appl. No. 15/846,402, dated Mar. 1, 2021, 23 pages.

GauthierDickey, Chris, et al. "Low latency and cheat-proof event ordering for peer-to-peer games." Proceedings of the 14th international workshop on Network and operating systems support for digital audio and video. ACM, 2004.

GauthierDickey, Chris, Virginia Lo, and Daniel Zappala. "Using n-trees for scalable event ordering in peer-to-peer games." Proceedings of the international workshop on Network and operating systems support for digital audio and video. ACM, 2005.

https://web.archive.org/web/20150811233709/https://en.wikipedia.org/wiki/Paxos_(computer_science). Jun. 17, 2015, 15 pages.

International Preliminary Report on Patentability dated Jun. 25, 2019 for International Application No. PCT/US1767329, 7 pages.

Knutsson et al., "Peer-to-Peer Support for Massively Multiplayer Games", Department of Computer and Information Science, University of Pennsylvania, IEEE Infocom 2004.

Kshemkalyani., et al., "Consensus and agreement algorithms," Distributed computing: principles, algorithms, and systems. Cambridge University Press, pp. 510-531 (2011).

Kwon, J., "Tendermint: Consensus without Mining," Mar. 19, 2015, Retrieved from the Internet: URL:https://web.archive.org/web/2015031903 5333if/http://tendermint.com:80/docs/tendermint.pdf [retrieved on Jul. 19, 2018], 11 pages.

Lamport, Leslie, Robert Shostak, and Marshall Pease. "The Byzantine generals problem." ACM Transactions on Programming Languages and Systems (TOPLAS) 4(3): 382-401 (1982).

Lerner, "DagCoin Draft," dated Sep. 11, 2015, 6 pages, Retrieved from the Internet: URL:https://bitslog.files.wordpress.com/2015/09/dagcoin-v41.pdf [retrieved on May 6, 2020].

Lumezanu, Cristian, Neil Spring, and Bobby Bhattacharjee. "Decentralized message ordering for publish/subscribe systems." Proceedings of the ACM/IFIP/USENIX 2006 International Conference on Middleware. Springer-Verlag New York, Inc., 2006.

Moser, Louise E., and Peter M. Melliar-Smith, "Byzantine-resistant total ordering algorithms." Information and Computation 150.1 (1999): 75-111.

Moser, Louise E., and Peter M. Melliar-Smith, "Total Ordering Algorithms for Asynchronous Byzantine Systems," International Workshop on Distributed Algorithms, 1995.

Nakamoto, S., "Bitcoin: A peer-to-peer electronic cash system," Retrieved from the Internet:< url:<a href="http://www.bitcoin.org">http://www.bitcoin.org, Jan. 2009, 9 pages</url:.<a>.

Non-Final Office Action issued by The United States Patent and Trademark Office for U.S. Appl. No. 15/846,402, dated Aug. 24, 2020, 17 pages.

(56) References Cited

OTHER PUBLICATIONS

Office Action issued by the Australian Patent Office for Application No. 2017382161, dated Nov. 22, 2021, 3 pages.
Office Action issued by the Indian Patent Office for Application No. 201917024263, dated Jul. 14, 2021, 8 pages.
Office Action issued by the Japanese Patent Office for Application No. 2019-525948, dated Aug. 2, 2021, 21 pages including English translation.
Office Action issued by the Korean Patent Office for Application No. 10-2019-7021248, dated Nov. 18, 2020, 10 pages (including English translation).
Office Action issued by the Korean Patent Office for Application No. 10-2019-7021248, dated Jun. 30, 2021, 7 pages including English translation.
Office Action issued by the Korean Patent Office for Application No. 10-2021-7031216, dated Jan. 26, 2022, 5 pages including English translation.
Office Action issued by the Russian Patent Office for Application No. 2019118333, dated Feb. 18, 2021, 7 pages with English translation.
Office Action issued by the Russian Patent Office for Application No. 2019118333, dated Oct. 2, 2020, 18 pages including English translation.
Reed, "Bitcoin Cooperative Proof—of—Stake," May 21, 2014 (May 21, 2014, Retrieved from the Internet: URL:https://arxiv.org/ftp/arxiv/papers/1405/1405.5741.pdf [retrieved on May 2, 2018], 16 pages.
Shirriff, Ken: "Bitcoins the hard way: Using the raw Bitcoin protocol", Oct. 14, 2016 (Oct. 14, 2016), pp. 1-31, Retrieved from the Internet: URL:https://web.archive.org/web/20161014002912/ https://web.archive.org/web/2016101400 s-hard-way-using-raw-bitcoin.html [retrieved on Apr. 12, 2022].
Sompolinsky, Yonatan and Zohar, Aviv, "Secure High-Rate Transaction Processing in Bitcoin," International Conference on Financial Cryptography and Data Security (FC 2015), Springer,2015, 31 pages cited as 7(16):507-527,DOI: 10.1007/978-3-662-47854-7_32.
Tang et al., "Improved Hybrid Consensus Scheme with Privacy-Preserving Property," IACR, International Association for Cryptologic Research 2010407:004100, pp. 1-8 (2017).
Tseng, et al., Byzantine Consensus in Directed Graphs. ArXiv, abs/1208.5075. A 1, dated Feb. 19, 2014, 33 pages.
Vaidya et al., "Iterative approximate Byzantine consensus in arbitrary directed graphs," In Proceedings of the 2012 ACM symposium on Principles of distributed computing, pp. 365-374 (2012).
Wikipedia, Copy-on-write, Jul. 31, 2015, accessed Oct. 20, 2017 at https://en.wikipedia.org/w/index.php?title=Copy-on- write&oldid= 673938951, 3 pages.

\* cited by examiner

An event is a tuple $e = \{d, h, t, c, s\}$ where:

$$
\begin{aligned}
d &= data(e) &&= \text{the "payload" data, which may include transactions.} \\
h &= hashes(e) &&= \text{a list of hashes of the event's parents, self-parent first.} \\
t &= time(e) &&= \text{creator's claimed date and time of the event's creation.} \\
c &= creator(e) &&= \text{creator's ID number.} \\
s &= sig(e) &&= \text{creator's digital signature of } \{d,h,t,c\}. \\
n &= &&\text{the number of members in the population} \\
m &= &&1 + \lfloor 2n/3 \rfloor \\
first &= &&\text{the unique event that has no parents} \\
E &= &&\text{the set of all events} \\
T &= &&\text{set of all possible } (time, date) \text{ pairs} \\
\mathbb{B} &= &&\{true, false\} \\
\mathbb{N} &= &&\{0, 1, 2, \ldots\}
\end{aligned}
$$

$$
\begin{aligned}
\text{ancestor} &: E \times E \to \mathbb{B} \\
\text{selfAncestor} &: E \times E \to \mathbb{B} \\
\text{see} &: E \times E \to \mathbb{B} \\
\text{stronglySee} &: E \times E \to \mathbb{B} \\
\text{parentRound} &: E \to \mathbb{N} \\
\text{witness} &: E \to \mathbb{B} \\
\text{round} &: E \to \mathbb{N} \\
\text{roundDiff} &: E \times E \to \mathbb{I} \\
\text{votes} &: E \times E \times \mathbb{B} \to \mathbb{N} \\
\text{voteFraction} &: E \times E \to \mathbb{R} \\
\text{vote} &: E \times E \to \mathbb{B} \\
\text{decide} &: E \times E \to \mathbb{B} \\
\text{allFamous} &: \mathbb{I} \to 2^E \\
\text{famous} &: E \to \mathbb{B} \\
\text{roundReceived} &: E \to \mathbb{N} \\
\text{timeReceived} &: E \to T
\end{aligned}
$$

FIG. 10A $$\begin{aligned}
\text{ancestor}(x,y) &= (x = y) \vee (\exists z \in \text{parents}(x) : \text{ancestor}(z,y)) \\
\text{selfAncestor}(x,y) &= \text{ancestor}(x,y) \wedge ((\text{selfParent}(x) = y) \vee \text{selfAncestor}(\text{selfParent}(x), y)) \\
\text{see}(x,y) &= \text{ancestor}(x,y) \wedge \neg (\exists a, b, c \in E : \\
&\quad (\text{ancestor}(y,a) \wedge \text{ancestor}(y,b) \wedge c \in \text{parents}(x) \wedge c \in \text{parents}(b))) \wedge \\
&\quad \text{creator}(a) = \text{creator}(b) = \text{creator}(c) \\
\text{stronglySee}(x,y) &= \text{see}(x,y) \wedge (\exists S \in 2^E : (|S| = m) \wedge (z \in S \iff (\text{see}(x,z) \wedge \text{see}(z,y)))) \\
\text{parentRound}(x) &= \begin{cases} 0 & \text{if } x = first \\ \max_{y \in \text{parents}(x)} \text{round}(y) & \text{otherwise} \end{cases} \\
\text{witness}(x) &= \exists S \in 2^E : (|S| = m \wedge \\
&\quad (\forall y \in S : (\text{round}(y) = \text{parentRound}(x) \wedge \text{stronglySee}(x,y)))) \\
\text{round}(x) &= \begin{cases} 1 + \text{parentRound}(x) & \text{if witness}(x) \\ \text{parentRound}(x) & \text{otherwise} \end{cases} \\
\text{roundDiff}(x,y) &= \text{round}(x) - \text{round}(y) \\
\text{votes}(x,y,v) &= |\{z \in E \mid \text{see}(x,y) \wedge \text{roundDiff}(x,z) = 1 \wedge \\
&\quad \text{stronglySee}(x,z) \wedge \text{vote}(z,y) = v\}| \\
\text{voteFraction}(x,y) &= \text{votes}(x,true)/(\text{votes}(x,true) + \text{votes}(x,false)) \\
\text{vote}(x,y) &= \begin{cases} \text{see}(x,y) & \text{if roundDiff}(x,y) = 1 \\ (\text{voteFraction}(x,y) >= 1/2) & \text{if (roundDiff}(x,y) \bmod 5 \neq 1) \vee \\ & \quad |\text{voteFraction}(x,y) - 1/2| > 1/6 \\ (1 = LSB(\text{signature}(x))) & \text{otherwise} \end{cases} \\
\text{decide}(x,y) &= \text{vote}(x,y) \wedge (\text{roundDiff}(x,y) \bmod 5 \neq 1) \wedge (\text{voteFraction}(x,y) > 2/3) \\
\text{allFamous}(r) &= \{x \in E \mid \text{famous}(x) \wedge \text{round}(x) = r\} \\
\text{famous}(x) &= \text{witness}(x) \wedge \exists y \in E : \text{decide}(y,x) \\
\text{roundReceived}(x) &= \min_{r \in \mathbb{N}}(|\{y \in E \mid \text{round}(y) = r \wedge \text{famous}(y) \wedge \text{see}(y,x)\}| / \\
&\quad |\{y \in E \mid \text{round}(y) = r \wedge \text{famous}(y)\}| >= 1/2) \\
\text{timeReceived}(x) &= \text{median}(\{\text{time}(y) \mid y \in E \wedge \text{see}(y,x) \wedge \\
&\quad (\exists z \in E : \text{round}(z) = \text{roundReceived}(x) \wedge \text{selfAncestor}(z,y)) \wedge \\
&\quad \neg (\exists w \in E : \text{selfAncestor}(y,w) \wedge \text{see}(w,x))\})
\end{aligned}$$

FIG. 10B

An event is a tuple $e = \{d, h, t, c, s\}$ where:

$d = data(e)$ = the "payload" data, which may include transactions.
$h = hashes(e)$ = a list of hashes of the event's parents, self-parent first.
$t = time(e)$ = creator's claimed date and time of the event's creation.
$i = creator(e)$ = creator's ID number.
$s = sig(e)$ = creator's digital signature of $\{d,h,t,c\}$.
$n$ = the number of members in the population
$c$ = frequency of coin rounds (e.g., $c = 6$)
$E$ = (the set of all events) $\cup \{\varnothing\}$
$\mathbb{T}$ = set of all possible $(time, date)$ pairs
$\mathbb{B}$ = $\{true, false\}$
$\mathbb{N}$ = $\{0, 1, 2, ...\}$ $$\begin{aligned}
\text{parents} &: E \to 2^E \\
\text{selfParent} &: E \to E \\
\text{ancestor} &: E \times E \to \mathbb{B} \\
\text{selfAncestor} &: E \times E \to \mathbb{B} \\
\text{see} &: E \times E \to \mathbb{B} \\
\text{stronglySee} &: E \times E \to \mathbb{B} \\
\text{parentRound} &: E \to \mathbb{N} \\
\text{roundInc} &: E \to \mathbb{B} \\
\text{round} &: E \to \mathbb{N} \\
\text{witness} &: E \to \mathbb{B} \\
\text{roundDiff} &: E \times E \to \mathbb{I} \\
\text{votes} &: E \times E \times \mathbb{B} \to \mathbb{N} \\
\text{fractTrue} &: E \times E \to \mathbb{R} \\
\text{decide} &: E \times E \to \mathbb{B} \\
\text{vote} &: E \times E \to \mathbb{B} \\
\text{famous} &: E \to \mathbb{B} \\
\text{roundReceived} &: E \to \mathbb{N} \\
\text{timeReceived} &: E \to \mathbb{T}
\end{aligned}$$

FIG. 11A $$\text{parents}(x) = \text{set of parents of event } x$$

$$\text{selfParent}(x) = \text{the self-parent of event } x, \text{ or } \emptyset \text{ if none}$$

$$\text{ancestor}(x,y) = (x \neq \emptyset) \wedge ((x = y) \vee (\exists z \in \text{parents}(x) : \text{ancestor}(z,y)))$$

$$\text{selfAncestor}(x,y) = (x \neq \emptyset) \wedge ((x = y) \vee \text{selfAncestor}(\text{selfParent}(x),y))$$

$$\text{see}(x,y) = \text{ancestor}(x,y) \wedge \neg(\exists a,b \in E : \text{creator}(y) = \text{creator}(a) = \text{creator}(b) \wedge$$
$$\text{ancestor}(x,a) \wedge \text{ancestor}(x,b) \wedge \neg\text{selfAncestor}(a,b) \wedge \neg\text{selfAncestor}(b,a))$$

$$\text{stronglySee}(x,y) = \text{see}(x,y) \wedge (\exists S \in 2^E : (|S| > 2n/3) \wedge (z \in S \iff (\text{see}(x,z) \wedge \text{see}(z,y))))$$

$$\text{parentRound}(x) = \max(\{0\} \cup \{\text{round}(y) | y \in \text{parents}(x)\})$$

$$\text{roundInc}(x) = \exists S \in 2^E : (|S| > 2n/3 \wedge$$
$$(\forall y \in S : (\text{round}(y) = \text{parentRound}(x) \wedge \text{stronglySee}(x,y))))$$

$$\text{round}(x) = \text{parentRound}(x) + \begin{cases} 1 & \text{if roundInc}(x) \\ 0 & \text{otherwise} \end{cases}$$

$$\text{witness}(x) = (\text{selfParent}(x) = \emptyset) \vee (\text{round}(x) > \text{round}(\text{selfParent}(x)))$$

$$\text{roundDiff}(x,y) = \text{round}(x) - \text{round}(y)$$

$$\text{votes}(x,y,v) = |\{z \in E | \text{roundDiff}(x,z) = 1 \wedge \text{stronglySee}(x,z) \wedge \text{vote}(z,y) = v\}|$$

$$\text{fractTrue}(x,y) = \frac{\text{votes}(x,y,true)}{\text{votes}(x,y,true) + \text{votes}(x,y,false)}$$

$$\text{decide}(x,y) = (x \neq \emptyset) \wedge (\text{roundDiff}(x,y) > 1) \wedge (\text{decide}(\text{selfParent}(x),y) \vee$$
$$(\text{witness}(x) \wedge (\text{roundDiff}(x,y) \mod c \neq 1) \wedge \neg(\tfrac{1}{3} \leq \text{fractTrue}(x,y) \leq \tfrac{2}{3})))$$

$$\text{vote}(x,y) = \begin{cases} \text{vote}(\text{selfParent}(x),y) & \text{if } (\neg\text{witness}(x)) \vee \text{decide}(\text{selfParent}(x),y) \\ 1 = \text{middleBit}(\text{signature}(x)) & \text{if witness}(x) \\ & \wedge \neg\text{decide}(\text{selfParent}(x),y) \\ & \wedge (\text{roundDiff}(x,y) \neq 1) \\ & \wedge (\text{roundDiff}(x,y) \mod c = 1) \\ \text{fractTrue}(x,y) \geq \tfrac{1}{2} & \text{otherwise} \end{cases}$$

$$\text{famous}(x) = \text{witness}(x) \wedge \exists y \in E : \text{decide}(y,x) \wedge \text{vote}(y,x)$$

$$\text{roundReceived}(x) = \min_{r \in S} \frac{|\{y \in E | \text{round}(y) = r \wedge \text{famous}(y) \wedge \text{see}(y,x)\}|}{|\{y \in E | \text{round}(y) = r \wedge \text{famous}(y)\}|} \geq 1/2$$

$$\text{timeReceived}(x) = \text{median}(\{\text{time}(y) | y \in E \wedge \text{see}(y,x) \wedge$$
$$(\exists z \in E : \text{round}(z) = \text{roundReceived}(x) \wedge \text{selfAncestor}(z,y)) \wedge$$
$$\neg(\exists w \in E : \text{selfAncestor}(y,w) \wedge \text{see}(w,x))\})$$

FIG. 11B

An event is a tuple $e = \{d, h, t, i, s\}$ where:

$d = data(e)$ = the "payload" data, which may include transactions.
$h = hashes(e)$ = a list of hashes of the event's parents, self-parent first.
$t = time(e)$ = creator's claimed date and time of the event's creation.
$i = creator(e)$ = creator's ID number.
$s = sig(e)$ = creator's digital signature of $\{d,h,t,i\}$.
$parents(x)$ = set of events that are parents of event x
$selfParent(x)$ = the self-parent of event x, or $\varnothing$ if none
$n$ = the number of members in the population
$c$ = frequency of coin rounds (such as $c = 10$)
$E$ = the set of all events in the hashgraph
$E_0$ = $E \cup \{\varnothing\}$
$\mathbb{T}$ = set of all possible (time, date) pairs
$\mathbb{B}$ = $\{true, false\}$
$\mathbb{N}$ = $\{1, 2, 3, ...\}$ $parents : E \to 2^E$
$selfParent : E \to E_0$
$ancestor : E \times E \to \mathbb{B}$
$selfAncestor : E \times E \to \mathbb{B}$
$manyCreators : 2^E \to \mathbb{B}$
$see : E \times E \to \mathbb{B}$
$stronglySee : E \times E \to \mathbb{B}$
$parentRound : E \to \mathbb{N}$
$roundInc : E \to \mathbb{B}$
$round : E \to \mathbb{N}$
$witness : E \to \mathbb{B}$
$diff : E \times E \to \mathbb{I}$
$votes : E \times E \times \mathbb{B} \to \mathbb{N}$
$fractTrue : E \times E \to \mathbb{R}$
$decide : E \times E \to \mathbb{B}$
$copyVote : E \times E \to \mathbb{B}$
$vote : E \times E \to \mathbb{B}$
$famous : E \to \mathbb{B}$
$uniqueFamous : E \to \mathbb{B}$
$roundsDecided : \mathbb{N} \to \mathbb{B}$
$roundReceived : E \to \mathbb{N}$
$timeReceived : E \to \mathbb{T}$

FIG. 12A $$\text{ancestor}(x,y) = x = y \vee \exists z \in \text{parents}(x), \text{ancestor}(z,y)$$

$$\text{selfAncestor}(x,y) = x = y \vee (\text{selfParent}(x) \neq \varnothing \wedge \text{selfAncestor}(\text{selfParent}(x),y))$$

$$\text{manyCreators}(S) = |S| > 2n/3 \wedge \forall x,y \in S, (x \neq y \implies \text{creator}(x) \neq \text{creator}(y))$$

$$\text{see}(x,y) = \text{ancestor}(x,y) \wedge \neg(\exists a,b \in E, \text{creator}(y) = \text{creator}(a) = \text{creator}(b) \wedge$$
$$\text{ancestor}(x,a) \wedge \text{ancestor}(x,b) \wedge \neg\text{selfAncestor}(a,b) \wedge \neg\text{selfAncestor}(b,a))$$

$$\text{stronglySee}(x,y) = \text{see}(x,y) \wedge (\exists S \subseteq E, \text{manyCreators}(S)$$
$$\wedge (z \in S \implies (\text{see}(x,z) \wedge \text{see}(z,y))))$$

$$\text{parentRound}(x) = \max(\{1\} \cup \{\text{round}(y) \mid y \in \text{parents}(x)\})$$

$$\text{roundInc}(x) = \exists S \subseteq E, \text{manyCreators}(S)$$
$$\wedge (\forall y \in S, \text{round}(y) = \text{parentRound}(x) \wedge \text{stronglySee}(x,y))$$

$$\text{round}(x) = \text{parentRound}(x) + \begin{cases} 1 & \text{if roundInc}(x) \\ 0 & \text{otherwise} \end{cases}$$

$$\text{witness}(x) = (\text{selfParent}(x) = \varnothing) \vee (\text{round}(x) > \text{round}(\text{selfParent}(x)))$$

$$\text{diff}(x,y) = \text{round}(x) - \text{round}(y)$$

$$\text{votes}(x,y,v) = |\{z \in E \mid \text{diff}(x,z) = 1 \wedge \text{witness}(z) \wedge \text{stronglySee}(x,z) \wedge \text{vote}(z,y) = v\}|$$

$$\text{fractTrue}(x,y) = \frac{\text{votes}(x,y,\text{true})}{(\text{votes}(x,y,\text{true}) + \text{votes}(x,y,\text{false}))}$$

$$\text{decide}(x,y) = (\text{selfParent}(x) \neq \varnothing \wedge \text{decide}(\text{selfParent}(x),y)) \vee (\wedge \text{witness}(x) \wedge \text{witness}(y)$$
$$\wedge \text{diff}(x,y) > 1 \wedge (\text{diff}(x,y) \bmod c > 0) \wedge (\exists v \in B, \text{votes}(x,y,v) > \tfrac{2n}{3}))$$

$$\text{copyVote}(x,y) = (\neg\text{witness}(x)) \vee (\text{selfParent}(x) \neq \varnothing \wedge \text{decide}(\text{selfParent}(x),y))$$

$$\text{vote}(x,y) = \begin{cases} \text{vote}(\text{selfParent}(x),y) & \text{if copyVote}(x) \\ 1 = \text{middleBit}(\text{signature}(x)) & \text{if } \neg\text{copyVote}(x) \\ & \wedge (\text{diff}(x,y) \bmod c = 0) \\ & \wedge (\tfrac{1}{3} \leq \text{fractTrue}(x,y) \leq \tfrac{2}{3}) \\ \text{fractTrue}(x,y) \geq \tfrac{1}{2} & \text{otherwise} \end{cases}$$

$$\text{famous}(x) = \exists y \in E, \text{decide}(y,x) \wedge \text{vote}(y,x)$$

$$\text{uniqueFamous}(x) = \text{famous}(x) \wedge \neg\exists y \in E, y \neq x \wedge \text{famous}(y)$$
$$\wedge \text{round}(x) = \text{round}(y) \wedge \text{creator}(x) = \text{creator}(y)$$

$$\text{roundsDecided}(r) = \forall x \in E, ((\text{round}(x) \leq r \wedge \text{witness}(x)) \implies \exists y \in E, \text{decide}(y,x))$$

$$\text{roundReceived}(x) = \min(\{r \in \mathbb{N} \mid \text{roundsDecided}(r) \wedge (\forall y \in E,$$
$$(\text{round}(y) = r \wedge \text{uniqueFamous}(y)) \implies \text{ancestor}(y,x))$$

$$\text{timeReceived}(x) = \text{median}(\{\text{time}(y) \mid y \in E \wedge \text{ancestor}(y,x) \wedge$$
$$(\exists z \in E, \text{round}(z) = \text{roundReceived}(x) \wedge \text{uniqueFamous}(z)$$
$$\wedge \text{selfAncestor}(z,y)) \wedge \neg(\exists w \in E, \text{selfAncestor}(y,w) \wedge \text{ancestor}(w,x))\})$$

FIG. 12B

METHODS AND APPARATUS FOR A DISTRIBUTED DATABASE THAT ENABLES DELETION OF EVENTS

CROSS-REFERENCE TO RELATED PATENT APPLICATIONS

This patent application is a divisional application of U.S. patent application Ser. No. 15/846,402, now U.S. Pat. No. 11,222,006, filed on Dec. 19, 2017 and titled "METHODS AND APPARATUS FOR A DISTRIBUTED DATABASE THAT ENABLES DELETION OF EVENTS," which claims priority to U.S. Provisional Patent Application Ser. No. 62/436,066, filed on Dec. 19, 2016 and titled "METHODS AND APPARATUS FOR A DISTRIBUTED DATABASE THAT ENABLES DELETION OF EVENTS," each of which is incorporated herein by reference in its entirety.

BACKGROUND

Embodiments described herein relate generally to a database system and more particularly to methods and apparatus for implementing a database system across multiple devices in a network.

Some known distributed database systems attempt to achieve consensus for values within the distributed database systems (e.g., regarding the order in which transactions occur). For example, an online multiplayer game might have many computer servers that users can access to play the game. If two users attempt to pick up a specific item in the game at the same time, then it is important that the servers within the distributed database system eventually reach agreement on which of the two users picked up the item first.

Such distributed consensus can be handled by methods and/or processes such as the Paxos algorithm or its variants. Under such methods and/or processes, one server of the database system is set up as the "leader," and the leader decides the order of events. Events (e.g., within multiplayer games) are forwarded to the leader, the leader chooses an ordering for the events, and the leader broadcasts that ordering to the other servers of the database system.

Such known approaches, however, use a server operated by a party (e.g., central management server) trusted by users of the database system (e.g., game players). Accordingly, a need exists for methods and apparatus for a distributed database system that does not require a leader or a trusted third party to operate the database system.

Other distributed databases are designed to have no leader, but are inefficient. For example, one such distributed database is based on a "block chain" data structure, which can achieve consensus. Such a system, however, can be limited to a small number of transactions per second total, for all of the participants put together (e.g., 7 transactions per second), which is insufficient for a large-scale game or for many traditional applications of databases. Furthermore, an increase in the scale of the database over time can increase the use of computational resources, for example, memory resources can become unmanageable and/or underutilized when they store redundant or unnecessary data. Accordingly, a need exists for a distributed database system that achieves consensus without a leader, and which is efficient at managing computational resources.

SUMMARY

In some embodiments, an apparatus includes a memory associated with an instance of a distributed database at a compute device configured to be included within a first group of compute devices. The apparatus is configured to determine an order for each event from the set of events based on different configurations of an event consensus protocol. The different configurations are logically related to different configurations of compute devices that implement the distributed database. The apparatus is configured to determine a current state of the instance of the distributed database based on the order determined for each event from the set of events and generate a signed state associated with the instance of the distributed database based on a hash value associated with the current state. The apparatus sends a signal to post into the instance of the distributed database an event that includes a transaction indicative of the signed state.

BRIEF DESCRIPTION OF THE DRAWINGS

FIGS. 10A-10B illustrate an example consensus method for use with a hashgraph, according to an embodiment.

FIGS. 11A-11B illustrate an example consensus method for use with a hashgraph, according to an embodiment.

FIGS. 12A-12B illustrate an example consensus method for use with a hashgraph, according to another embodiment.

DETAILED DESCRIPTION

Figure 1:
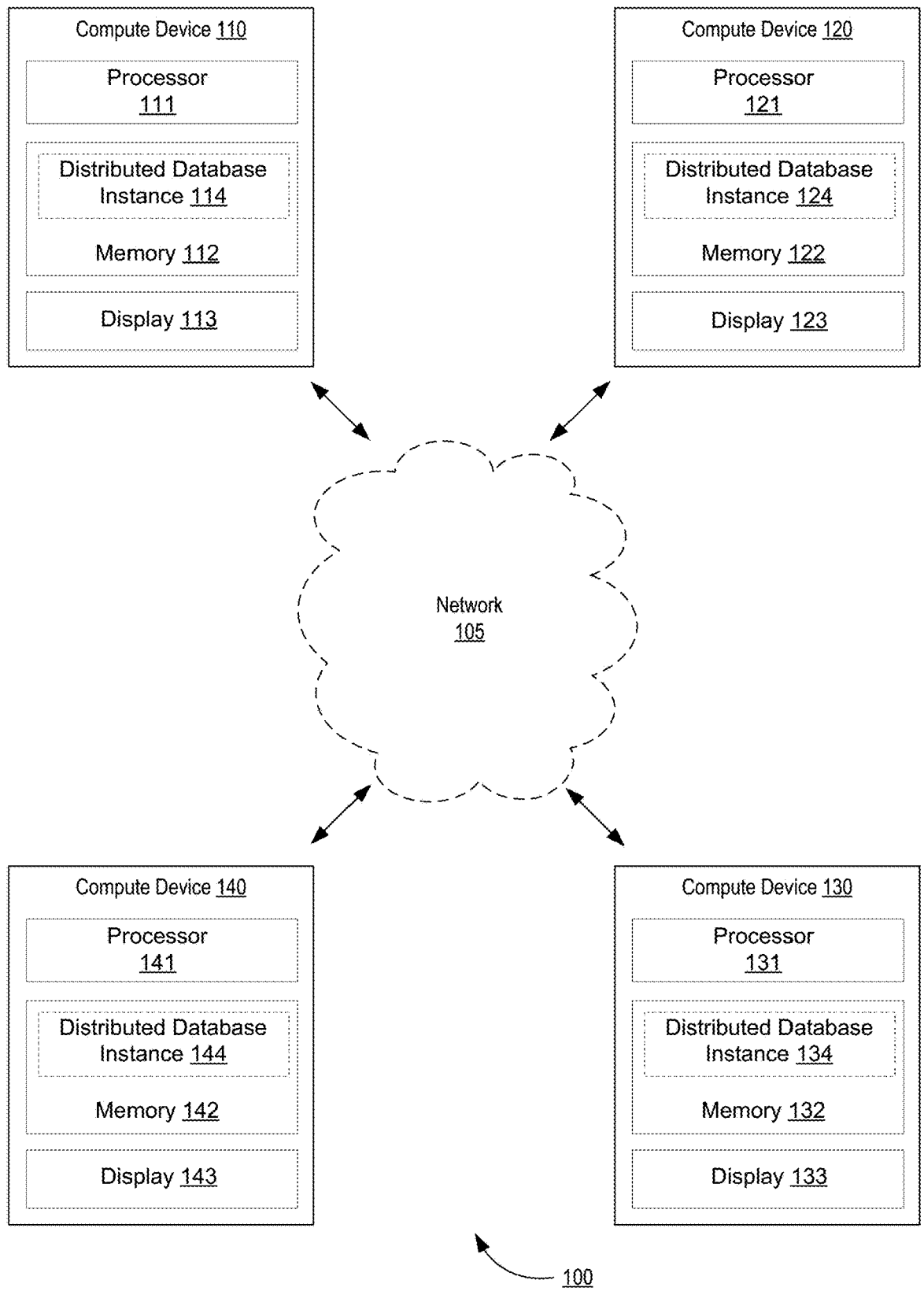
FIG. 1 is a high level block diagram that illustrates a distributed database system, according to an embodiment.

In some embodiments, an apparatus includes an instance of a distributed database at a compute device configured to be included within a set of compute devices that implement the distributed database. The apparatus also includes a processor configured to define an initial state of the distributed database secured by the designation of a unique identifier generated as a function of a set of pairs, each pair including a public key and a randomized value associated with an instance of the distributed database. The distributed database is configured to synchronize events between instances of the distributed database, such that, events not relevant to current and future states of the distributed database are not exchanged between the set of compute devices, based on convergent states signed by the set of compute devices that implement the distributed database. The processor is also configured to remove unnecessary events from the instance of the distributed database by defining a signed state of the distributed database. This decreases overhead caused by synchronizing redundant or irrelevant events between the set of compute devices that implement the distributed database. This also decreases underutilization of local memories of such a set of compute devices.

In some embodiments, an apparatus includes a memory associated with an instance of a distributed database at a compute device configured to be included within a group of compute devices that implement the distributed database via a network operatively coupled to the group of compute devices. The group of compute devices being associated with a first configuration of an event consensus protocol associated with the distributed database. The apparatus includes a processor operatively coupled to the memory. The processor is configured to receive a set of events from a set of compute devices from the group of compute devices. Each event from the set of events is associated with (1) a set of transactions, and (2) a received round number. The processor is configured to determine an order for each event from the set of events based on: (1) the first configuration of the event consensus protocol when the received round number associated with that event is not greater than a received round number threshold identified by the instance of the distributed database, and (2) a second configuration of the event consensus protocol when the received round number associated with that event is greater than the received round number threshold. The processor is configured to determine a current state of the instance of the distributed database based on the order determined for each event from the set of events. The processor is configured to generate a signed state associated with the instance of the distributed database based on a hash value associated with the current state. The hash value is digitally signed with a private key associated with the first compute device. The processor is further configured to send a signal to post into the instance of the distributed database an event that includes a transaction indicative of the signed state.

In some embodiments, an apparatus includes a memory associated with an instance of a distributed database at a first compute device configured to be included within a group of compute devices that implement the distributed database via a network operatively coupled to the group of compute devices. The apparatus includes a processor operatively coupled to the memory. The processor is configured to receive an event from a second compute device from the group of compute devices. The event is a sequence of bytes associated with a set of parent events. Each parent event from the set of parent events is associated with (1) a hash value and (2) a round created value. The processor is configured to exclude the received event from a determination of an order of events when at least one of a first criterion or a second criterion is satisfied. The first criterion is satisfied when: (1) at least one parent event from the set of parent events does not have an identifier in the instance of the distributed database, and (2) the at least one parent event is associated with a round created value that is greater than a first round created threshold. The second criterion is satisfied when: (1) the first criterion is not satisfied, and (2) each parent event from the set of parent events is associated with a round created value that is less than a second round created threshold. The processor is further configured to store the event in the instance of the distributed database when the event was not excluded based on the first criteria or the second criteria.

In some embodiments, an apparatus includes a memory associated with an instance of a distributed database at a first compute device configured to be included within a group of compute devices that implement the distributed database via a network operatively coupled to the group of compute devices. The apparatus includes a processor operatively coupled to the memory. The processor is configured to store in the memory an indication of a first set of events from a group of events defined by a second compute device from the group of compute devices. Each event from the group of events includes a sequence of bytes associated with (1) a sequence value, and (2) an ordered set of transactions. The processor is configured to send a synchronization request to a third compute device from the plurality of compute devices. The synchronization request includes a first identifier and a second identifier. The first identifier identifies an event from the first set of events associated with a sequence value that is less than the sequence value associated with each remaining event from the first set of events. The second identifier identifies an event from the first set of events associated with a sequence value that is greater than the sequence value associated with each remaining event from the first set of events. The processor is configured to receive from the third compute device, in response to the synchronization request, a second set of events from the group of events defined by the second compute device. The processor is configured to store in the memory an indication of a second set of events. Each event from the second set of events is not included in the first set of events. The processor is configured to determine a current state of the instance of the distributed database based on (1) an event consensus protocol, (2) the first set of events, and (3) the second set of events. The processor is configured to generate a signed state of the instance of the distributed database based on a hash value associated with the current state. The hash value is digitally signed with a private key associated with the first compute device. The processor is configured to send a signal to post into the instance of the distributed database an event that includes a transaction indicative of the signed state. The processor is configured to receive, from a set of compute devices from the group of compute devices, an indication of agreement associated with the event that includes the transaction indicative of the signed state. The processor is further configured to remove from the memory and based on the indication of agreement, the indication of the first set of events and the indication of the second set of events.

In some embodiments, an apparatus includes an instance of a distributed database at a first compute device configured to be included within a set of compute devices that implement the distributed database via a network operatively coupled to the set of compute devices. The apparatus also includes a processor operatively coupled to the memory storing the instance of the distributed database. The processor is configured to define, at a first time, a first event linked to a first set of events. The processor is configured to receive, at a second time after the first time and from a second compute device from the set of compute devices, a signal representing a second event (1) defined by the second compute device and (2) linked to a second set of events. The processor is configured to identify an order associated with a third set of events based at least one a result of a protocol. Each event from the third set of events being from at least one of the first set of events or the second set of events. The processor is configured to store in the instance of the distributed database the order associated with the third set of events.

In some instances, each event from the third set of events is associated with a set of attributes (e.g., sequence number, generation number, round number, received number, and/or timestamp, etc.). The result of the protocol can include a value for each attribute from the set of attributes for each event from the third set of events. The value for a first attribute from the set of attributes can include a first numeric value and the value for a second attribute from the set of attributes can include a binary value associated with the first numeric value. The binary value for the second attribute (e.g., a round increment value) for an event from the third set of events can be based on whether a relationship between that event and a fourth set of events linked to that event satisfies a criterion (e.g., a number of events strongly identified by that event). Each event from the fourth set of events is (1) an ancestor of the event from the third set of events and (2) associated with a first common attribute as the remaining events from the fourth set of events (e.g., a common round number, an indication of being a round R first event, etc.). The first common attribute can be indicative of a first instance that an event defined by each compute device from the set of compute devices is associated with a first particular value (e.g., an indication of being a round R first event, etc.).

The value for a third attribute (e.g., a received round number) from the set of attributes can include a second numeric value based on a relationship between the event and a fifth set of events linked to the event. Each event from the fifth set of events is a descendant of the event and associated with a second common attribute (e.g., is famous) as the remaining events from the fifth set of events. The second common attribute can be associated with (1) a third common attribute (e.g., being a round R first event or a witness) indicative of a first instance a second event defined by each compute device from the set of compute devices is associated with a second particular value different from the first particular value and (2) a result based on a set of indications. Each indication from the set of indications can be associated with an event from a sixth set of events. Each event from the sixth set of events can be associated with a fourth common attribute indicative of a first instance a third event defined by each compute device from the set of compute devices is associated with a third particular value different from the first particular value and the second particular value. In some instances, the first particular value is a first integer (e.g., a first round number R), the second particular value is a second integer (e.g., a second round number, R+n) greater than the first integer and the third particular value is a third integer (e.g., a third round number, R+n+m) greater than the second integer.

In some embodiments, an apparatus includes a memory and a processor. The memory includes an instance of a distributed database at a first compute device configured to be included within a set of compute devices that implements the distributed database via a network operatively coupled to the set of compute devices. The processor is operatively coupled to the memory storing the instance of the distributed database and is configured to receive a signal representing an event linked to a set of events. The processor is configured to identify an order associated with the set of events based at least on a result of a protocol. The processor is configured to store in the instance of the distributed database the order associated with the set of events.

In some embodiments, a non-transitory processor-readable medium stores code representing instructions to be executed by a processor to receive a signal representing an event linked to a set of events and identify an order associated with the set of events based on a round associated with each event from the set of events and an indication of when to increment the round associated with each event. The code further includes code to cause the processor to store, in an instance of a distributed database at a first compute device configured to be included within a set of compute devices that implements the distributed database via a network operatively coupled to the set of compute devices, the order associated with the set of events. The instance of the distributed database is operatively coupled to the processor In some embodiments, an instance of a distributed database at a first compute device can be configured to be included within a set of compute devices that implements the distributed database via a network operatively coupled to the set of compute devices. The first compute device stores multiple transactions in the instance of a distributed database. A database convergence module can be implemented in a memory or a processor of the first compute device. The database convergence module can be operatively coupled with the instance of the distributed database. The database convergence module can be configured to define, at a first time, a first event linked to a first set of events. Each event from the first set of events is a sequence of bytes and is associated with (1) a set of transactions from multiple sets of transactions, and (b) an order associated with the set of transactions. Each transaction from the set of transactions is from the multiple transactions. The database convergence module can be configured to receive, at a second time after the first time and from a second compute device from the set of compute devices, a second event (1) defined by the second compute device and (2) linked to a second set of events. The database convergence module can be configured to define a third event linked to the first event and the second event. The database convergence module can be configured to identify an order associated with a third set of events based at least on the first set of events and the second set of events. Each event from the third set of events is from at least one of the first set of events or the second set of events. The database convergence module can be configured to identify an order associated with the multiple transactions based at least on (1) the order associated with the third set of events and (2) the order associated with each set of transactions from the multiple sets of transactions. The database convergence module can be configured to store in the instance of the distributed database the order associated with the multiple transactions stored in the first compute device.

In some embodiments, an instance of a distributed database at a first compute device can be configured to be included within a set of compute devices that implements the distributed database via a network operatively coupled to the set of compute devices. A database convergence module can be implemented in a memory or a processor of the first compute device. The database convergence module can be configured to define, at a first time, a first event linked to a first set of events. Each event from the first set of events is a sequence of bytes. The database convergence module can be configured to receive, at a second time after the first time and from a second compute device from the set of compute devices, a second event (1) defined by the second compute device and (2) linked to a second set of events. Each event from the second set of events is a sequence of bytes. The database convergence module can be configured to define a third event linked to the first event and the second event. The database convergence module can be configured to identify an order associated with a third set of events based at least on the first set of events and the second set of events. Each event from the third set of events is from at least one of the first set of events or the second set of events. The database convergence module can be configured to store in the instance of the distributed database the order associated with the third set of events.

In some embodiments, data associated with a first transaction can be received at a first compute device from a set of compute devices that implement a distributed database via a network operatively coupled to the set of compute devices. Each compute device from the set of compute devices has a separate instance of the distributed database. A first transaction order value associated with the first transaction can be defined at a first time. Data associated with a second transaction can be received from a second compute device from the set of compute devices. A set of transactions can be stored in the instance of the distributed database at the first compute device. The set of transactions can include at least the first transaction and the second transaction. A set of transaction order values including at least the first transaction order value and a second transaction order value can be selected at a second time after the first time. The second transaction order value can be associated with the second transaction. A database state variable can be defined based on at least the set of transactions and the set of transaction order values.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "module" is intended to mean a single module or a combination of modules. For instance, a "network" is intended to mean a single network or a combination of networks.

FIG. 1 is a high level block diagram that illustrates a distributed database system 100, according to an embodiment. FIG. 1 illustrates a distributed database 100 implemented across four compute devices (compute device 110, compute device 120, compute device 130, and compute device 140), but it should be understood that the distributed database 100 can use a set of any number of compute devices, including compute devices not shown in FIG. 1. The network 105 can be any type of network (e.g., a local area network (LAN), a wide area network (WAN), a virtual network, a telecommunications network) implemented as a wired network and/or wireless network and used to operatively couple compute devices 110, 120, 130, 140. As described in further detail herein, in some embodiments, for example, the compute devices are personal computers connected to each other via an Internet Service Provider (ISP) and the Internet (e.g., network 105). In some embodiments, a connection can be defined, via network 105, between any two compute devices 110, 120, 130, 140. As shown in FIG. 1, for example, a connection can be defined between compute device 110 and any one of compute device 120, compute device 130, or compute device 140.

In some embodiments, the compute devices 110, 120, 130, 140 can communicate with each other (e.g., send data to and/or receive data from) and with the network via intermediate networks and/or alternate networks (not shown in FIG. 1). Such intermediate networks and/or alternate networks can be of a same type and/or a different type of network as network 105.

Each compute device 110, 120, 130, 140 can be any type of device configured to send data over the network 105 to send and/or receive data from one or more of the other compute devices. Examples of compute devices are shown in FIG. 1. Compute device 110 includes a memory 112, a processor 111, and an output device 113. The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 112 of the compute device 110 includes data associated with an instance of a distributed database (e.g., distributed database instance 114). In some embodiments, the memory 112 stores instructions to cause the processor to execute modules, processes and/or functions associated with sending to and/or receiving from another instance of a distributed database (e.g., distributed database instance 124 at compute device 120) a record of a synchronization event, a record of prior synchronization events with other compute devices, an order of synchronization events, an order of transactions within events, parameters associated with identifying an order of synchronization events and/or transactions, a value for a parameter (e.g., a database field quantifying a transaction, a database field quantifying an order in which events occur, and/or any other suitable field for which a value can be stored in a database).

Distributed database instance 114 can, for example, be configured to manipulate data, including storing, modifying, and/or deleting data. In some embodiments, distributed database instance 114 can be a relational database, object database, post-relational database, and/or any other suitable type of database or storage. For example, the distributed database instance 114 can store data related to any specific function and/or industry. For example, the distributed database instance 114 can store financial transactions (of the user of the compute device 110, for example), including a value and/or a vector of values related to the history of ownership of a particular financial instrument. In general, a vector can be any set of values for a parameter, and a parameter can be any data object and/or database field capable of taking on different values. Thus, a distributed database instance 114 can have a number of parameters and/or fields, each of which is associated with a vector of values. The vector of values is used to determine the actual value for the parameter and/or field within that database instance 114. In some instances, the distributed database instance 114 stores a record of a synchronization event, a record of prior synchronization events with other compute devices, an order of synchronization events, an order of transactions within events, parameters and/or values associated with identifying an order of synchronization events and/or transactions (e.g., used in calculating an order using a consensus method as described herein), a value for a parameter (e.g., a database field quantifying a transaction, a database field quantifying an order in which events occur, and/or any other suitable field for which a value can be stored in a database).

In some instances, the distributed database instance 114 can also store a database state variable and/or a current state. The current state can be a state, balance, condition, and/or the like associated with a result of the transactions. Similarly stated, the state can include the data structure and/or variables modified by the transactions. In other instances, the current state can be stored in a separate database and/or portion of memory 112. In still other instances, the current state can be stored at a memory of a compute device different from compute device 110.

In some instances, the distributed database instance 114 can also be used to implement other data structures, such as a set of (key, value) pairs. A transaction recorded by the distributed database instance 114 can be, for example, adding, deleting, or modifying a (key, value) pair in a set of (key, value) pairs.

In some instances, the distributed database system 100 or any of the distributed database instances 114, 124, 134, 144 can be queried. For example, a query can consist of a key, and the returned result from the distributed database system 100 or distributed database instances 114, 124, 134, 144 can be a value associated with the key. In some instances, the distributed database system 100 or any of the distributed database instances 114, 124, 134, 144 can also be modified through a transaction. For example, a transaction to modify the database can contain a digital signature by the party authorizing the modification transaction.

The distributed database system 100 can be used for many purposes, such as, for example, storing attributes associated with various users in a distributed identity system. For example, such a system can use a user's identity as the "key," and the list of attributes associated with the users as the "value." In some instances, the identity can be a cryptographic public key with a corresponding private key known to that user. Each attribute can, for example, be digitally signed by an authority having the right to assert that attribute. Each attribute can also, for example, be encrypted with the public key associated with an individual or group of individuals that have the right to read the attribute. Some keys or values can also have attached to them a list of public keys of parties that are authorized to modify or delete the keys or values.

In another example, the distributed database instance 114 can store data related to Massively Multiplayer Games (MMGs), such as the current status and ownership of gameplay items. In some instances, distributed database instance 114 can be implemented within the compute device 110, as shown in FIG. 1. In other instances, the instance of the distributed database is accessible by the compute device (e.g., via a network), but is not implemented in the compute device (not shown in FIG. 1).

The processor 111 of the compute device 110 can be any suitable processing device configured to run and/or execute distributed database instance 114. For example, the processor 111 can be configured to update distributed database instance 114 in response to receiving a signal from compute device 120, and/or cause a signal to be sent to compute device 120, as described in further detail herein. More specifically, as described in further detail herein, the processor 111 can be configured to execute modules, functions and/or processes to update the distributed database instance 114 in response to receiving a synchronization event associated with a transaction from another compute device, a record associated with an order of synchronization events, and/or the like. In other embodiments, the processor 111 can be configured to execute modules, functions and/or processes to update the distributed database instance 114 in response to receiving a value for a parameter stored in another instance of the distributed database (e.g., distributed database instance 124 at compute device 120), and/or cause a value for a parameter stored in the distributed database instance 114 at compute device 110 to be sent to compute device 120. In some embodiments, the processor 111 can be a general purpose processor, a Field Programmable Gate Array (FPGA), an Application Specific Integrated Circuit (ASIC), a Digital Signal Processor (DSP), and/or the like.

The display 113 can be any suitable display, such as, for example, a liquid crystal display (LCD), a cathode ray tube display (CRT) or the like. In other embodiments, any of compute devices 110, 120, 130, 140 includes another output device instead of or in addition to the displays 113, 123, 133, 143. For example, any one of the compute devices 110, 120, 130, 140 can include an audio output device (e.g., a speaker), a tactile output device, and/or the like. In still other embodiments, any of compute devices 110, 120, 130, 140 includes an input device instead of or in addition to the displays 113, 123, 133, 143. For example, any one of the compute devices 110, 120, 130, 140 can include a keyboard, a mouse, and/or the like.

The compute device 120 has a processor 121, a memory 122, and a display 123, which can be structurally and/or functionally similar to the processor 111, the memory 112, and the display 113, respectively. Also, distributed database instance 124 can be structurally and/or functionally similar to distributed database instance 114.

The compute device 130 has a processor 131, a memory 132, and a display 133, which can be structurally and/or functionally similar to the processor 111, the memory 112, and the display 113, respectively. Also, distributed database instance 134 can be structurally and/or functionally similar to distributed database instance 114.

The compute device 140 has a processor 141, a memory 142, and a display 143, which can be structurally and/or functionally similar to the processor 111, the memory 112, and the display 113, respectively. Also, distributed database instance 144 can be structurally and/or functionally similar to distributed database instance 114.

Even though compute devices 110, 120, 130, 140 are shown as being similar to each other, each compute device of the distributed database system 100 can be different from the other compute devices. Each compute device 110, 120, 130, 140 of the distributed database system 100 can be any one of, for example, a computing entity (e.g., a personal computing device such as a desktop computer, a laptop computer, etc.), a mobile phone, a personal digital assistant (PDA), and so forth. For example, compute device 110 can be a desktop computer, compute device 120 can be a smartphone, and compute device 130 can be a server.

In some embodiments, one or more portions of the compute devices 110, 120, 130, 140 can include a hardware-based module (e.g., a digital signal processor (DSP), a field programmable gate array (FPGA)) and/or a software-based module (e.g., a module of computer code stored in memory and/or executed at a processor). In some embodiments, one or more of the functions associated with the compute devices 110, 120, 130, 140 (e.g., the functions associated with the processors 111, 121, 131, 141) can be included in one or more modules (see, e.g., FIG. 2).

The properties of the distributed database system 100, including the properties of the compute devices (e.g., the compute devices 110, 120, 130, 140), the number of compute devices, and the network 105, can be selected in any number of ways. In some instances, the properties of the distributed database system 100 can be selected by an administrator of distributed database system 100. In other instances, the properties of the distributed database system 100 can be collectively selected by the users of the distributed database system 100.

Because a distributed database system 100 is used, no leader is appointed among the compute devices 110, 120, 130, and 140. Specifically, none of the compute devices 110, 120, 130, or 140 are identified and/or selected as a leader to settle disputes between values stored in the distributed database instances 111, 12, 131, 141 of the compute devices 110, 120, 130, 140. Instead, using the event synchronization processes, the voting processes and/or methods described herein, the compute devices 110, 120, 130, 140 can collectively converge on a value for a parameter.

Not having a leader in a distributed database system increases the security of the distributed database system. Specifically, with a leader there is a single point of attack and/or failure. If malicious software infects the leader and/or a value for a parameter at the leader's distributed database instance is maliciously altered, the failure and/or incorrect value is propagated throughout the other distributed database instances. In a leaderless system, however, there is not a single point of attack and/or failure. Specifically, if a parameter in a distributed database instance of a leaderless system contains a value, the value will change after that distributed database instance exchanges values with the other distributed database instances in the system, as described in further detail herein. Additionally, the leaderless distributed database systems described herein increase the speed of convergence while reducing the amount of data sent between devices as described in further detail herein.

Figure 2:
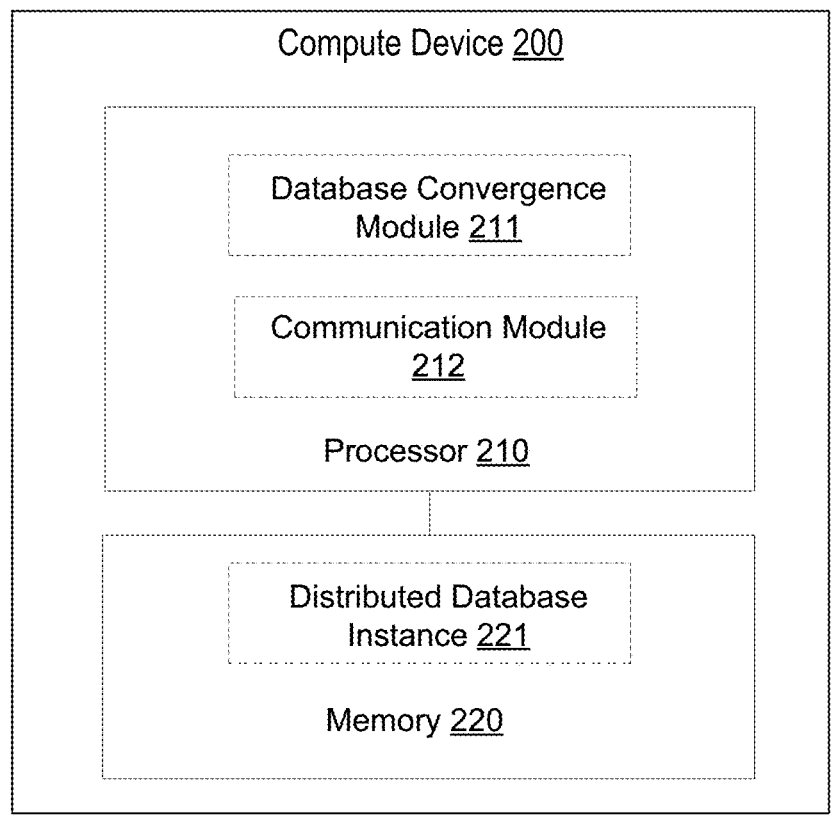
FIG. 2 is a block diagram that illustrates a compute device of a distributed database system, according to an embodiment.

FIG. 2 illustrates a compute device 200 of a distributed database system (e.g., distributed database system 100), according to an embodiment. In some embodiments, compute device 200 can be similar to compute devices 110, 120, 130, 140 shown and described with respect to FIG. 1. Compute device 200 includes a processor 210 and a memory 220. The processor 210 and memory 220 are operatively coupled to each other. In some embodiments, the processor 210 and memory 220 can be similar to the processor 111 and memory 112, respectively, described in detail with respect to FIG. 1. As shown in FIG. 2, the processor 210 includes a database convergence module 211 and communication module 210, and the memory 220 includes a distributed database instance 221. The communication module 212 enables compute device 200 to communicate with (e.g., send data to and/or receive data from) other compute devices. In some embodiments, the communication module 212 (not shown in FIG. 1) enables compute device 110 to communicate with compute devices 120, 130, 140. Communication module 210 can include and/or enable, for example, a network interface controller (NIC), wireless connection, a wired port, and/or the like. As such, the communication module 210 can establish and/or maintain a communication session between the compute device 200 and another device (e.g., via a network such as network 105 of FIG. 1 or the Internet (not shown)). Similarly stated, the communication module 210 can enable the compute device 200 to send data to and/or receive data from another device.

In some instances, the database convergence module 211 can exchange events and/or transactions with other computing devices, store events and/or transactions that the database convergence module 211 receives, and calculate an ordering of the events and/or transactions based on the partial order defined by the pattern of references between the events. Each event can be a record containing a cryptographic hash of two earlier events (linking that event to the two earlier events and their ancestor events, and vice versa), payload data (such as transactions that are to be recorded), other information such as the current time, a timestamp (e.g., date and UTC time) that its creator asserts is the time the event was first defined, and/or the like. In some instances, the first event defined by a member only includes a hash of a single event defined by another member. In such instances, the member does not yet have a prior self-hash (e.g., a hash of an event previously defined by that member). In some instances, the first event in a distributed database does not include a hash of any prior event (since there is no prior event for that distributed database).

In some embodiments, such a cryptographic hash of the two earlier events can be a hash value defined based on a cryptographic hash function using an event as an input. Specifically, in such embodiments, the event includes a particular sequence or string of bytes (that represent the information of that event). The hash of an event can be a value returned from a hash function using the sequence of bytes for that event as an input. In other embodiments, any other suitable data associated with the event (e.g., an identifier, serial number, the bytes representing a specific portion of the event, etc.) can be used as an input to the hash function to calculate the hash of that event. Any suitable hash function can be used to define the hash. In some embodiments, each member uses the same hash function such that the same hash is generated at each member for a given event. The event can then be digitally signed by the member defining and/or creating the event.

In some instances, the set of events and their interconnections can form a Directed Acyclic Graph (DAG). In some instances, each event in a DAG references two earlier events (linking that event to the two earlier events and their ancestor events and vice versa), and each reference is strictly to earlier ones, so that there are no loops. In some embodiments, the DAG is based on cryptographic hashes, so the data structure can be called a hashgraph (also referred to herein as a "hashDAG"). The hashgraph directly encodes a partial order, meaning that event X is known to come before event Y if Y contains a hash of X, or if Y contains a hash of an event that contains a hash of X, or for such paths of arbitrary length. If, however, there is no path from X to Y or from Y to X, then the partial order does not define which event came first. Therefore, the database convergence module can calculate a total order from the partial order. This can be done by any suitable deterministic function that is used by the compute devices, so that the compute devices calculate the same order. In some embodiments, each member can recalculate this order after each sync, and eventually these orders can converge so that a consensus emerges.

A consensus algorithm can be used to determine the order of events in a hashgraph and/or the order of transactions stored within the events. The order of transactions in turn can define a state of a database as a result of performing those transactions according to the order. The defined state of the database can be stored as a database state variable.

In some instances, the database convergence module can use the following function to calculate a total order from the partial order in the hashgraph. For each of the other compute devices (called "members"), the database convergence module can examine the hashgraph to discover an order in which the events (and/or indications of those events) were received by that member. The database convergence module can then calculate as if that member assigned a numeric "rank" to each event, with the rank being 1 for the first event that member received, 2 for the second event that member received, and so on. The database convergence module can do this for each member in the hashgraph. Then, for each event, the database convergence module can calculate the median of the assigned ranks, and can sort the events by their medians. The sort can break ties in a deterministic manner, such as sorting two tied events by a numeric order of their hashes, or by some other method, in which the database convergence module of each member uses the same method. The result of this sort is the total order.

Figure 6:
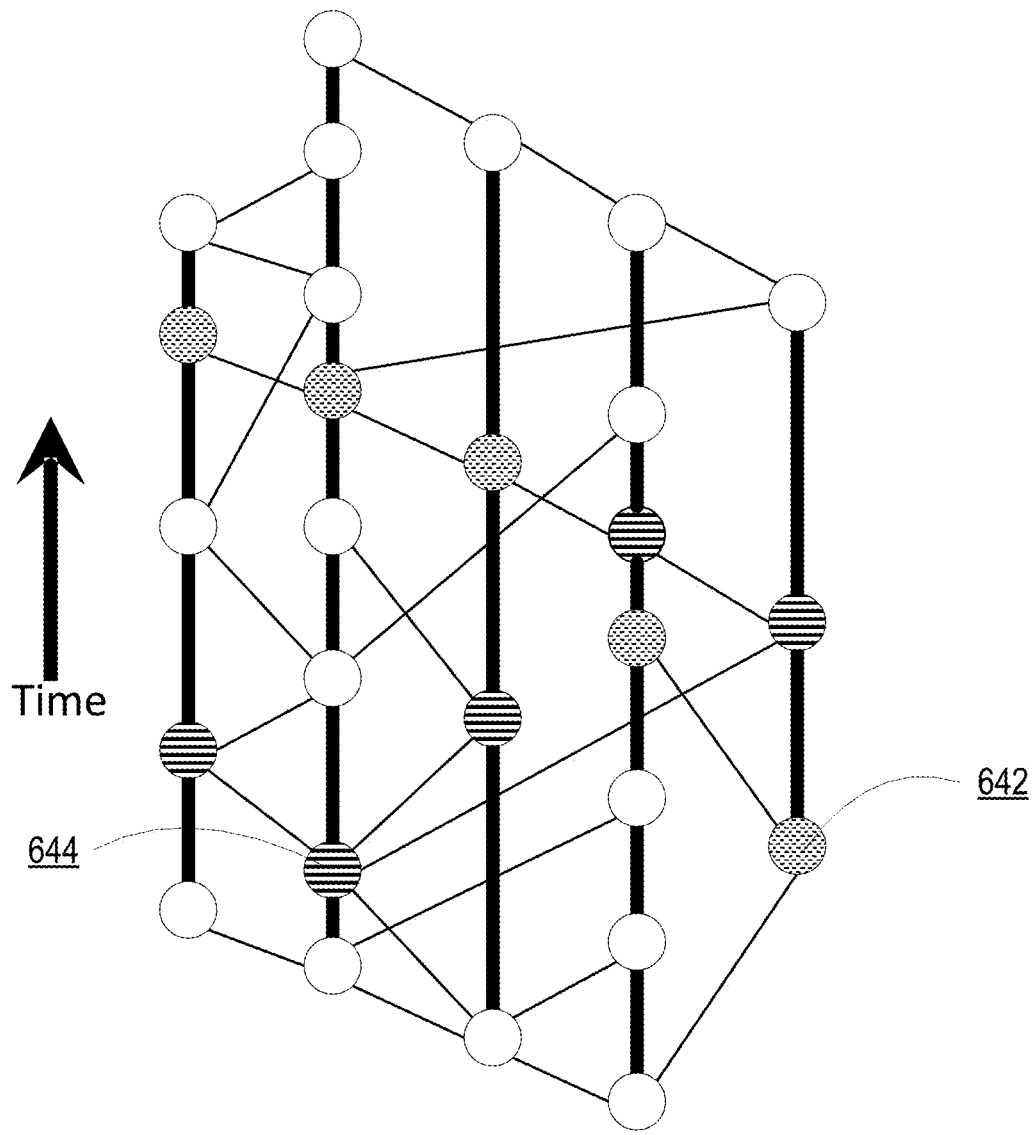

FIG. 6 illustrates a hashgraph 640 of one example for determining a total order. hashgraph 640 illustrates two events (the lowest striped circle and lowest dotted circle) and the first time each member receives an indication of those events (the other striped and dotted circles). Each member's name at the top is colored by which event is first in their slow order. There are more striped initial votes than dotted; therefore, consensus votes for each of the members are striped. In other words, the members eventually converge to an agreement that the striped event occurred before the dotted event.

In this example, the members (compute devices labeled Alice, Bob, Carol, Dave and Ed) will work to define a consensus of whether event 642 or event 644 occurred first. Each striped circle indicates the event at which a member first received an event 644 (and/or an indication of that event 644). Similarly, each dotted circle indicates the event at which a member first received an event 642 (and/or an indication of that event 642). As shown in the hashgraph 640, Alice, Bob and Carol each received event 644 (and/or an indication of event 644) prior to event 642. Dave and Ed both received event 642 (and/or an indication of event 642) prior to event 644 (and/or an indication of event 644). Thus, because a greater number of members received event 644 prior to event 642, the total order can be determined by each member to indicate that event 644 occurred prior to event 642.

In other instances, the database convergence module can use a different function to calculate the total order from the partial order in the hashgraph. In such embodiments, for example, the database convergence module can use the following functions to calculate the total order, where a positive integer Q is a parameter shared by the members.

$creator(x)$ = the member who created event $x$ $anc(x)$ = the set of events that are ancestors of $x$, including $x$ itself $other(x)$ = the event created by the member who synced just before $x$ was created $self(x)$ = the last event before $x$ with the same creator $self(x, 0) = self(x)$ $self(x, n) = (self(x), n - 1)$ $order(x, y) = k$, where $y$ is the $k$th event that $creator(x)$ learned of $last(x) =$
$\{y \mid y \in anc(x) \land \neg \exists z \in anc(x), (y \in anc(z) \land creator(y) = creator(z))\}$ $slow(x, y) =$
$\begin{cases} \infty & \text{if } y \notin anc(x) \\ order(x, y) & \text{if } y \in anc(x) \land y \notin anc(self(x)) \\ fast(x, y) & \text{if } \forall i \in \{1, \ldots, Q\}, fast(x, y) = fast(self(x, i), y) \\ slow(self(x), y) & \text{otherwise} \end{cases}$ $fast(x, y)$ = the position of $y$ in a sorted list,
with element $z \in anc(x)$ sorted by $\underset{w \in last(x)}{median}\, slow(w, z)$
and with ties broken by the hash of each event In this embodiment, fast(x,y) gives the position of y in the total order of the events, in the opinion of creator(x), substantially immediately after x is created and/or defined. If Q is infinity, then the above calculates the same total order as in the previously described embodiment. If Q is finite, and all members are online, then the above calculates the same total order as in the previously described embodiment. If Q is finite and a minority of the members is online at a given time, then this function allows the online members to reach a consensus among them that will remain unchanged as new members come online slowly, one by one. If, however, there is a partition of the network, then the members of each partition can come to their own consensus. Then, when the partition is healed, the members of the smaller partition will adopt the consensus of the larger partition.

Figure 8:
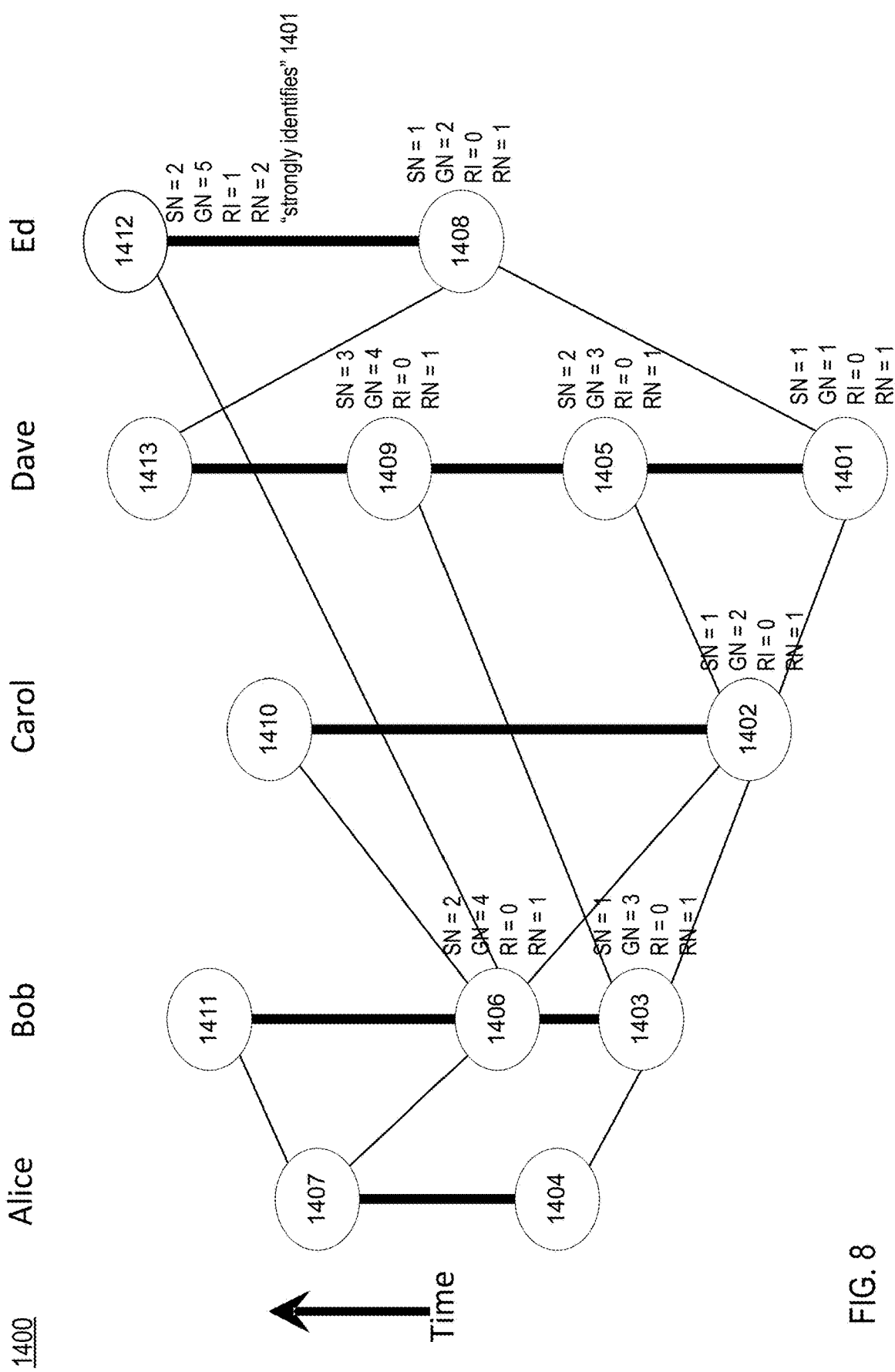
FIG. 8 is an example of a hashgraph, according to an embodiment.
Figure 9:
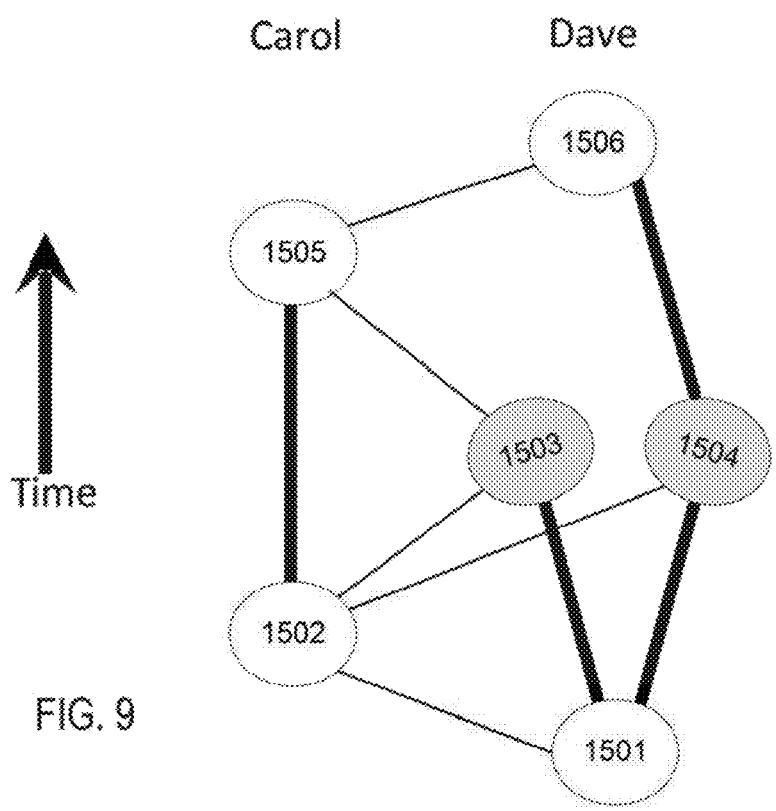
FIG. 9 is an example of a hashgraph, according to an embodiment.

In still other instances, as described with respect to FIGS. 8-12B, the database convergence module can use yet a different function to calculate the total order from the partial order in the hashgraph. As shown in FIGS. 8-9 each member (Alice, Bob, Carol, Dave and Ed) creates and/or defines events (1401-1413 as shown in FIG. 8; 1501-1506 shown in FIG. 9). Using the function and sub-functions described with respect to FIGS. 8-12B, the total order for the events can be calculated by sorting the events by their received round, breaking ties by their received timestamp, and breaking those ties by their signatures, as described in further detail herein. In other instances, the total order for the events can be calculated by sorting the events by their received round, breaking ties by their received generation (instead of their received timestamp), and breaking those ties by their signatures. The following paragraphs specify functions used to calculate and/or define an event's received round and received generation to determine an order for the events. The following terms are used and illustrated in connection with FIGS. 8-12B.

"Parent": an event X is a parent of event Y if Y contains a hash of X. For example, in FIG. 8, the parents of event 1412 include event 1406 and event 1408.

"Ancestor": the ancestors of an event X are X, its parents, its parents' parents, and so on. For example, in FIG. 8, the ancestors of event 1412 are events 1401, 1402, 1403, 1406, 1408, and 1412. Ancestors of an event can be said to be linked to that event and vice versa.

"Descendant": the descendants of an event X are X, its children, its children's children, and so on. For example, in FIG. 8, the descendants of event 1401 are every event shown in the figure. For another example, the descendants of event 1403 are events 1403, 1404, 1406, 1407, 1409, 1410, 1411, 1412 and 1413. Descendants of an event can be said to be linked to that event and vice versa.

"N": the total number of members in the population. For example, in FIG. 8, the members are compute devices labeled Alice, Bob, Carol, Dave and Ed, and N is equal to five.

"M": the least integer that is more than a certain percentage of N (e.g., more than $2/3$ of N). For example, in FIG. 8, if the percentage is defined to be $2/3$, then M is equal to four. In other instances, M could be defined, for example, to be a different percentage of N (e.g., $1/3$, $1/2$, etc.), a specific predefined number, and/or in any other suitable manner.

"Self-parent": the self-parent of an event X is its parent event Y created and/or defined by the same member. For example, in FIG. 8, the self-parent of event 1405 is 1401.

"Self-ancestor": the self-ancestors of an event X are X, its self-parent, its self-parent's self-parent, and so on.

"Sequence Number" (or "SN") (also referred to herein as a sequence value): an integer attribute of an event, defined as the Sequence Number of the event's self-parent, plus one. For example, in FIG. 8, the self-parent of event 1405 is

1401. Since the Sequence Number of event 1401 is one, the Sequence Number of event 1405 is two (i.e., one plus one). In some implementations, sequence numbers are restarted or reset to zero at the start of a new round. In other instances the sequence number and/or sequence value can decrement rather than increment, be an alphanumeric value with a lexicographical order (e.g., A, B, C, etc.), and/or the like.

"Generation Number" (or "GN"): an integer attribute of an event, defined as the maximum of the Generation Numbers of the event's parents, plus one. For example, in FIG. 8, event 1412 has two parents, events 1406 and 1408, having Generation Numbers four and two, respectively. Thus, the Generation Number of event 1412 is five (i.e., four plus one).

"Round Increment" (or "RI"): an attribute of an event that can be either zero or one.

"Round Number" (or "RN", also referred to herein as "round created"): an integer attribute of an event. In some instances, Round Number can be defined as the maximum of the Round Numbers of the event's parents, plus the event's Round Increment. For example, in FIG. 8, event 1412 has two parents, events 1406 and 1408, both having a Round Number of one. Event 1412 also has a Round Increment of one. Thus, the Round Number of event 1412 is two (i.e., one plus one). In other instances, an event can have a Round Number R if R is the minimum integer such that the event can strongly see (as described herein) at least M events defined and/or created by different members, which all have a round number R−1. If there is no such integer, the Round Number for an event can be a default value (e.g., 0, 1, etc.). In such instances, the Round Number for an event can be calculated without using a Round Increment. For example, in FIG. 8, if M is defined to be the least integer greater than ½ times N, then M is three. Then event 1412 strongly sees the M events 1401, 1402, and 1408, each of which was defined by a different member and has a Round Number of 1. The event 1412 cannot strongly see at least M events with Round Number of 2 that were defined by different members. Therefore, the Round Number for event 1412 is 2. In some instances, the first event in the distributed database includes a Round Number of 1. In other instances, the first event in the distributed database can include a Round Number of 0 or any other suitable number.

"Forking": an event X is a fork with event Y if they are defined and/or created by the same member, and neither is a self-ancestor of the other. For example, in FIG. 9, member Dave forks by creating and/or defining events 1503 and 1504, both having the same self-parent (i.e., event 1501), so that event 1503 is not a self-ancestor of event 1504, and event 1504 is not a self-ancestor of event 1503.

"Identification" of forking: forking can be "identified" by a third event created and/or defined after the two events that are forks with each other, if those two events are both ancestors of the third event. For example, in FIG. 9, member Dave forks by creating events 1503 and 1504, neither of which is a self-ancestor of the other. This forking can be identified by later event 1506 because events 1503 and 1504 are both ancestors of event 1506. In some instances, identification of forking can indicate that a particular member (e.g., Dave) has cheated.

"Identification" of an event: an event X "identifies" or "sees" an ancestor event Y if X has no ancestor event Z that is a fork with Y. For example, in FIG. 8, event 1412 identifies (also referred to as "sees") event 1403 because event 1403 is an ancestor of event 1412, and event 1412 has no ancestor events that are forks with event 1403. In some instances, event X can identify event Y if X does not identify forking prior to event Y. In such instances, even if event X identifies forking by the member defining event Y subsequent to event Y, event X can see event Y. Event X does not identify events by that member subsequent to forking. Moreover, if a member defines two different events that are both that member's first events in history, event X can identify forking and does not identify any event by that member.

"Strong identification" (also referred to herein as "strongly seeing") of an event: an event X "strongly identifies" (or "strongly sees") an ancestor event Y created and/or defined by the same member as X, if X identifies Y. Event X "strongly identifies" an ancestor event Y that is not created and/or defined by the same member as X, if there exists a set S of events that (1) includes both X and Y and (2) are ancestors of event X and (3) are descendants of ancestor event Y and (4) are identified by X and (5) can each identify Y and (6) are created and/or defined by at least M different members. For example, in FIG. 8, if M is defined to be the least integer that is more than ⅔ of N (i.e., M=1+floor(2N/3), which would be four in this example), then event 1412 strongly identifies ancestor event 1401 because the set of events 1401, 1402, 1406, and 1412 is a set of at least four events that are ancestors of event 1412 and descendants of event 1401, and they are created and/or defined by the four members Dave, Carol, Bob, and Ed, respectively, and event 1412 identifies each of events 1401, 1402, 1406, and 1412, and each of events 1401, 1402, 1406, and 1412 identifies event 1401. Similarly stated, an event X (e.g., event 1412) can "strongly see" event Y (e.g., event 1401) if X can see at least M events (e.g., events 1401, 1402, 1406, and 1412) created or defined by different members, each of which can see Y.

"Round R first" event (also referred to herein as a "witness"): an event is a "round R first" event (or a "witness") if the event (1) has Round Number R, and (2) has a self-parent having a Round Number smaller than R or has no self-parent. For example, in FIG. 8, event 1412 is a "round 2 first" event because it has a Round Number of two, and its self-parent is event 1408, which has a Round Number of one (i.e., smaller than two).

In some instances, the Round Increment for an event X is defined to be 1 if and only if X "strongly identifies" at least M "round R first" events, where R is the maximum Round Number of its parents. For example, in FIG. 8, if M is defined to be the least integer greater than ½ times N, then M is three. Then event 1412 strongly identifies the M events 1401, 1402, and 1408, all of which are round 1 first events. Both parents of 1412 are round 1, and 1412 strongly identifies at least M round 1 firsts, therefore the round increment for 1412 is one. The events in the diagram marked with "RI=0" each fail to strongly identify at least M round 1 firsts, therefore their round increments are 0.

In some instances, the following method can be used for determining whether event X can strongly identify ancestor event Y. For each round R first ancestor event Y, maintain an array A1 of integers, one per member, giving the lowest sequence number of the event X, where that member created and/or defined event X, and X can identify Y. For each event Z, maintain an array A2 of integers, one per member, giving the highest sequence number of an event W created and/or defined by that member, such that Z can identify W. To determine whether Z can strongly identify ancestor event Y, count the number of element positions E such that A1 [E] <=A2[E]. Event Z can strongly identify Y if and only if this count is greater than M. For example, in FIG. 8, members Alice, Bob, Carol, Dave and Ed can each identify event 1401, where the earliest event that can do so is their events {1404, 1403, 1402, 1401, 1408}, respectively. These events have sequence numbers A1={1,1,1,1,1}. Similarly, the latest event by each of them that is identified by event 1412 is event {NONE, 1406, 1402, 1401, 1412}, where Alice is listed as "NONE" because 1412 cannot identify any events by Alice. These events have sequence numbers of A2={0, 2,1,1,2}, respectively, where all events have positive sequence numbers, so the 0 means that Alice has no events that are identified by 1412. Comparing the list A1 to the list A2 gives the results {1<=0, 1<=, 1<=1, 1<=1, 1<=2} which is equivalent to {false, true, true, true, true} which has four values that are true. Therefore, there exists a set S of four events that are ancestors of 1412 and descendants of 1401. Four is at least M, therefore 1412 strongly identifies 1401.

Yet another variation on implementing the method for determining, with A1 and A2, whether event X can strongly identify ancestor event Y is as follows. If the integer elements in both arrays are less than 128, then it is possible to store each element in a single byte, and pack 8 such elements into a single 64-bit word, and let A1 and A2 be arrays of such words. The most significant bit of each byte in A1 can be set to 0, and the most significant bit of each byte in A2 can be set to 1. Subtract the two corresponding words, then perform a bitwise AND with a mask to zero everything but the most significant bits, then right shift by 7 bit positions, to get a value that is expressed in the C programming language as: ((A2[i]-A1[i]) & 0x8080808080808080) >>7). This can be added to a running accumulator S that was initialized to zero. After doing this multiple times, convert the accumulator to a count by shifting and adding the bytes, to get ((S & 0xff)+((S>>8) & 0xff)+((S>>16) & 0xff)+ ((S>>24) & 0xff)+((S>>32) & 0xff)+((S>>40) & 0xff)+ ((S>>48) & 0xff)+((S>>56) & 0xff)). In some instances, these calculations can be performed in programming languages such as C, Java, and/or the like. In other instances, the calculations can be performed using processor-specific instructions such as the Advanced Vector Extensions (AVX) instructions provided by Intel and AMD, or the equivalent in a graphics processing unit (GPU) or general-purpose graphics processing unit (GPGPU). On some architectures, the calculations can be performed faster by using words larger than 64 bits, such as 128, 256, 512, or more bits.

"Famous" event: a round R event X is "famous" if (1) the event X is a "round R first" event (or "witness") and (2) a decision of "YES" is reached via execution of a Byzantine agreement protocol, described below. In some embodiments, the Byzantine agreement protocol can be executed by an instance of a distributed database (e.g., distributed database instance 114) and/or a database convergence module (e.g., database convergence module 211). For example, in FIG. 8, there are five round 1 firsts shown: 1401, 1402, 1403, 1404, and 1408. If M is defined to be the least integer greater than ½ times N, which is three, then 1412 is a round 2 first. If the protocol runs longer, then the hashgraph will grow upward, and eventually the other four members will also have round 2 firsts above the top of this figure. Each round 2 first will have a "vote" on whether each of the round 1 firsts is "famous". Event 1412 would vote YES for 1401, 1402, and 1403 being famous, because those are round 1 firsts that it can identify. Event 1412 would vote NO for 1404 being famous, because 1412 cannot identify 1404. For a given round 1 first, such as 1402, its status of being "famous" or not will be decided by calculating the votes of each round 2 first for whether it is famous or not. Those votes will then propagate to round 3 firsts, then to round 4 firsts and so on, until eventually agreement is reached on whether 1402 was famous. The same process is repeated for other firsts.

A Byzantine agreement protocol can collect and use the votes and/or decisions of "round R first" events to identify "famous events. For example, a "round R+1 first" Y will vote "YES" if Y can "identify" event X, otherwise it votes "NO." Votes are then calculated for each round G, for G=R+2, R+3, R+4, etc., until a decision is reached by any member. Until a decision has been reached, a vote is calculated for each round G. Some of those rounds can be "majority" rounds, while some other rounds can be "coin" rounds. In some instances, for example, Round R+2 is a majority round, and future rounds are designated as either a majority or a coin round (e.g., according to a predefined schedule). For example, in some instances, whether a future round is a majority round or a coin round can be arbitrarily determined, subject to the condition that there cannot be two consecutive coin rounds. For example, it might be predefined that there will be five majority rounds, then one coin round, then five majority rounds, then one coin round, repeated for as long as it takes to reach agreement.

In some instances, if round G is a majority round, the votes can be calculated as follows. If there exists a round G event that strongly identifies at least M round G-1 firsts voting V (where V is either "YES" or "NO"), then the consensus decision is V, and the Byzantine agreement protocol ends. Otherwise, each round G first event calculates a new vote that is the majority of the round G-1 firsts that each round G first event can strongly identify. In instances where there is a tie rather than majority, the vote can be designated "YES."

Similarly stated, if X is a round R witness (or round R first), then the results of votes in rounds R+1, R+2, and so on can be calculated, where the witnesses in each round are voting for whether X is famous. In round R+1, every witness that can see X votes YES, and the other witnesses vote NO. In round R+2, every witness votes according to the majority of votes of the round R+1 witnesses that it can strongly see. Similarly, in round R+3, every witness votes according to the majority of votes of the round R+2 witness that it can strongly see. This can continue for multiple rounds. In case of a tie, the vote can be set to YES. In other instances, the tie can be set to NO or can be randomly set. If any round has at least M of the witnesses voting NO, then the election ends, and X is not famous. If any round has at least M of the witnesses voting YES, then the election ends, and X is famous. If neither YES nor NO has at least M votes, the election continues to the next round.

As an example, in FIG. 8, consider some round first event X that is below the figure shown. Then, each round 1 first will have a vote on whether X is famous. Event 1412 can strongly identify the round 1 first events 1401, 1402, and 1408. So its vote will be based on their votes. If this is a majority round, then 1412 will check whether at least M of {1401, 1402, 1408} have a vote of YES. If they do, then the decision is YES, and the agreement has been achieved. If at least M of them votes NO, then the decision is NO, and the agreement has been achieved. If the vote doesn't have at least M either direction, then 1412 is given a vote that is a majority of the votes of those of 1401, 1402, and 1408 (and would break ties by voting YES, if there were a tie). That vote would then be used in the next round, continuing until agreement is reached.

In some instances, if round G is a coin round, the votes can be calculated as follows. If event X can identify at least M round G-1 firsts voting V (where V is either "YES" or "NO"), then event X will change its vote to V. Otherwise, if round G is a coin round, then each round G first event X changes its vote to the result of a pseudo-random determination (akin to a coin flip in some instances), which is defined to be the least significant bit of the signature of event X.

Similarly stated, in such instances, if the election reaches a round R+K (a coin round), where K is a designated factor (e.g., a multiple of a number such as 3, 6, 7, 8, 16, 32 or any other suitable number), then the election does not end on that round. If the election reaches this round, it can continue for at least one more round. In such a round, if event Y is a round R+K witness, then if it can strongly see at least M witnesses from round R+K−1 that are voting V, then Y will vote V. Otherwise, Y will vote according to a random value (e.g., according to a bit of the signature of event Y (e.g., least significant bit, most significant bit, randomly selected bit) where 1=YES and 0=NO, or vice versa, according to a time stamp of the event Y, using a cryptographic "shared coin" protocol and/or any other random determination). This random determination is unpredictable before Y is created, and thus can increase the security of the events and consensus protocol.

For example, in FIG. 8, if round 2 is a coin round, and the vote is on whether some event before round 1 was famous, then event 1412 will first check whether at least M of {1401, 1402, 1408} voted YES, or at least M of them voted NO. If that is the case, then 1412 will vote the same way. If there are not at least M voting in either direction, then 1412 will have a random or pseudorandom vote (e.g., based on the least significant bit of the digital signature that Ed created for event 1412 when he signed it, at the time he created and/or defined it).

In some instances, the result of the pseudo-random determination can be the result of a cryptographic shared coin protocol, which can, for example, be implemented as the least significant bit of a threshold signature of the round number.

A system can be built from any one of the methods for calculating the result of the pseudo-random determination described above. In some instances, the system cycles through the different methods in some order. In other instances, the system can choose among the different methods according to a predefined pattern.

"Received round": An event X has a "received round" of R if R is the minimum integer such that at least half of the famous round R first events (or famous witnesses) with round number R are descendants of and/or can see X. In other instances, any other suitable percentage can be used. For example, in another instance, an event X has a "received round" of R if R is the minimum integer such that at least a predetermined percentage (e.g., 40%, 60%, 80%, etc.) of the famous round R first events (or famous witnesses) with round number R are descendants of and/or can see X.

In some instances, the "received generation" of event X can be calculated as follows. Find which member created and/or defined each round R first event that can identify event X. Then determine the generation number for the earliest event by that member that can identify X. Then define the "received generation" of X to be the median of that list.

In some instances, a "received timestamp" T of an event X can be the median of the timestamps in the events that include the first event by each member that identifies and/or sees X. For example, the received timestamp of event 1401 can be the median of the value of the timestamps for events 1402, 1403, 1403, and 1408. In some instances, the timestamp for event 1401 can be included in the median calculation. In other instances, the received timestamp for X can be any other value or combination of the values of the timestamps in the events that are the first events by each member to identify or see X. For example, the received timestamp for X can be based on an average of the timestamps, a standard deviation of the timestamps, a modified average (e.g., by removing the earliest and latest timestamps from the calculation), and/or the like. In still other instances, an extended median can be used.

In some instances, the total order and/or consensus order for the events is calculated by sorting the events by their received round, breaking ties by their received timestamp, and breaking those ties by their signatures. In other instances, the total order for the events can be calculated by sorting the events by their received round, breaking ties by their received generation, and breaking those ties by their signatures. The foregoing paragraphs specify functions used to calculate and/or define an event's received round, received timestamp, and/or received generation.

In other instances, instead of using the signature of each event, the signature of that event XORed with the signatures of the famous events or famous witnesses with the same received round and/or received generation in that round can be used. In other instances, any other suitable combination of event signatures can be used to break ties to define the consensus order of events.

In still other instances, instead of defining the "received generation" as the median of a list, the "received generation" can be defined to be the list itself. Then, when sorting by received generation, two received generations can be compared by the middle elements of their lists, breaking ties by the element immediately before the middle, breaking those ties by the element immediately after the middle, and continuing by alternating between the element before those used so far and the element after, until the tie is broken.

In some instances, the median timestamp can be replaced with an "extended median." In such instances, a list of timestamps can be defined for each event rather than a single received timestamp. The list of timestamps for an event X can include the first event by each member that identifies and/or sees X. For example, in FIG. 8, the list of timestamps for event 1401 can include the timestamps for events 1402, 1403, 1403, and 1408. In some instances, the timestamp for event 1401 can also be included. When breaking a tie with the list of timestamps (i.e., two events have the same received round), the middle timestamps of each event's list (or a predetermined of the first or second of the two middle timestamps, if of even length) can be compared. If these timestamps are the same, the timestamps immediately after the middle timestamps can be compared. If these timestamps are the same, the timestamps immediately preceding the middle timestamps can be compared. If these timestamps are also the same, the timestamps after the three already compared timestamps are compared. This can continue to alternate until the tie is broken. Similar to the above discussion, if the two lists are identical, the tie can be broken by the signatures of the two elements.

In still other instances, a "truncated extended median" can be used instead of an "extended median." In such an instance, an entire list of timestamps is not stored for each event. Instead, only a few of the values near the middle of the list are stored and used for comparison.

The median timestamp received can potentially be used for other purposes in addition to calculating a total order of events. For example, Bob might sign a contract that says he agrees to be bound by the contract if and only if there is an event X containing a transaction where Alice signs that same contract, with the received timestamp for X being on or before a certain deadline. In that case, Bob would not be bound by the contract if Alice signs it after the deadline, as indicated by the "received median timestamp", as described above.

In some instances, a state of the distributed database can be defined after a consensus is achieved. For example, if S(R) is the set of events that can be seen by the famous witnesses in round R, eventually all of the events in S(R) will have a known received round and received timestamp. At that point, the consensus order for the events in S(R) is known and will not change. Once this point is reached, a member can calculate and/or define a representation of the events and their order. For example, a member can calculate a hash value of the events in S(R) in their consensus order. The member can then digitally sign the hash value and include the hash value in the next event that member defines. This can be used to inform the other members that that member has determined that the events in S(R) have the given order that will not change. After at least M of the members (or any other suitable number or percentage of members) have signed the hash value for S(R) (and thus agreed with the order represented by the hash value), that consensus list of events along with the list of signatures of the members can form a single file (or other data structure) that can be used to prove that the consensus order was as claimed for the events in S(R). In other instances, if events contain transactions that update a state of the distributed database system (as described herein), then the hash value can be of the state of the distributed database system after applying the transactions of the events in S(R) in the consensus order. Further details regarding the state of the distributed database are discussed with reference to FIG. 13.

In some instances, M (as described above) can be based on weight values assigned to each member, rather than just a fraction, percentage and/or value of the number of total members. In such an instance, each member has a stake associated with its interest and/or influence in the distributed database system. Such a stake can be a weight value. Each event defined by that member can be said to have the weight value of its defining member. M can then be a fraction of the total stake of all members. The events described above as being dependent on M will occur when a set of members with a stake sum of at least M agree. Thus, based on their stake, certain members can have a greater influence on the system and how the consensus order is derived. In some instances, a transaction in an event can change the stake of one or more members, add new members, and/or delete members. If such a transaction has a received round of R, then after the received round has been calculated, the events after the round R witnesses will recalculate their round numbers and other information using the modified stakes and modified list of members. The votes on whether round R events are famous will use the old stakes and member list, but the votes on the rounds after R will use the new stakes and member list. Additional details regarding using weight values to determine consensus are described in U.S. patent application Ser. No. 15/387,048, filed Dec. 21, 2016 and titled "Methods And Apparatus For A Distributed Database Within A Network," now U.S. Pat. No. 9,646,029, which is incorporated herein by reference in its entirety.

The foregoing terms, definitions, and algorithms are used to illustrate the embodiments and concepts described in FIGS. 8-12B. FIGS. 10A and 10B illustrate an example application of a consensus method and/or process shown in mathematical form. FIGS. 11A and 11B illustrate a second example application of a consensus method and/or process shown in mathematical form and FIGS. 12A and 12B illustrate a third example application of a consensus method and/or process shown in mathematical form.

In FIG. 2, the database convergence module 211 and the communication module 212 are shown in FIG. 2 as being implemented in processor 210. In other embodiments, the database convergence module 211 and/or the communication module 212 can be implemented in memory 220. In still other embodiments, the database convergence module 211 and/or the communication module 212 can be hardware based (e.g., ASIC, FPGA, etc.). In some embodiments, the distributed database instance 221 can be similar to distributed database instances 114, 124, 134, 144 of the distributed database system 100 shown in FIG. 1.

Figure 7:
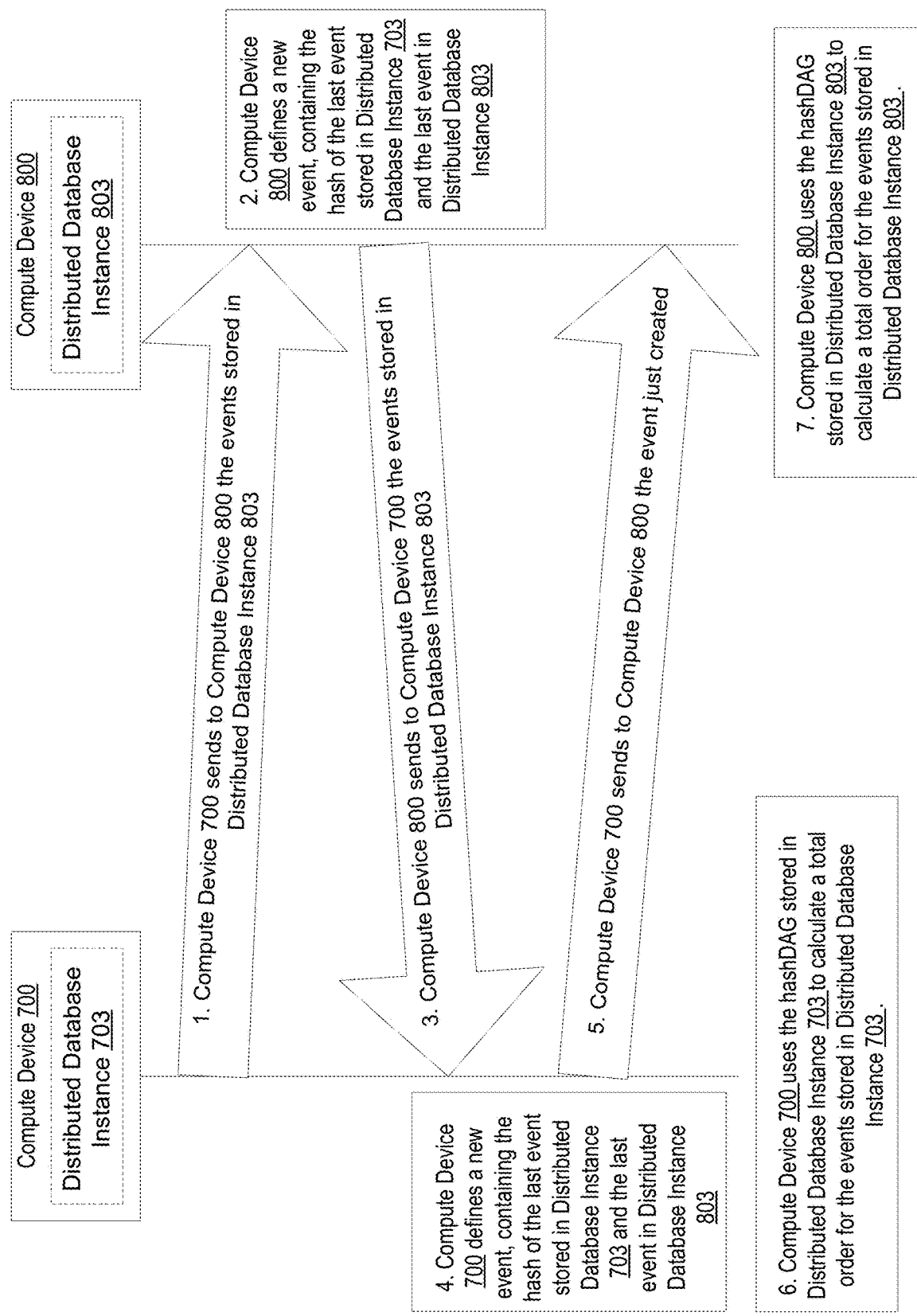
FIG. 7 is a flow diagram that illustrates a communication flow between a first compute device and a second compute device, according to an embodiment.

FIG. 7 illustrates a signal flow diagram of two compute devices syncing events, according to an embodiment. Specifically, in some embodiments, the distributed database instances 703 and 803 can exchange events to obtain convergence. The compute device 700 can select to sync with the compute device 800 randomly, based on a relationship with the compute device 700, based on proximity to the compute device 700, based on an ordered list associated with the compute device 700, and/or the like. In some embodiments, because the compute device 800 can be chosen by the compute device 700 from the set of compute devices belonging to the distributed database system, the compute device 700 can select the compute device 800 multiple times in a row or may not select the compute device 800 for a while. In other embodiments, an indication of the previously selected compute devices can be stored at the compute device 700. In such embodiments, the compute device 700 can wait a predetermined number of selections before being able to select again the compute device 800. As explained above, the distributed database instances 703 and 803 can be implemented in a memory of compute device 700 and a memory of compute device 800, respectively.

FIGS. 3-6 illustrate examples of a hashgraph, according to an embodiment. There are five members, each of which is represented by a dark vertical line. Each circle represents an event. The two downward lines from an event represent the hashes of two previous events. Every event in this example has two downward lines (one dark line to the same member and one light line to another member), except for each member's first event. Time progresses upward. In FIGS. 3-6, compute devices of a distributed database are indicated as Alice, Bob, Carol, Dave and Ed. In should be understood that such indications refer to compute devices structurally and functionally similar to the compute devices 110, 120, 130 and 140 shown and described with respect to FIG. 1.

Example System 1: If the compute device 700 is called Alice, and the compute device 800 is called Bob, then synchronization between them can be as illustrated in FIG. 7. A sync between Alice and Bob can be as follows:

Alice sends Bob the events stored in distributed database 703.
    Bob creates and/or defines a new event which contains:
        a hash of the last event Bob created and/or defined
        a hash of the last event Alice created and/or defined
        a digital signature by Bob of the above
    Bob sends Alice the events stored in distributed database 803.
    Alice creates and/or defines a new event.
    Alice sends Bob that event.
    Alice calculates a total order for the events, as a function of a hashgraph
    Bob calculates a total order for the events, as a function of a hashgraph At any given time, a member can store the events received so far, along with an identifier associated with the compute device and/or distributed database instance that created and/or defined each event. Each event contains the hashes of two earlier events, except for an initial event (which has no parent hashes), and the first event for each new member (which has a single parent event hash, representing the event of the existing member that invited them to join). A diagram can be drawn representing this set of events. It can show a vertical line for each member, and a dot on that line for each event created and/or defined by that member. A diagonal line is drawn between two dots whenever an event (the higher dot) includes the hash of an earlier event (the lower dot). An event can be said to be linked to another event if that event can reference the other event via a hash of that event (either directly or through intermediary events).

Figure 3:
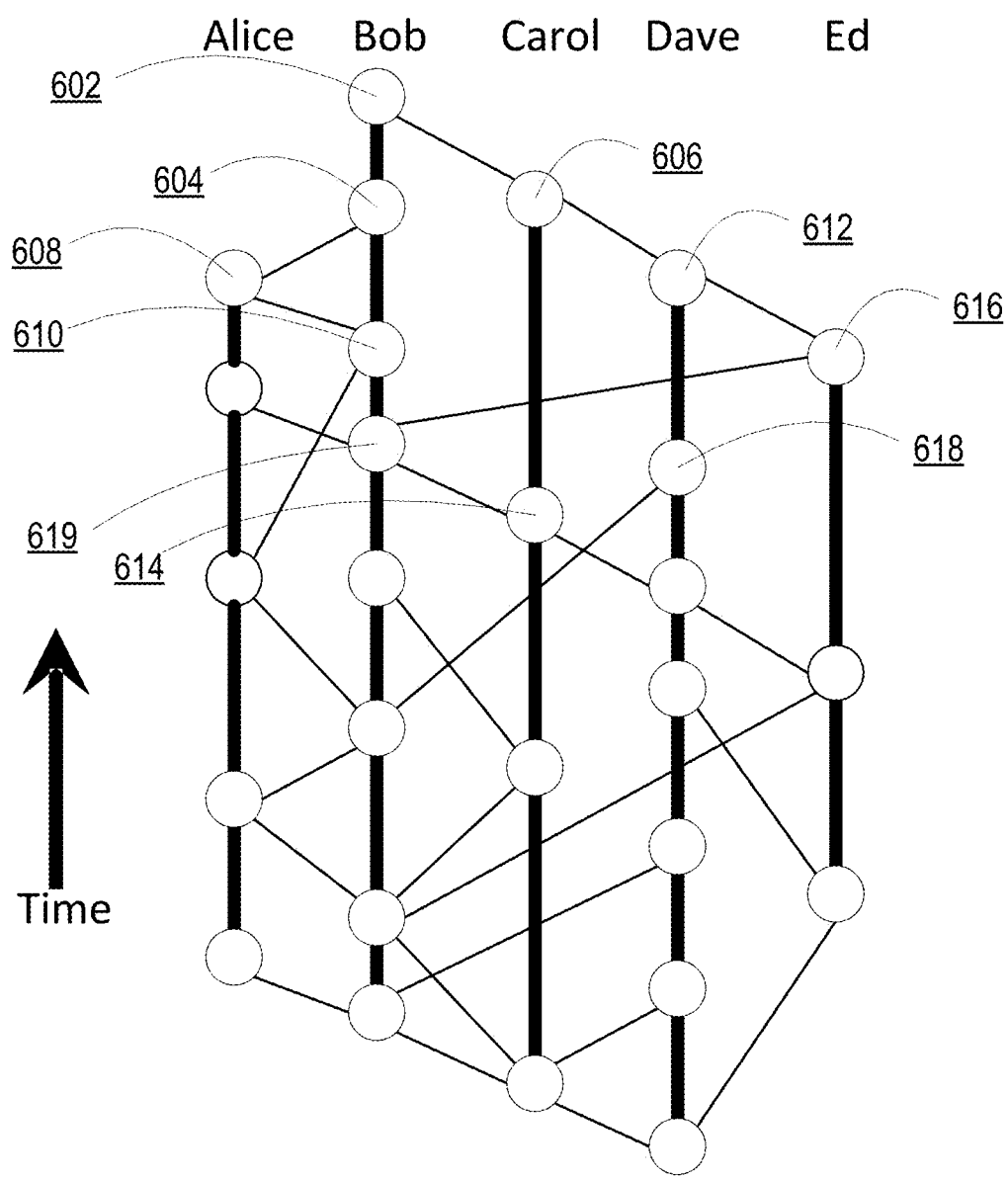
FIGS. 3-6 illustrate examples of a hashgraph, according to an embodiment.

For example, FIG. 3 illustrates an example of a hashgraph 600. Event 602 is created and/or defined by Bob as a result of and after syncing with Carol. Event 602 includes a hash of event 604 (the previous event created and/or defined by Bob) and a hash of event 606 (the previous event created and/or defined by Carol). In some embodiments, for example, the hash of event 604 included within event 602 includes a pointer to its immediate ancestor events, events 608 and 610. As such, Bob can use the event 602 to reference events 608 and 610 and reconstruct the hashgraph using the pointers to the prior events. In some instances, event 602 can be said to be linked to the other events in the hashgraph 600 since event 602 can reference each of the events in the hashgraph 600 via earlier ancestor events. For example, event 602 is linked to event 608 via event 604. For another example, event 602 is linked to event 616 via events 606 and event 612.

Example System 2: The system from Example System 1, where the event also includes a "payload" of transactions or other information to record. Such a payload can be used to update the events with any transactions and/or information that occurred and/or was defined since the compute device's immediate prior event. For example, the event 602 can include any transactions performed by Bob since event 604 was created and/or defined. Thus, when syncing event 602 with other compute devices, Bob can share this information. Accordingly, the transactions performed by Bob can be associated with an event and shared with the other members using events.

Example System 3: The system from Example System 1, where the event also includes the current time and/or date, useful for debugging, diagnostics, and/or other purposes. The time and/or date can be the local time and/or date when the compute device (e.g., Bob) creates and/or defines the event. In such embodiments, such a local time and/or date is not synchronized with the remaining devices. In other embodiments, the time and/or date can be synchronized across the devices (e.g., when exchanging events). In still other embodiments, a global timer can be used to determine the time and/or date.

Example System 4: The system from Example System 1, where Alice does not send Bob events created and/or defined by Bob, nor ancestor events of such an event. An event x is an ancestor of an event y if y contains the hash of x, or y contains the hash of an event that is an ancestor of x. Similarly stated, in such embodiments Bob sends Alice the events not yet stored by Alice and does not send events already stored by Alice.

Figure 4:
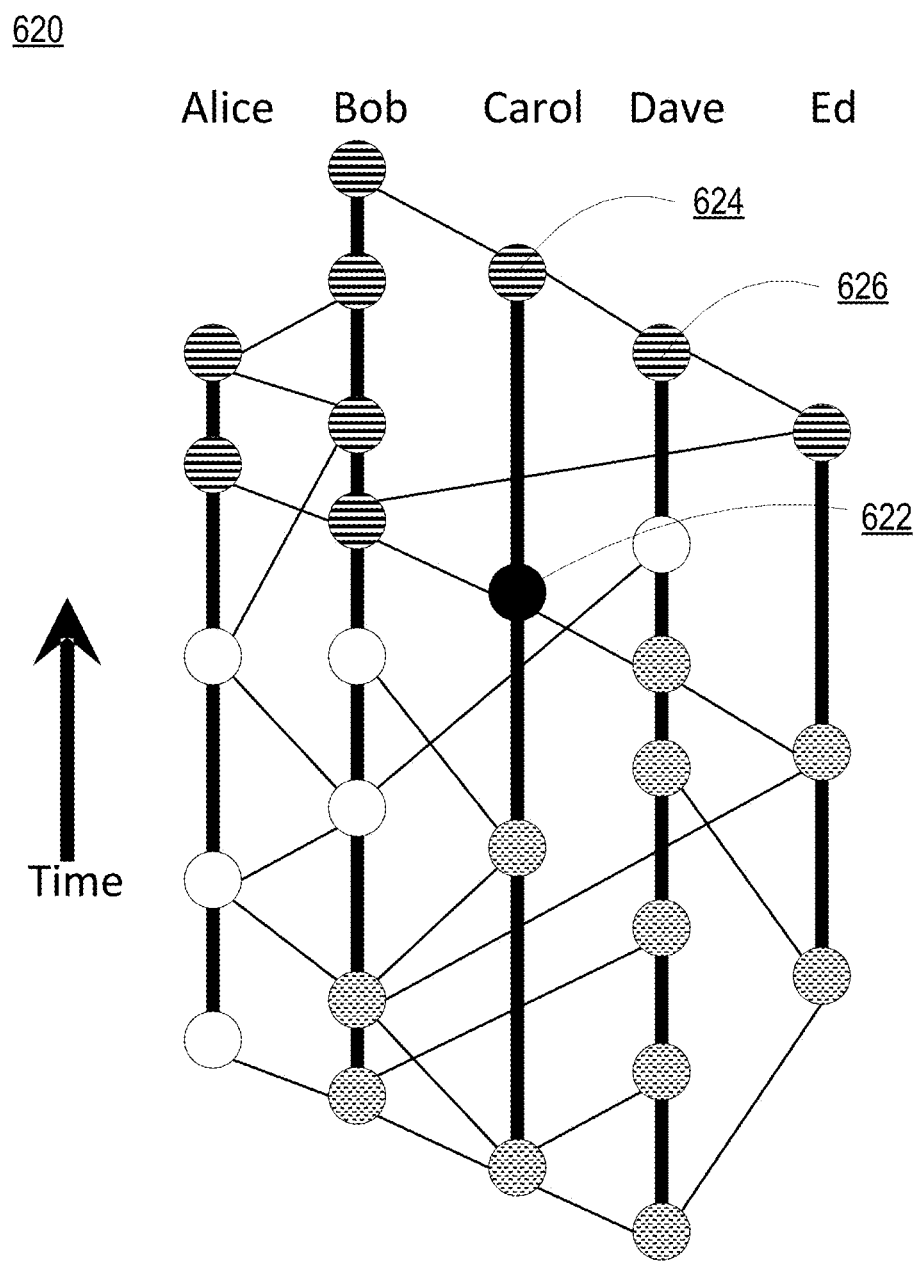
Figure 5:
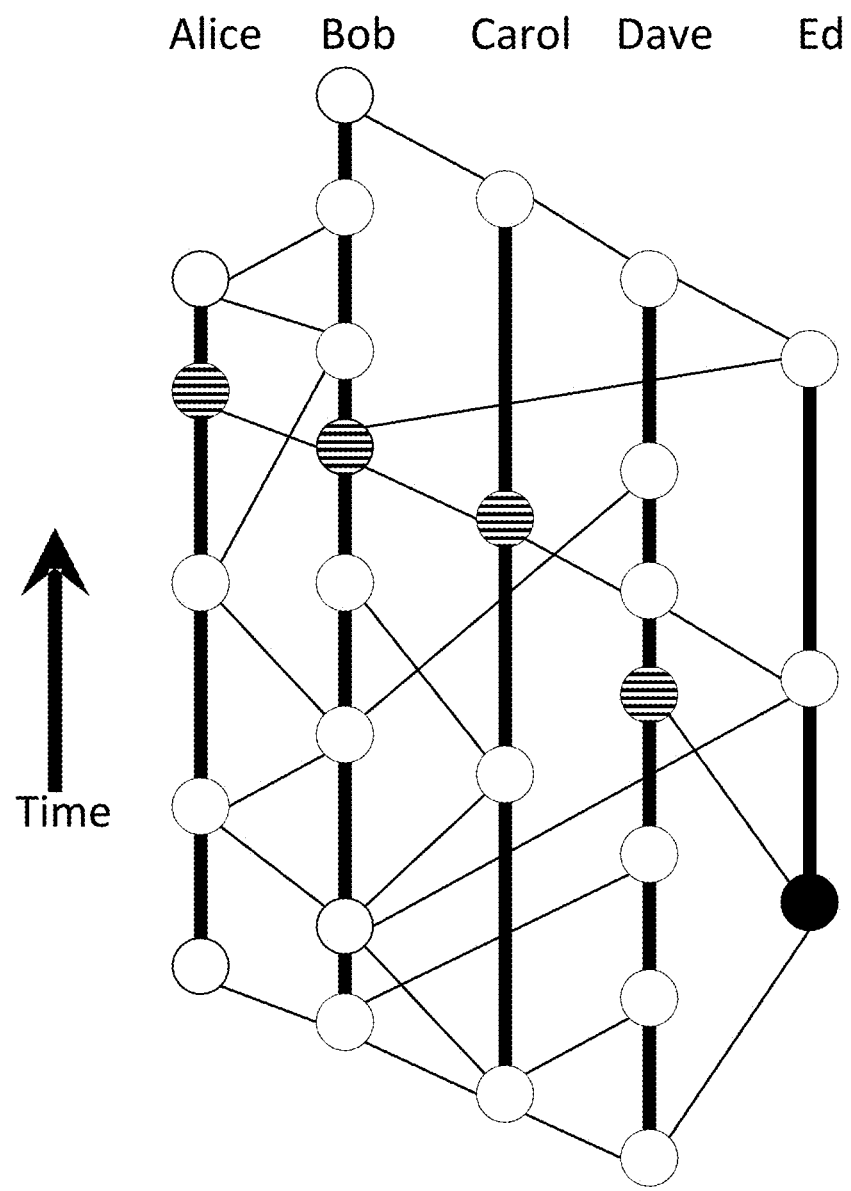

For example, FIG. 4 illustrates an example hashgraph 620 illustrating the ancestor events (dotted circles) and descendent events (striped circles) of the event 622 (the black circle). The lines establish a partial order on the events, where the ancestors come before the black event, and the descendants come after the black event. The partial order does not indicate whether the white events are before or after the black event, so a total order is used to decide their sequence. For another example, FIG. 5 illustrates an example hashgraph illustrating one particular event (solid circle) and the first time each member receives an indication of that event (striped circles). When Carol syncs with Dave to create and/or define event 624, Dave does not send to Carol ancestor events of event 622 since Carol is already aware of and has received such events. Instead, Dave sends to Carol the events Carol has yet to receive and/or store in Carol's distributed database instance. In some embodiments, Dave can identify what events to send to Carol based on what Dave's hashgraph reveals about what events Carol has previously received. Event 622 is an ancestor of event 626. Therefore, at the time of event 626, Dave has already received event 622. FIG. 4 shows that Dave received event 622 from Ed who received event 622 from Bob who received event 622 from Carol. Furthermore, at the time of event 624, event 622 is the last event that Dave has received that was created and/or defined by Carol. Therefore, Dave can send Carol the events that Dave has stored other than event 622 and its ancestors. Additionally, upon receiving event 626 from Dave, Carol can reconstruct the hashgraph based on the pointers in the events stored in Carol's distributed database instance. In other embodiments, Dave can identify what events to send to Carol based on Carol sending event 622 to Dave (not shown in FIG. 4) and Dave identifying using event 622 (and the references therein) to identify the events Carol has already received.

Example System 5: The system from Example System 1 where both members send events to the other in an order such that an event is not sent until after the recipient has received and/or stored the ancestors of that event. Accordingly, the sender sends events from oldest to newest, such that the recipient can check the two hashes on each event as the event is received, by comparing the two hashes to the two ancestor events that were already received. The sender can identify what events to send to the receiver based on the current state of the sender's hashgraph (e.g., a database state variable defined by the sender) and what that hashgraph indicates the receiver has already received. Referring to FIG. 3, for example, when Bob is syncing with Carol to define event 602, Carol can identify that event 619 is the last event created and/or defined by Bob that Carol has received. Therefore, Carol can determine that Bob knows of that event, and its ancestors. Thus Carol can send Bob event 618 and event 616 first (i.e., the oldest events Bob has yet to receive that Carol has received). Carol can then send Bob event 612 and then event 606. This allows Bob to easily link the events and reconstruct Bob's hashgraph. Using Carol's hashgraph to identify what events Bob has yet to receive can increase the efficiency of the sync and can reduce network traffic since Bob does not request events from Carol.

In other embodiments, the most recent event can be sent first. If the receiver determines (based on the hash of the two previous events in the most recent event and/or pointers to previous events in the most recent event) that they have not yet received one of the two previous events, the receiver can request the sender to send such events. This can occur until the receiver has received and/or stored the ancestors of the most recent event. Referring to FIG. 3, in such embodiments, for example, when Bob receives event 606 from Carol, Bob can identify the hash of event 612 and event 614 in event 606. Bob can determine that event 614 was previously received from Alice when creating and/or defining event 604. Accordingly, Bob does not need to request event 614 from Carol. Bob can also determine that event 612 has not yet been received. Bob can then request event 612 from Carol. Bob can then, based on the hashes within event 612, determine that Bob has not received events 616 or 618 and can accordingly request these events from Carol. Based on events 616 and 618, Bob will then be able to determine that he has received the ancestors of event 606.

Example System 6: The system from Example System 5 with the additional constraint that when a member has a choice between several events to send next, the event is chosen to minimize the total number of bytes sent so far created and/or defined by that member. For example, if Alice has only two events left to send Bob, and one is 100 bytes and was created and/or defined by Carol, and one is 10 bytes and was created and/or defined by Dave, and so far in this sync Alice has already sent 200 bytes of events by Carol and 210 by Dave, then Alice should send the Dave event first, then subsequently send the Carol event. Because 210+10<100+200. This can be used to address attacks in which a single member either sends out a single gigantic event, or a flood of tiny events. In the case in which the traffic exceeds a byte limit of most members (as discussed with respect to Example System 7), the method of Example System 6 can ensure that the attacker's events are ignored rather than the events of legitimate users. Similarly stated, attacks can be reduced by sending the smaller events before bigger ones (to defend against one giant event tying up a connection). Moreover, if a member can't send each of the events in a single sync (e.g., because of network limitation, member byte limits, etc.), then that member can send a few events from each member, rather than merely sending the events defined and/or created by the attacker and none (of few) events created and/or defined by other members.

Example System 7: The system from Example System 1 with an additional first step in which Bob sends Alice a number indicating a maximum number of bytes he is willing to receive during this sync, and Alice replies with her limit. Alice then stops sending when the next event would exceed this limit. Bob does the same. In such an embodiment, this limits the number of bytes transferred. This may increase the time to convergence, but will reduce the amount of network traffic per sync.

Example System 8: The system from Example System 1, in which the following steps added at the start of the syncing process:

Alice identifies S, the set of events that she has received and/or stored, skipping events that were created and/or defined by Bob or that are ancestors of events created and/or defined by Bob.

Alice identifies the members that created and/or defined each event in S, and sends Bob the list of the member's ID numbers. Alice also send a number of events that were created and/or defined by each member that she has already received and/or stored.

Bob replies with a list of how many events he has received that were created and/or defined by the other members.

Alice then sends Bob only the events that he has yet to receive. For example, if Alice indicates to Bob that she has received 100 events created and/or defined by Carol, and Bob replies that he has received 95 events created and/or defined by Carol, then Alice will send only the most recent 5 events created and/or defined by Carol.

Example System 9: The system from Example System 1, with an additional mechanism for identifying and/or handling cheaters. Each event contains two hashes, one from the last event created and/or defined by that member (the "self hash"), and one from the last event created and/or defined by another member (the "foreign hash"). If a member creates and/or defines two different events with the same self hash, then that member is a "cheater". If Alice discovers Dave is a cheater, by receiving two different events created and/or defined by him with the same self hash, then she stores an indicator that he is a cheater, and refrains from syncing with him in the future. If she discovers he is a cheater and yet still syncs with him again and creates and/or defines a new event recording that fact, then Alice becomes a cheater, too, and the other members who learn of Alice further syncing with Dave stop syncing with Alice. In some embodiments, this only affects the syncs in one way. For example, when Alice sends a list of identifiers and the number of events she has received for each member, she doesn't send an ID or count for the cheater, so Bob won't reply with any corresponding number. Alice then sends Bob the cheater's events that she has received and for which she hasn't received an indication that Bob has received such events. After that sync is finished, Bob will also be able to determine that Dave is a cheater (if he hasn't already identified Dave as a cheater), and Bob will also refuse to sync with the cheater.

Example System 10: The system in Example System 9, with the addition that Alice starts a sync process by sending Bob a list of cheaters she has identified and of whose events she is still storing, and Bob replies with any cheaters he has identified in addition to the cheaters Alice identified. Then they continue as normal, but without giving counts for the cheaters when syncing with each other.

Example System 11: The system in Example System 1, with a process that repeatedly updates a current state (e.g., as captured by a database state variable defined by a member of the system) based on transactions inside of any new events that are received during syncing. This also can include a second process that repeatedly rebuilds that state (e.g., the order of events), whenever the sequence of events changes, by going back to a copy of an earlier state, and recalculating the present state by processing the events in the new order. Thus, for example, each compute device can maintain two versions of a state (one that is updated as new events and transactions are received and one that is updated only after consensus is achieved). At some point (e.g., after a period of time, after a given number of events are defined and/or received, etc.), the version of the state that is updated as new events and transactions are received can be discarded and a new copy of the state that is updated only after consensus is achieved can be made as a new version of the state that is updated as new events and transactions are received. This can ensure synchronization of both states.

In some embodiments, the current state is a state, balance, condition, and/or the like associated with a result of the transactions. Similarly stated, the state can include the data structure and/or variables modified by the transactions. For example, if the transactions are money transfers between bank accounts, then the current state can be the current balance of the accounts. For another example, if the transactions are associated with a multiplayer game, the current state can be the position, number of lives, items obtained, state of the game, and/or the like associated with the game.

Example System 12: The system in Example System 11, made faster by the use of "fast clone" arrayList to maintain the state (e.g., bank account balances, game state, etc.). A fast clone arrayList is a data structure that acts like an array with one additional feature: it supports a "clone" operation that appears to create and/or define a new object that is a copy of the original. The close acts as if it were a true copy, because changes to the clone do not affect the original. The cloning operation, however, is faster than creating a true copy, because creating a clone does not actually involve copying and/or updating the entire contents of one arrayList to another. Instead of having two clones and/or copies of the original list, two small objects, each with a hash table and a pointer to the original list, can be used. When a write is made to the clone, the hash table remembers which element is modified, and the new value. When a read is performed on a location, the hash table is first checked, and if that element was modified, the new value from the hash table is returned. Otherwise, that element from the original arrayList is returned. In this way, the two "clones" are initially just pointers to the original arrayList. But as each is modified repeatedly, it grows to have a large hash table storing differences between itself and the original list. Clones can themselves be cloned, causing the data structure to expand to a tree of objects, each with its own hash table and pointer to its parent. A read therefore causes a walk up the tree until a vertex is found that has the requested data, or the root is reached. If vertex becomes too large or complex, then it can be replaced with a true copy of the parent, the changes in the hash table can be made to the copy, and the hash table discarded. In addition, if a clone is no longer needed, then during garbage collection it can be removed from the tree, and the tree can be collapsed.

Example System 13: The system in Example System 11, made faster by the use of a "fast clone" hash table to maintain the state (e.g., bank account balances, game state, etc.). This is the same as System 12, except the root of the tree is a hash table rather than an arrayList.

Example System 14: The system in Example System 11, made faster by the use of a "fast clone" relational database to maintain the state (e.g., bank account balances, game state, etc.). For example, the fast clone database can be used to maintain two copies of the state, as discussed with respect to Example System 11. This is an object that acts as a wrapper around an existing Relational Database Management System (RDBMS). Each apparent "clone" is actually an object with an ID number and a pointer to an object containing the database. When the user's code tries to perform a Structure Query Language (SQL) query on the database, that query is first modified, then sent to the real database. The real database is identical to the database as seen by the client code, except that each table has one additional field for the clone ID. For example, suppose there is an original database with clone ID 1, and then two clones of the database are made, with IDs 2 and 3 (e.g., used to maintain the two copies of the state). Each row in each table will have a 1, 2, or 3 in the clone ID field. When a query comes from the user code into clone 2, the query is modified so that the query will only read from rows that have a 2 or 1 in that field. Similarly, reads to 3 look for rows with a 3 or 1 ID. If the Structured Query Language (SQL) command goes to clone 2 and says to delete a row, and that row has a 1, then the command should just change the 1 to a 3, which marks the row as no longer being shared by clones 2 and 3, and now just being visible to 3. If there are several clones in operation, then several copies of the row can be inserted, and each can be changed to the ID of a different clone, so that the new rows are visible to the clones except for the clone that just "deleted" the row. Similarly, if a row is added to clone 2, then the row is added to the table with an ID of 2. A modification of a row is equivalent to a deletion then an insertion. As before, if several clones are garbage collected, then the tree can be simplified. The structure of that tree will be stored in an additional table that is not accessible to the clones, but is purely used internally.

Example System 15: The system in Example System 11, made faster by the use of a "fast clone" file system to maintain the state. This is an object that acts as a wrapper around a file system. The file system is built on top of the existing file system, using a fast clone relational database to manage the different versions of the file system. The underlying file system stores a large number of files, either in one directory, or divided up according to filename (to keep directories small). The directory tree can be stored in the database, and not provided to the host file system. When a file or directory is cloned, the "clone" is just an object with an ID number, and the database is modified to reflect that this clone now exists. If a fast clone file system is cloned, it appears to the user as if an entire, new hard drive has been created and/or defined, initialized with a copy of the existing hard drive. Changes to one copy can have no effect on the other copies. In reality, there is just one copy of each file or directory, and when a file is modified through one clone the copying occurs.

Example System 16: The system in Example System 15 in which a separate file is created and/or defined on the host operating system for each N-byte portion of a file in the fast clone file system. N can be some suitable size, such as for example 4096 or 1024. In this way, if one byte is changed in a large file, only one chunk of the large file is copied and modified. This also increases efficiency when storing many files on the drive that differ in only a few bytes.

Example System 17: The system in Example System 11 where each member includes in some or all of the events they create and/or define a hash of the state at some previous time, along with the number of events that occurred up to that point, indicating that the member recognizes and/or identifies that there is now a consensus on the order of events. After a member has collected signed events containing such a hash from a majority of the users for a given state, the member can then store that as proof of the consensus state at that point, and delete from memory the events and transactions before that point.

Example System 18: The system in Example System 1 where operations that calculate a median or a majority is replaced with a weighted median or weighted majority, where members are weighted by their "stake". The stake is a number that indicates how much that member's vote counts. The stake could be holdings in a crypto currency, or just an arbitrary number assigned when the member is first invited to join, and then divided among new members that the member invites to join. Old events can be discarded when enough members have agreed to the consensus state so that their total stake is a majority of the stake in existence. If the total order is calculated using a median of ranks contributed by the members, then the result is a number where half the members have a higher rank and half have a lower. On the other hand, if the total order is calculated using the weighted median, then the result is a number where about half of the total stake is associated with ranks lower than that, and half above. Weighted voting and medians can be useful in preventing a Sybil attack, where one member invites a huge number of "sock puppet" users to join, each of whom are simply pseudonyms controlled by the inviting member. If the inviting member is forced to divide their stake with the invitees, then the sock puppets will not be useful to the attacker in attempts to control the consensus results. Accordingly, proof-of-stake may be useful in some circumstances.

Example System 19: The system in Example System 1 in which instead of a single, distributed database, there are multiple databases in a hierarchy. For example, there might be a single database that the users are members of, and then several smaller databases, or "chunks", each of which has a subset of the members. When events happen in a chunk, they are synced among the members of that chunk and not among members outside that chunk. Then, from time to time, after a consensus order has been decided within the chunk, the resulting state (or events with their consensus total order) can be shared with the entire membership of the large database.

Example System 20: The system in Example System 11, with the ability to have an event that updates the software for updating the state (e.g., as captured by a database state variable defined by a member of the system). For example, events X and Y can contain transactions that modify the state, according to software code that reads the transactions within those events, and then updates the state appropriately. Then, event Z can contain a notice that a new version of the software is now available. If a total order says the events happen in the order X, Z, Y, then the state can be updated by processing the transactions in X with the old software, then the transactions in Y with the new software. But if the consensus order was X, Y, Z, then both X and Y can be updated with the old software, which might give a different final state. Therefore, in such embodiments, the notice to upgrade the code can occur within an event, so that the community (e.g., the members within the distributed database) can achieve consensus on when to switch from the old version to the new version. This ensures that the members will maintain synchronized states. It also ensures that the system can remain running, even during upgrades, with no need to reboot or restart the process.

The systems described above are expected to create and/or achieve an efficient convergence mechanism for distributed consensus, with eventual consensus. Several theorems can be proved about this, as shown in the following.

Example Theorem 1: If event x precedes event y in the partial order, then in a given member's knowledge of the other members at a given time, each of the other members will have either received an indication of x before y, or will not yet have received an indication of y.

Proof: If event x precedes event y in the partial order, then x is an ancestor of y. When a member receives an indication of y for the first time, that member has either already received an indication of x earlier (in which case they heard of x before y), or it will be the case that the sync provides that member with both x and y (in which case they will hear of x before y during that sync, because the events received during a single sync are considered to have been received in an order consistent with ancestry relationships as described with respect to Example System 5). QED Example Theorem 2: For any given hashgraph, if x precedes y in the partial order, then x will precede y in the total order calculated for that hashgraph.

Proof: If x precedes y in the partial order, then by theorem 1:

for all i, rank(i,x)<rank(i,y)

where rank(i,x) is the rank assigned by member i to event x, which is 1 if x is the first event received by member i, 2 if it is second, and so on. Let med(x) be the median of the rank(i,x) over all i, and similarly for med(y).

For a given k, choose an i1 and i2 such that rank(i1,x) is the kth-smallest x rank, and rank(i2,y) is the kth-smallest y rank. Then:

rank(i1,x)<rank(i2,y)

This is because rank(i2,y) is greater than or equal to k of they ranks, each of which is strictly greater than the corresponding x rank. Therefore, rank(i2,y) is strictly greater than at least k of the x ranks, and so is strictly greater than the kth-smallest x rank. This argument holds for any k.

Let n be the number of members (which is the number of i values). Then n must be either odd or even. If n is odd, then let k=(n+1)/2, and the kth-smallest rank will be the median. Therefore, med(x)<med(y). If n is even, then when k=n/2, the kth-smallest x rank will be strictly less than the kth-smallest y rank, and also the (k+1)th-smallest x rank will be strictly less than the (k+1)th-smallest y rank. So the average of the two x ranks will be less than the average of the two y ranks. Therefore, med(x)<med(y). So in both cases, the median of x ranks is strictly less than the median of y ranks. So if the total order is defined by sorting the actions by median rank, then x will precede y in the total order. QED Example Theorem 3: If a "gossip period" is the amount of time for existing events to propagate through syncing to all the members, then:

after 1 gossip period: all members have received the events after 2 gossip periods: all members agree on the order of those events after 3 gossip periods: all members know that agreement has been reached after 4 gossip periods: all members obtain digital signatures from all other members, endorsing this consensus order.

Proof: Let S0 be the set of the events that have been created and/or defined by a given time T0. If every member will eventually sync with every other member infinitely often, then with probability 1 there will eventually be a time T1 at which the events in S0 have spread to every member, so that every member is aware of all of the events. That is the end of the first gossip period. Let S1 be the set of events that exist at time T1 and that didn't yet exist at T0. There will then with probability 1 eventually be a time T2 at which every member has received every event in set S1, which is those that existed at time T1. That is the end of the second gossip period. Similarly, T3 is when all events in S2, those existing by T2 but not before T1, have spread to all members. Note that each gossip period eventually ends with probability 1. On average, each will last as long as it takes to perform log 2(n) syncs, if there are n members.

By time T1, every member will have received every event in S0.

By time T2, a given member Alice will have received a record of each of the other members receiving every event in S0. Alice can therefore calculate the rank for every action in S0 for every member (which is the order in which that member received that action), and then sort the events by the median of the ranks. The resulting total order does not change, for the events in S0. That is because the resulting order is a function of the order in which each member first received an indication of each of those events, which does not change. It is possible, that Alice's calculated order will have some events from S1 interspersed among the S0 events. Those S1 events may still change where they fall within the sequence of S0 events. But the relative order of events in S0 will not change.

By time T3, Alice will have learned a total order on the union of S0 and S1, and the relative order of the events in that union will not change. Furthermore, she can find within this sequence the earliest event from S1, and can conclude that the sequence of the events prior to S1 will not change, not even by the insertion of new events outside of S0. Therefore, by time T3, Alice can determine that consensus has been achieved for the order of the events in history prior to the first S1 event. She can digitally sign a hash of the state (e.g., as captured by a database state variable defined by Alice) resulting from these events occurring in this order, and send out the signature as part of the next event she creates and/or defines.

By time T4, Alice will have received similar signatures from the other members. At that point she can simply keep that list of signatures along with the state they attest to, and she can discard the events she has stored prior to the first S1 event. QED The systems described herein describe a distributed database that achieves consensus quickly and securely. This can be a useful building block for many applications. For example, if the transactions describe a transfer of crypto currency from one crypto currency wallet to another, and if the state is simply a statement of the current amount in each wallet, then this system will constitute a crypto currency system that avoids the costly proof-of-work in existing systems. The automatic rule enforcement allows this to add features that are not common in current crypto currencies. For example, lost coins can be recovered, to avoid deflation, by enforcing a rule that if a wallet neither sends nor receives crypto currency for a certain period of time, then that wallet is deleted, and its value is distributed to the other, existing wallets, proportional to the amount they currently contain. In that way, the money supply would not grow or shrink, even if the private key for a wallet is lost.

Another example is a distributed game, which acts like a Massively Multiplayer Online (MMO) game being played on a server, yet achieves that without using a central server. The consensus can be achieved without any central server being in control.

Another example is a system for social media that is built on top of such a database. Because the transactions are digitally signed, and the members receive information about the other members, this provides security and convenience advantages over current systems. For example, an email system with strong anti-spam policies can be implemented, because emails could not have forged return addresses. Such a system could also become a unified social system, combining in a single, distributed database the functions currently done by email, tweets, texts, forums, wikis, and/or other social media.

Another example is a communication system to be used in disaster response, to coordinate various agencies such as police, fire, medical, military, national guard, and/or the Federal Emergency Management Agency (FEMA). A distributed database can be used to give members of each agency a common view on the situation, with each agency contributing information, and having access to the information from the other agencies. It would ensure that the various members have access to the same information, and that it is difficult for an accident or an attacker to prevent the network from operating as intended. A single database on a central server could be, for example, corrupted by an insider, or a single computer infected with malware. Such a single database on a central server could also be forced offline by a Distributed Denial of Service (DDoS) attack, where it is flooded with internet packets coming from compromised computers (e.g., from around the world). For another example, such a single database on a central server could also go offline because a communications wire or satellite station is damaged during the disaster. A distributed database, however, can be resilient to such problems. Furthermore, if the distributed database executes distributed code, enforcing rules, then the members can cooperatively ensure that no single, compromised member can flood the system with extra data to overwhelm the system and shut the system down from within. This example use case would be difficult to implement using a blockchain based on proof of work, because the emergency response agencies are unlikely to run the powerful computers needed for such an inefficient system. Such a use case would also not be as resilient if implemented using a consensus system based on leaders, such as Paxos or round-robin blockchain, because a DDoS against a single computer at a time could continuously shut down the current leader, and switch to attacking a new computer when the community switches to a new leader. Therefore, to remedy the issues with blockchain and lead-based consensus systems, a resilient distributed database can be implemented using a distributed consensus system such as the distributed database systems described herein.

Similarly, the distributed database systems described herein can be used to implement resilient communication and shared views of information for a military operation. In yet another example, the distributed database systems described herein can be used to implement a distributed database used for controlling Internet of Things objects, or supervisory control and data acquisition (SCADA) infrastructure, or the sensors and controls in a "smart city". Such systems can include features and/or requirements similar to the disaster management example implementation described above.

Other applications can include more sophisticated cryptographic functions, such as group digital signatures, in which the group as a whole cooperates to sign a contract or document. This, and other forms of multiparty computation, can be usefully implemented using such a distributed consensus system.

Another example is a public ledger system. Anyone can pay to store some information in the system, paying a small amount of crypto currency (or real-world currency) per byte per year to store information in the system. These funds can then be automatically distributed to members who store that data, and to members who repeatedly sync to work to achieve consensus. It can automatically transfer to members a small amount of the crypto currency for each time that they sync.

Another example is a secure messaging system that resists traffic analysis. In this example, the distributed database can contain and/or store encrypted messages between members. Each member has access to every message, but the messages are encrypted so that only the intended recipients can decrypt them. The community would know when a member sends a message, but would not know to whom the message was sent. Each member can try decrypting every message, and recognize those sent to them by the fact that the decrypted message is valid and has a correct checksum.

Alternatively, computational requirements in such a system can be reduced, for example, in the following manner. Each pair of members can initially negotiate two shared secret keys (one for each member in the pair), which they use to seed two different cryptographically secure random number generators (CSPRNGs) (one for each member in the pair). If Alice has created such a key with Bob, then she uses her CSPRNG to generate a new pseudorandom number each time she adds a message to the database intended for Bob, and she attaches that number to the encrypted message. Then Bob can quickly check the number attached to each message in the database to see if any of such numbers indicate messages intended for him. Because Bob knows the shared key, he therefore knows the sequence of numbers that Alice will generate, and so he knows what numbers to look for when scanning the messages for messages addressed to him from Alice. When he finds messages with such numbers attached, he knows they are messages from Alice to him, and he can decrypt them. Unrelated messages, such as from Carol to Dave, will have different numbers attached, and Bob will discard them without decrypting them. In some instantiations, Alice and Bob may renegotiate their shared keys periodically, and erase their old keys. This provides forward security, such that in the future, it will be difficult for a third-party to identify the messages sent between Alice and Bob, even if their keys are eventually compromised.

These examples show that the distributed consensus database is useful as a component of many applications. Because the database does not use a costly proof-of-work, possibly using a cheaper proof-of-stake instead, the database can run with a full node running on smaller computers or even mobile and embedded devices.

While described above as an event containing a hash of two prior events (one self hash and one foreign hash), in other embodiments, a member can sync with two other members to create and/or define an event containing hashes of three prior events (one self hash and two foreign hashes). In still other embodiments, any number of event hashes of prior events from any number of members can be included within an event. In some embodiments, different events can include different numbers of hashes of prior events. For example, a first event can include two event hashes and a second event can include three event hashes.

While events are described above as including hashes (or cryptographic hash values) of prior events, in other embodiments, an event can be created and/or defined to include a pointer, an identifier, and/or any other suitable reference to the prior events. For example, an event can be created and/or defined to include a serial number associated with and used to identify a prior event, thus linking the events. In some embodiments, such a serial number can include, for example, an identifier (e.g., media access control (MAC) address, Internet Protocol (IP) address, an assigned address, and/or the like) associated with the member that created and/or defined the event and an order of the event defined by that member. For example, a member that has an identifier of 10 and the event is the 15th event created and/or defined by that member can assign an identifier of 1015 to that event. In other embodiments, any other suitable format can be used to assign identifiers for events.

In other embodiments, events can contain full cryptographic hashes, but only portions of those hashes are transmitted during syncing. For example, if Alice sends Bob an event containing a hash H, and J is the first 3 bytes of H, and Alice determines that of the events and hashes she has stored, H is the only hash starting with J, then she can send J instead of H during the sync. If Bob then determines that he has another hash starting with J, he can then reply to Alice to request the full H. In that way, hashes can be compressed during transmission.

Figure 13:
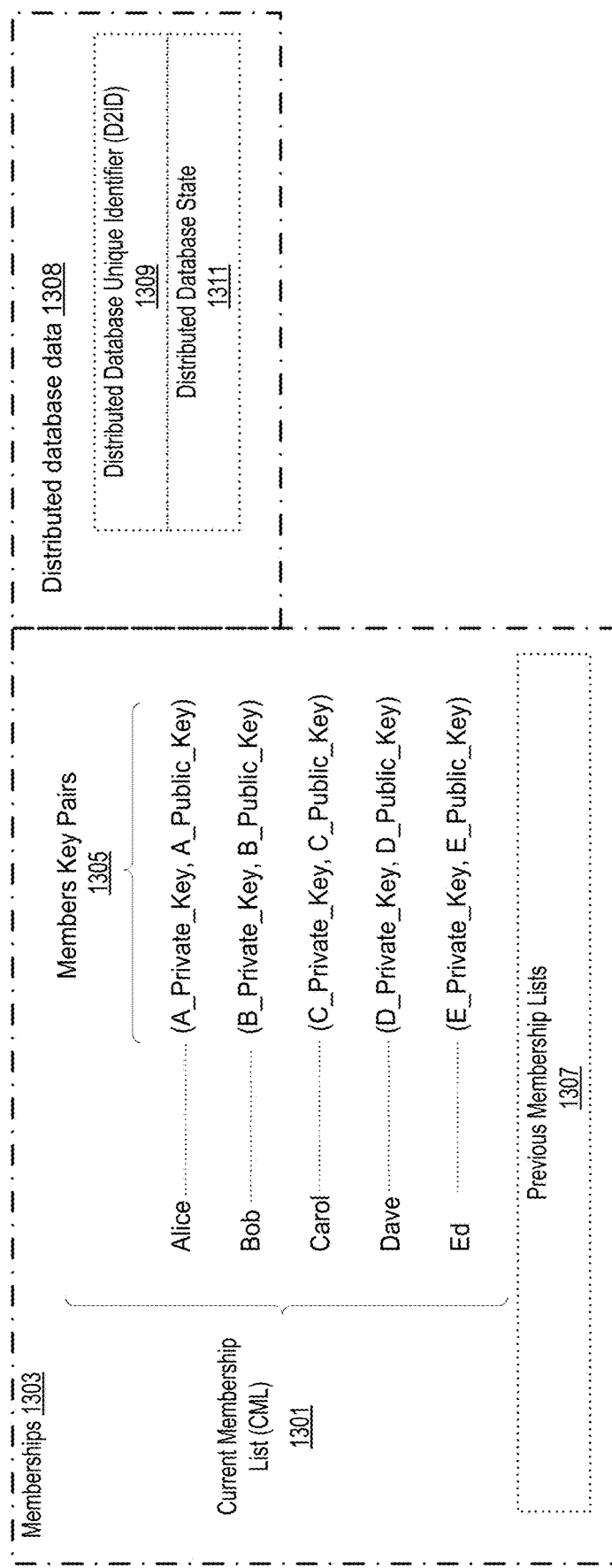
FIG. 13 is a representation of an initial state of a distributed database, according to an embodiment.

FIG. 13 is a representation of an initial state of a distributed database, according to an embodiment. In some implementations, a distributed database can be initialized by founder members, in this example Alice, Bob, Carol, Dave, and Ed. Each member defines a pair of member keys 1305. Each pair of member keys can include a unique private key and a unique public key associated with a member. For example, Alice has A_Private_Key and A_Public_Key, while Bob has B_Private_Key and B_Public_Key and so on for Carol, Dave, and Ed as shown in column 1305. Each public and private key pair includes two uniquely related cryptographic keys (e.g., large numbers). Below is an example of a public key:

3048 0241 00C9 18FA CF8D EB2D EFD5 FD37 89B9 E069 EA97 FC20 5E35 F577 EE31 C4FB C6E4 4811 7D86 BC8F BAFA 362F 922B F01B 2F40 C744 2654 C0DD 2881 D673 CA2B 4003 C266 E2CD CB02 0301 0001

The public key is made available to the other members in the distributed database via, for example, a publicly accessible repository or directory. The private key, however, remains confidential to its respective owner. Because the key pair is mathematically related, messages encrypted with a public key may only be decrypted by its private key counterpart and vice versa. For example, if Bob wants to send a message to Alice, and wants to ensure that only Alice is able to read the message, he can encrypt the message with Alice's Public Key. Only Alice has access to her private key and as a result is the only member with the capability of decrypting the encrypted data back into its original form. As only Alice has access to her private key, it is possible that only Alice can decrypt the encrypted message. Even if someone else gains access to the encrypted message, it will remain confidential as they should not have access to Alice's private key.

In some implementations, the pairs in column 1305 are used as parameters to compute Distributed Database Unique Identifier (D2ID) 1309. It is appreciated that D2ID 1309 is in general, difficult to replicate given the randomness of parameters provided by each of the founder members and public keys, thus advantageously providing the high security levels to a distributed database. Additionally, to increase randomness, each key pair for each member can be different for each distributed database in which that member participates. Moreover, such key pairs can be randomly generated by each member. Thus, even if the same members define a second database, the D2ID of the second distributed database will be different than the D2ID of the first distributed database.

Moreover, in some instances, a different nonce (e.g., a randomly generated identifier) can be paired with each member public key when calculating the D2ID for a database. The nonce can be randomly generated by and/or for each member. This can increase security by ensuring that even if the same members define a second database with the same public keys, the nonces will be different and thus, the D2ID of the second distributed database will be different.

In some implementations, memberships 1303 can be implemented as a data structure or other logically and/or physically implemented container in which multiple membership lists associated with states of the distributed database are recorded. In some instances, memberships 1303 includes, Current Membership List (CML) 1301 containing attributes of members associated with a current state of the distributed database. CML 1301 is configured to change upon operations executed by the distributed database, for example, adding or removing members from the database as discussed with reference to FIG. 14. At an initial state of a distributed database, CML 1301 includes attributes of the founding members of the distributed database, for example, membership key pairs 1305, and other suitable attributes associated with such founding members.

In some instances, CML members and their associated attributes change over time upon, for example, addition and/or removal of members to the distributed database. Thus, a first set of CML members can implement the distributed database during a first time period and a second set of CML members can implement the distributed database during a second time period. In such a case, before updating CML 1301, a copy of CML 1301 is stored in Previous Membership Lists (PML) 1307 and then, CML 1301 is updated. PML 1307 can be implemented as a data structure or other logically and/or physically implemented container. PML 1307 is configured to contain attributes of members associated with previous states of the distributed database.

A digital signature is generated for each founding member, and eventually for non-founding members added to the distributed database. Each member digitally signs D2ID using their private key. For example, Alice's digital signature is the result of Sign (A_Private_Key, D2ID) where A_Private_Key is Alice's private key and D2ID is the name or unique identifier of the distributed database. In other instances, Alice generates a pair with Alice's unique identifier and her signature e.g., (A_ID, Sign(A_ID, A_Private_Key, D2ID)) where the identifier A_ID can be her public key, name, digital certificate, or other suitable identifier.

In some implementations, digital signatures are used to send signed messages between members. Accordingly, a signed message can include the result of the function Sign (K, M), where K is a private key, for example, "A_Private_Key" associated with Alice, and M is a message (MSG). In some instances, a message "MSG" can be a function of hashed and concatenated data, for example, MSG=hash(x,y,z), where x, y, and z can be any type of data exchanged between members of a distributed database (e.g., events, distributed database states, operations, etc.). Thus members can send signed messages of the form (MSG, Sign(K, MSG) indicating that message MSG is signed by, for example, Alice, when K=A_Private_Key.

In some instances, Memberships 1303 and Distributed database data 1308 are two logically independent entities or data structures (e.g., different databases, different logically separated database portions (e.g., tables), different data structures within a single database, etc.). For example, Memberships 1303 includes current and previous members associated with D2ID 1309, while distributed database data 1308 includes data associated with a current state 1311 of the distributed database including any created and/or received events and transactions or operations included in such events. In other instances, Memberships 1303 and Distributed database data 1308 can be part of a single logical entity or data structure.

Other data structures associated with a distributed database state not shown in FIG. 13 can include, for example, identifiers produced based on and/or the results of operations performed on a distributed database, such as updates, addition of new members, removal of members, and other suitable data structures and/or operations performed on the distributed database over time. In some instances, such operations can provide a history of states and/or members of a distributed database. For example, an ADD operation can be used to add new members to a distributed database. This can produce a list of identifiers (e.g., private keys, public keys, and/or digital signatures) for new members joining the distributed database. For another example, a REMOVE operation can remove one or more current members from the distributed database. This can invalidate or remove a set of identifiers (e.g., private keys, public keys, and/or digital signatures) associated with members being removed from the distributed database As discussed above, a state of the distributed database can be defined after a consensus is achieved. For example, once all of the famous witnesses in round R are identified and/or known, it is possible to calculate the set S(R) of events that have a received round of R, and to calculate their consensus order and their consensus timestamps. Then the state STATE (R) can be calculated, which is the database state resulting from the transactions in the events that have a received round of R or earlier. At that point, the consensus order for the events in S(R) is known and will not change. Accordingly, at time $T_1$ an initial state of distributed database state 1311 can be STATE(R)="STATE1" after $T_1$ and before $T_2$. In some instances, this state can be signed hash value as discussed in further detail herein.

Each database operation can be initiated by a transaction in a given event generated at a compute device implementing the distributed database. Distributed database operations are associated with a received round number R. For instance, if a transaction in an event with a received round R=3 initiates a database operation (e.g., ADD, REMOVE or UPDATE), such a database operation is associated with the event's received round R=3. In some implementations, when an UPDATE operation is submitted in a transaction in an event with a received round=3, a new distributed database configuration is produced. In some instances, the new distributed database configuration incorporates members to the distributed database based on ADD operations initiated during received round R=3 and excludes members from the distributed database based on REMOVE operations initiated during received round R=3. In such an example, received round R=3 can be referred to as a received round number threshold. In such a case, consensus processes and transactions in events with a received round number less than or equal to R=3, are executed according to older or previous distributed database configurations or states. Furthermore, consensus processes and transactions in events with received rounds greater than R=3 are executed with the new distributed database configuration. For example, the concept of "strongly seeing" (as described above) can be the result of determining whether certain conditions are met by more than ⅔ of the population. Thus, it is necessary to count how many members are in the whole population at a given received round. If, for example, an ADD operation configured to add new member John to a distributed database is received by the distributed database at a received round R=3, John will not be considered by the distributed database when determining the size of the population, for determinations regarding strongly seeing and famous witnesses at created round R=3 or earlier. In such a case, a previous membership list (i.e., a membership list in a database configuration of an older or previous distributed database configuration) is used to calculate the round numbers of witnesses in created round R=3 and earlier consensus related votes and convergence. The new membership list is used to calculate created round numbers for events after the created round R=3 witnesses, and for related votes and convergence. While in the above example John will not be considered by the distributed database when determining the size of the population, his events can be used prior to received round R=3. For example, John's events can be part of a path between an event and an ancestor event that that event sees. Thus, while John and John's event itself cannot be used by a descendent event to reach the "strongly see" threshold (described above), the descendent event can still use events it can see based on a path through John's events to reach the "strongly see" threshold.

As discussed above, after a complete list of famous witnesses in created round R=3 is identified, an ADD operation initiated to add John to the distributed dataset with received round of R=3 takes effect upon an UPDATE operation. Accordingly, a new configuration for the distributed database is generated in which John is included as a member. ADD and REMOVE operations include or exclude one or more members of the population registered in a distributed database, which changes how many members in a member list (or the stake values) are used to determine whether one or more thresholds are met (e.g., a consensus threshold configured to be "more than ⅔ of the population"). This new threshold is used to recalculate the round numbers (i.e., round created) for events later than the witnesses in created round R=3 (e.g., the received round number threshold), and to calculate the fame of witnesses in created rounds R=4 and later. Accordingly, for example, a given event may have one "round created" while calculating the fame of created round R=3 witnesses, then have a different "round created" while calculating the fame of created round R=4 witnesses.

In some instances, ADD, REMOVE, and/or UPDATE operations can be validated by a threshold number of members' digital signatures (also referred to a signature threshold value). For example, an UPDATE operation is determined to be valid if more than ⅔ of the members that were part of the distributed database immediately prior to receiving the UPDATE operation sign the operation. Further details regarding the execution of distributed database operations are discussed with reference to FIG. 14.

While described herein as implementing a new configuration when an UPDATE operation is executed, in other instances a new configuration is implemented automatically (i.e., without an explicit UPDATE instruction). Specifically, after all the events with a specific received round R have been identified, a new configuration can be implemented based on such events to identify the events with received round R+1. Specifically, if an event determined to include a received round R includes an ADD or REMOVE instruction, the configuration of the distributed database can then automatically change to calculate received rounds greater than R (i.e., greater than the received round number threshold).

In some instances, database operations such as ADD and REMOVE change one or more voting thresholds used to reach consensus of a given state of the distributed database. For example, a distributed database has calculated the received rounds of 1 through 10 (i.e., all famous witnesses created at or before round 10 are known and votes are still being cast to determine whether some of the created round 11 witnesses are famous). An event X with a created round 5 for which the received round cannot yet be calculated can be generated. In such a case, event X will not have a received round of less than 11 since the famous witnesses having created rounds 10 and less have already been identified. If event X includes, for example, a transaction to ADD Frank to the current membership list of the distributed database, Frank would not be counted as a member during the casting of votes to determine famous witnesses associated with created round 11 and events defined by Frank would not count as witnesses that get to vote until a later created round when the fame of each witness in created round 11 can be identified. In such a case, all the events that have a received round of 11 can then be determined. If it is determined, for example, that event X has a received round of 11, Frank will be added to the current membership list.

Voting thresholds (e.g., M as described above) can be recalculated to include the additional member (i.e., Frank). Consequently, created rounds calculated for events later than round 11 (rounds greater than a received round number threshold) can be recalculated using the new thresholds that include Frank. In some instances, such a recalculation process may change which events are determined to be, for example, created round 12 witnesses and/or witnesses associated with later created rounds. Thereafter, votes can be cast to determine which created round 12 witnesses are famous.

Accordingly, the current membership list would not change again until all created round 12 famous witnesses are identified. At this point, it can be determined which events have received round of 12 (which can be a second received round number threshold). Some of these events can ADD or REMOVE members from the current membership list and accordingly, may trigger similar changes to other later events as discussed in this example.

In some instances, members of a distributed database determine a "signed state" of a distributed database at a given point in time (or at a given received round). A "state" or "current state" includes information resulting from the execution of a sequence of consensus transactions in their consensus order (i.e., sorted according to the consensus order of the event containing each transaction, and sub-sorted by the order the transactions are included in each event). After a member calculates a consensus order for the events associated with received rounds up to R, such a member can digitally sign the state or current state (or digitally sign a hash value associated with the state or current state) resulting from the transactions in consensus order (e.g., using a private key). Optionally or alternatively, members can sign the state for only a subset of the received rounds. For example, members can be assigned to sign a state associated with a received round number R, when R is divisible by a given integer number (e.g., for every 5th round) or according to a time threshold (e.g., every 1 second) designated to each member of the distributed database.

In some implementations, a "signed state" for a received round R includes one or more of the following items: 1) a received round number R; 2) a sequence number and hash value for the last event generated by each member that was part of the consensus affecting the signed state (i.e., an event with a received round of R or earlier); 3) a data structure, reflecting the effect of transactions in consensus order for received rounds up to and including R; 4) a set of digital signatures (or other indication of agreement) on earlier states with signatures by more than ⅔ of the membership list (in some instances, a different threshold can be used, such as, for example, more than ½); and/or 5) a "membership history". In some implementations, some of those elements may be missing (e.g., number 4). In some implementations, for example, the "state" may include a hash of all of the above other than the membership history and a separate hash of the membership history. In such an implementation, the members can digitally sign (e.g., with a private key) the pair of hashes to yield the "signed state".

In some implementations, when a first member signs a state, a transaction with the digital signature, the hash of the state and the received round number is generated. Such a transaction is configured to be included in the next event created and/or defined by the first member. The first member can then save and/or post the event to the distributed database. Then other members, different from the first member recognize and record the first member digital signature. When a second member receives a number of digital signatures from other members including the digital signature of the first member and other members associated with a given state, greater than a threshold, the second member can identify this as a consensus signed state. The second member can determine if the number of digital signatures reaches a signature threshold value (e.g., if the given state is supported by digital signatures of more than ⅔ of the members within the distributed database) or otherwise receive an indication of agreement from other members of the distributed database. After the number of digital signatures reaches the signature threshold value, that state becomes a "signed state". Once a member has a signed state, they can discard any events that contributed to that signed state, and discard any previous signed states. Thus, memory allocations dedicated to store such events and previous signed state can be released, reducing the amount of storage used by the hashgraph. In some implementations, the old events are not discarded immediately, but only after a certain number of additional received rounds become part of the consensus and/or after a predetermined time period.

In some instances, events can be defined using the following criteria: 1) an "event" has a sequence number that is one more than the sequence number of its self-parent (or 0 if there was no self-parent) (as described above); 2) an "event" contains the "round created" for each parent (accordingly, it doesn't just contain the hash of each parent, it also contains the round created copied from that parent); and 3) an event has a "parent round", which is the greatest of the round created of each parent (accordingly, the event's "round created" is equal to that event's parent round plus either 0 or 1).

In some instances, a global constant "age threshold" referred as "A" for the purpose of this example, is used to determine whether or not an event will be considered in a consensus process. For example, given an A=4 if an event has a parent round of R and the event's received round is later than R+A, then: 1) the event will not be part of the consensus order; 2) the event's transactions will be ignored and will not affect the consensus state; 3) the event can be discarded by any member who knows it won't be received in round R+A or earlier; and 4) the event will not prevent "seeing" in round R+A or later, even if it is part of a fork. For example, if Alice receives event X during a synchronization process after Alice has already calculated the famous witnesses for rounds up to at least round R+A, without event X being received in any of those rounds, then Alice can discard event X. In some instances, event X would not be discarded by Alice if that would cause the set of known events by a given creator to have non-contiguous sequence numbers as discussed in further detail below with reference to FIG. 16.

Figure 14:
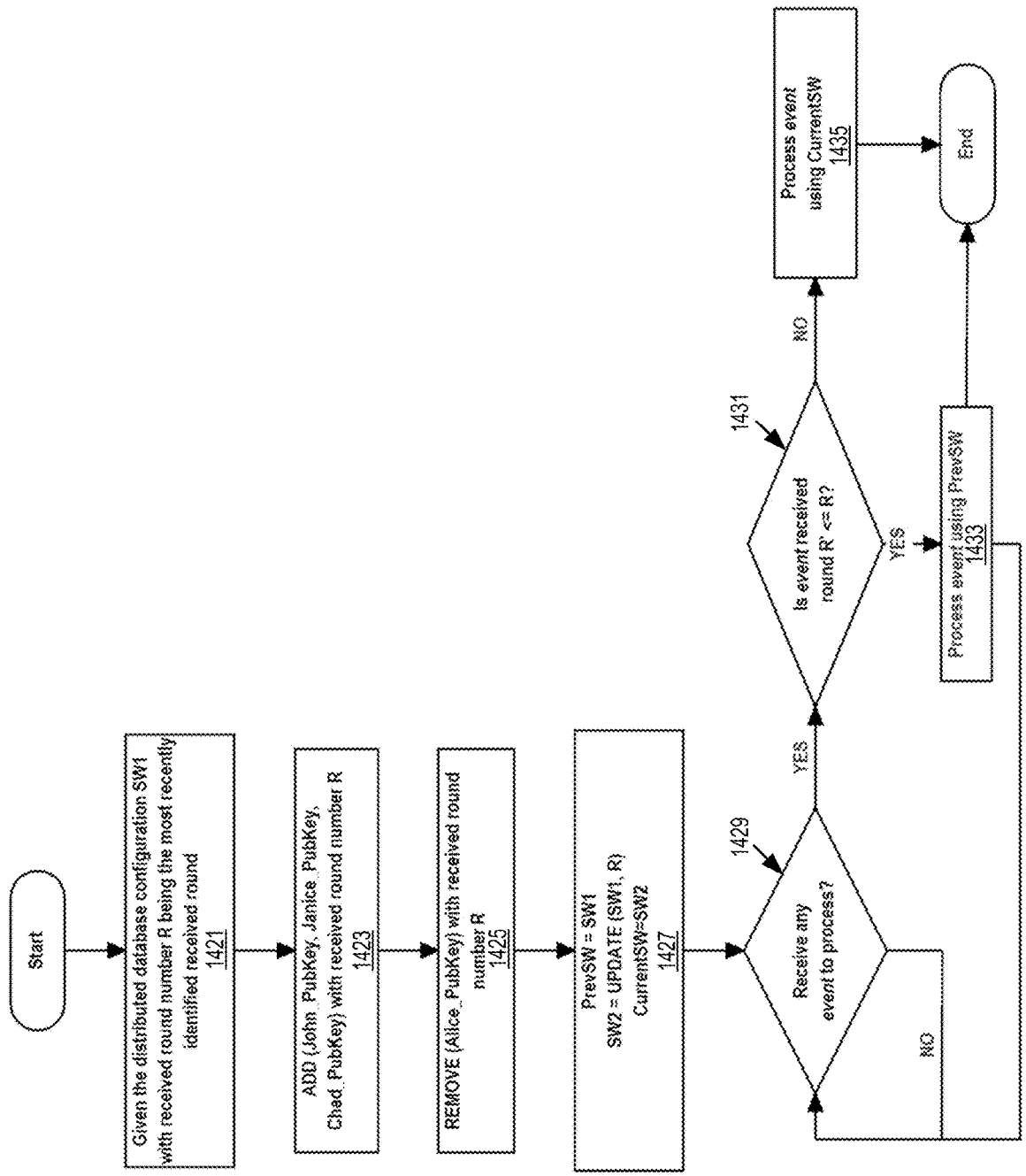
FIG. 14 is a flow chart that illustrates examples of operations associated with update, addition, removal of members to a distributed database, according to an embodiment.

While FIG. 13 illustrates an initial state of a distributed database, FIG. 14 is a flow chart illustrating examples of the UPDATE, ADD and REMOVE operations performed in a distributed database after the initial state is defined, according to an embodiment. In some instances, after a distributed database has been initialized as shown in FIG. 13, one or more operations can be performed in the distributed database to change the members included in the distributed database. For example, given the distributed database D2ID with STATE(R)="SW1" (where SW1 is the current configuration of the distributed database associated with an initial hashgraph of distributed database D2ID) with received round number R being the most recently calculated and/or identified received round, at 1421, John, Janice, and Chad are configured to be added as members of the distributed database at 1423, through an initiated ADD function. The configuration SW1 includes a configuration of the event consensus protocol (or consensus order) discussed above that does not include John, Janice, and Chad at the time to determine order of events and/or convergence. In some instances, the ADD function at 1423 can take John, Janice, and Chad public keys as parameters. At this point, each of the new members also has an associated private key. Members (e.g., Alice) can also be removed from a distributed database as shown at 1425; in this case, a REMOVE operation is initiated with Alice's public key as a parameter.

In some instances, ADD and REMOVE operations can be received at a member (compute device) that implements the distributed database as transactions within a set of events. ADD and REMOVE operations are associated with their received round number such that, it can be determined when an ADD operation and/or REMOVE operation was caused by a transaction in an event with a specified received round number.

During an UPDATE operation associated with a received round R, for example, UPDATE operation at 1427, the current distributed database configuration SW1 (which includes Alice and does not include John, Janice, and Chad) is saved in the variable PrevSW and members of the distributed database associated with PrevSW configuration can be stored in a previous membership list associated with received round number R. In some alternative implementations PrevSW can be an array of objects containing multiple previous distributed database configurations. A new distributed database configuration SW2 can be generated based on the execution of an UPDATE operation at received round R, that is STATE(R)="SW2". Thus, the variable CurrentSW is updated to contain the new distributed database configuration SW2 (that uses the new configuration for the event consensus protocol).

The configuration SW2 includes John, Janice and Chad, but would not include Alice and thus, Alice will not be included in determination of consensus orders or convergence when the distributed database uses configuration SW2. Differently stated, the updated distributed database configuration SW2 reflects changes to the current member list configured to reflect the modified distributed database configuration (e.g., the addition of new members John, Janice, and Chad and removal of Alice). In some instances, an updated set of members' key pairs including new key pairs for John, Janice, and Chad, and excluding Alice are included in the current distributed database configuration CurrentSW. In some instances, the distributed database state at this time can also include operations performed over the distributed database up until the time of the update, including ADD operations, REMOVE operations, UPDATE operations, and/or other suitable operations.

In some instances, when members of the current membership list of a distributed database have changed through, for example, ADD, REMOVE, UPDATE, and/or other suitable operations, events can be processed according to different configurations of the distributed database. In the example shown at FIG. 14 when an event is received, at 1429, a received round R' associated with such event is identified and/or calculated. If, for example, the event received round R' is identified to be less than or equal to the received round in which the distributed database is operating, R, as shown at 1431, such an event is processed with, for example, a previous membership list associated with a previous configuration version of the distributed database (e.g., a membership list stored in previous membership lists 1307 discussed with reference to FIG. 13). Differently stated, the event, at 1433, will be processed for consensus or convergence using, for example, the distributed database configuration SW1 with membership list including Alice, Bob, Carol, Dave, and Ed, and not including John, Janice, and Chad (as described above). In the opposite scenario, at 1435, when the event received round number will be greater than the received round number in which the configuration changed (e.g., all of the famous witnesses having such created rounds and less have already been identified, and the event is still not seen by enough of them to be received yet), such an event is processed with the updated version of the distributed database. That is, the distributed database configuration SW2 with the current membership list including Bob, Carol, Dave, Ed, John, Janice, and Chad excluding Alice. Accordingly, in some instances, the order of events can be determined based on more than one configuration of the distributed database (or configuration of the event consensus protocol) and thus new states of the instance of the distributed database. As discussed above, a hash value can be calculated for a state of the distributed database and signed using private keys of members of the distributed database. A member, for example a member that has signed the state of the distributed database can send a signal to post into the instance of the distributed database an event including a transaction indicating a new signed state.

In some instances, a member of the distributed database can save and/or post to the distributed database an UPDATE, ADD, and/or REMOVE operation as a transaction (or set of transactions) included in one or more events. This event can then be sent to another member of the distributed database (e.g., as part of synchronization process). For example, a first member can receive an operation to ADD a new member to the distributed database in a transaction included in an event sent by a second member of the distributed database as part of a synchronization process. For another example, the first member can receive an operation to REMOVE a member from the distributed database in a transaction included in an event sent by a third member as part of a synchronization process. Differently stated, each member of the distributed database can define events with transactions including any of the UPDATE, ADD, and/or REMOVE operations and send such events to other members of the distributed database as part of a synchronization process.

The process illustrated in FIG. 14 can be repeated and updated for the events in each new received round. Thus, as the received round is identified for each event, the configuration of the distributed database (or the configuration of the event consensus protocol) can be updated. Moreover, while described above with respect to two configurations, a subsequent configuration of the distributed database with STATE(R)="SW3" (and additional future configurations) can be defined in an analogous way as described with respect to SW2. Thus, in some instances the distributed database can operate using a third distributed database configuration (e.g., that uses a third configuration for the event consensus protocol). Thus, the distributed database can continue to define and/or operate with new configurations as new events with such transactions are posted to the distributed database.

While described above as updating the configuration of the distributed database (or the configuration of the event consensus protocol) based on adding and/or removing members from the distributed database, in some instances, the configuration can be updated based on changes in stake value associated with and/or logically related to members, based on new software used to determine consensus and/or new rules to determine consensus. For example, as transactions are performed, the stake value of each member may change. In implementations of the distributed database that determine consensus based on stake value, this can affect the consensus protocol (e.g., determination of famous witnesses). Thus, depending on the received round (used as a received round number threshold) for events that change the stake value of one or more members, the order of the events in different rounds will be determined based on different configurations, similar to the process in FIG. 14. For another example, updates to the software and/or updates to the rules to determine consensus can be effective and/or used based on the received round (used as a received round number threshold) for the event that included such an update (similar to the process in FIG. 14).

Figure 15:
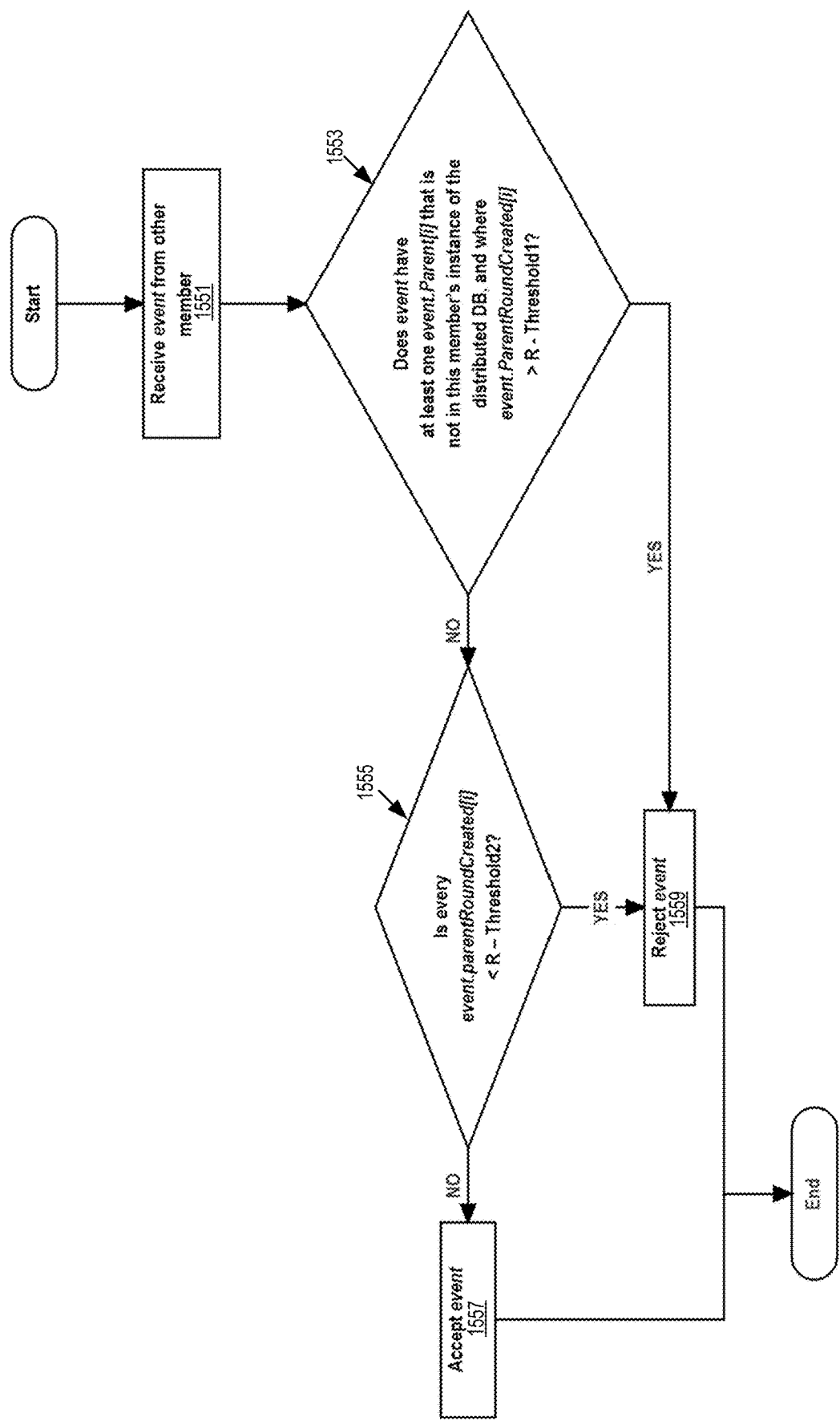
FIG. 15 is a flow chart that illustrates acceptance and rejection of events based on received rounds, according to an embodiment.
Figure 16:
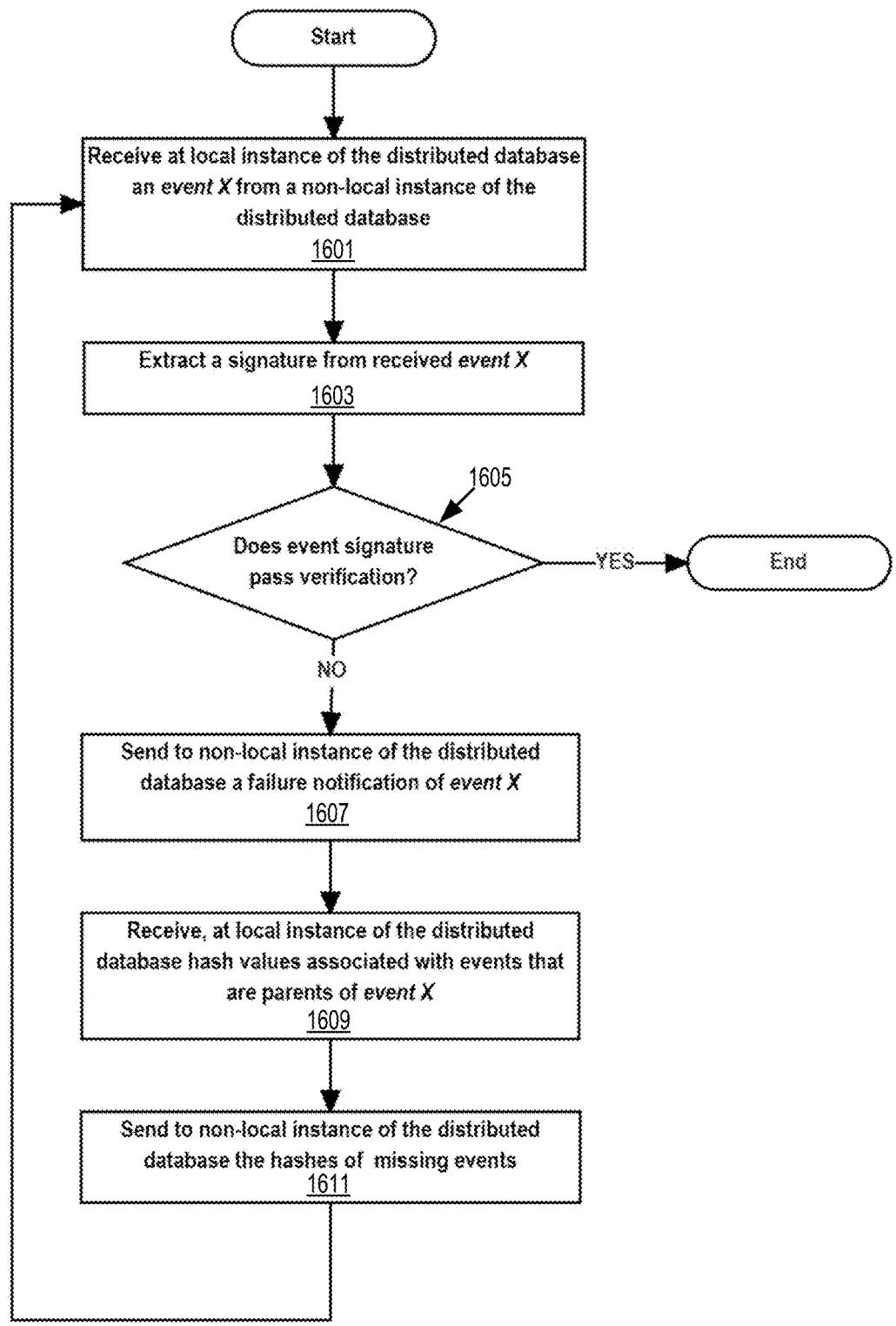
FIG. 16 is a flow chart that illustrates a synchronization process between two members of a distributed database, according to an embodiment.

The processes illustrated in FIGS. 15 and 16 can be executed during synchronization of events between two members of a distributed database. FIG. 15 is a flow chart that illustrates acceptance and rejection of events based on received rounds. In some instances, for example, during synchronization of distributed databases associated with different members, an event can be rejected or accepted based on (1) the most recent round number R in which all the famous witnesses have been identified and/or decided, (2) each of the parents event.Parent[i] that the event lists as its parent, and (3) each corresponding event.ParentRoundCreated[i] that the event lists as the created round of that parent. Note that the actual parent may have a different round created than the round created listed for that parent in the received child event. This is because the round created of an event can change as members are added and removed, so it is possible that the parent had one round received when the child was created, and a different one at a later time. The members are assigned the task of being as accurate as possible in assigning the ParentRoundCreated numbers.

Computational load and memory resources can be advantageously reduced in some instances. For example, when a first member (e.g., a first compute device) receives an event at their local instance of the distributed database from a second member (e.g., a second compute device) of the distributed database, at 1551. Such an event can include a sequence of bytes that indicate a set of parent events. Each parent event from the set of parent events can be logically related with a hash value and a round created value. To determine whether a first criterion is satisfied, the first member determines, at 1553, whether (1) at least one parent of the received event (as indicated in the received event) is absent from the instance of the distributed database of the first member and (2) the parent of the received event has a listed round created in the received event that is greater than R minus a predetermined threshold value (e.g., Threshold1). In some instances, when an event meets these conditions (i.e., satisfies the first criterion), the first member rejects or excludes the event, at 1559. For example, when an event has a parent that has a listed round created that is R minus Threshold1) or less (i.e., less or equal than a first round created threshold R-Threshold1), that parent can be assumed to have been discarded already (e.g., is old enough to have been discarded), so the received event can potentially be accepted despite the missing parent (depending on step 1555 described below). But if there is a missing parent that is not old enough to have been discarded, then the event can be rejected, at 1559, because its parent is missing. In some implementations, when the event does not meet the conditions at 1553, the event is evaluated with respect to a second criterion, at 1555, to determine whether each parent of the event has a listed round created before R minus a predetermined threshold value (e.g., less than a second round created threshold R-Threshold2). If so (i.e., if a second criterion is satisfied), then the event is rejected or excluded, at 1559, otherwise it is accepted, at 1557. This decision allows events to be discarded when it becomes clear they will not be used (e.g., to determine consensus and/or to impact the state of the distributed database). For example, if all the listed parents are very old, then the received event will itself be considered old enough to discard, so it can be discarded as soon as it is received. In these examples, received events are accepted if all of the parents are present except for very old events (based on Threshold1), and the event itself is not very old (based on Threshold2). The first member (or first compute device) can store in the instance of the distributed database the events accepted at 1557 (i.e., the events that were not rejected or excluded at 1559). In some implementations, Threshold1 and/or Threshold2 can be predefined by the members of the distributed database. In some implementations, Threshold1 can have the same value or a different value as Threshold2.

FIG. 16 is a flow chart that illustrates a verification process executed during event synchronization between two members of a distributed database. A first member or first compute device can send a synchronization request to other member of the distributed database to start a synchronization process. In some implementations, the synchronization between a first member and a second member of a distributed database is performed as described below. For example, if the first member is Bob and the second member is Alice then synchronization can be executed based on the first and last sequence numbers and/or values Alice has received for each member in a given configuration of the distributed database. Such sequence numbers and/or values can be sent within a synchronization request between members and the members can exchange events not already received and/or stored by the other member. Thus, in some instances events already received and/or stored are not exchanged, reducing the bandwidth used during a synchronization process.

From Alice's perspective, she can use the first and last sequence numbers she has for events created and/or defined by Bob, Carol, Ed, and Dave. Thus, for example, Alice can determine based on events received at her instance of the distributed database (e.g., events created and/or defined by Ed's instance of the distributed database), that the events defined by Ed having a greater sequence number than the last sequence number for an event received at Alice's instance of the distributed database for Ed are events that Alice has not received yet. Bob can then send those events to Alice. Similarly, Alice can determine, based on events received at Alice's instance of the distributed database for a given member, for example Ed, that any event stored by Bob for that member having a sequence number less than the first sequence number for that member stored at Alice's instance of the distributed database are events that Alice's instance of the distributed database has rejected or discarded (e.g., based on a signed state as described above).

In some implementations Alice (or any other member) does not discard or reject events whose sequence number is between the first and last sequence number of events stored at Alice's instance of the distributed database for a given member (e.g., Ed). In other instances, during synchronization, Alice's instance of the distributed database may discard old events that are either part of a signed state, or events that will not have a received round number within a range defined by one or more thresholds, as discussed with reference to FIG. 15.

During synchronization, a local instance of a distributed database associated with a first member (e.g., Alice) can reject an event from Bob if such an event includes a hash value of parent events that Alice has not yet received at her local instance of the distributed database. In some instances, however, the local instance of the distributed database associated with Alice can accept such an event even if the event parents are not included in the local instance of the distributed database associated with Alice if, for example, there is an indication that Alice would have discarded the parents of the received event. Examples of events that the local instance of the database associated with Alice would generally discard include events having parents associated with a received round number that are sufficiently old, such that, Alice can determine that the event can be discarded because the event would have no effect on the state of the distributed database, and/or its effect is already incorporated into the latest signed state in the local instance of the distributed database associated with Alice.

In some instances, a first member (e.g., Alice) receives, at 1601, at her local instance of the distributed database an event X from a non-local instance of the distributed database, for example non-local instance associated with Bob. Thereafter, a set of signatures can be extracted from event X, at 1603. At 1605, a signature verification process is executed to determine whether or not the set of signatures extracted from event X pass a verification process. In some instances, event X fails to pass the verification process when, based on the extracted signature from event X (received by Alice), Alice can determine that event X has, for example, a parent event Y, with a given creator (e.g., Ed) and a given sequence number (e.g., SN=3) and the local instance of the distributed database associated with Alice includes event Z, with parent event Y, the same creator (i.e., Ed), and the same sequence number (i.e., SN=3). Accordingly, a verification process fails when there is an anomaly in the distributed database that may be caused by an instance of a distributed database defining forking events.

At 1607, when Alice determines that event X failed signature verification at 1605, the local instance of the distributed database of Alice sends a failure notification message to the non-local instance of the distributed database of Bob indicating that event X failed the verification process. Thereafter, at 1609, the local instance of the distributed database receives hash values associated with events that are parents of event X. The local instance of the distributed database can then compare the received hash values associated with events that are parents of event X and determine, whether or not the non-local instance of the distributed database is missing one or more events, for example events that are parents of event X. Accordingly, at 1611, the local instance of the distributed database sends to the non-local instance of the distributed database hashes of events that are missing in the non-local instance of the distributed database. The process flow continues in a loop starting at 1601.

In some instances, when an event received by the local instance of the distributed database (e.g., Alice) passes the verification process at 1605, Alice can determine whether during the synchronization process (e.g., synchronization of events between two members) a forking issue was identified. When a forking issue is identified the local instance of the distributed database (e.g., Alice) sends to the non-local instance of the distributed database (e.g., Bob) an indicator (e.g., hash value) of one or more events that are ancestors (e.g., parents) of event X that were determined to be included in and/or affected by the identified forking issue and then the process ends. In some instances, when no forking issues are identified during the synchronization process, for example, when event X received at 1601 passes the signature verification process at 1605, the process ends.

In some instances, event X and event Y are "forks" with each other if they have the same creator, and the same round created, and neither is an ancestor of the other. This is a variation of the use of "forking" issue discussed above with reference to FIG. 9 with the additional constraint specifying that forking events X and Y have a same received round. Moreover, in some instances, the definition of "see" and "strongly see" as described above, can be modified based on this alternative definition of "forking". For example, event X can "see" event Y if and only if, event Y is an ancestor of event X and no event Z is an ancestor of event X and a "fork" of event Y. Event X can "strongly see" event Y if and only if, there exists a set S of events created by more than M (e.g., ⅔) of the distributed database members, such that, event X can see every event in S, and every event in S can see event Y.

Forking causes extra computation and bandwidth usage and thus members can be penalized when it is determined the members have created and/or defined forking events. Accordingly, when a member is determined to have caused forking events, the distributed database can be configured to penalize such a member. In some instances, a member discovering a fork can create a transaction documenting such a fork, which then acts as a transaction for a REMOVE operation to temporarily or permanently remove the member responsible for creating the forking of events from the distributed database. For example, a member can be temporarily penalized by nullifying his/her vote and/or forking events for a round corresponding to the round where such a member created the forking events.

In some implementations, a global limit of the number of bytes per synchronization process and/or a number of events permitted to be synchronized per synchronization process are implemented in the distributed database. For example, when Alice sends Bob the events missed by Bob, the instance of the database associated with Alice can stop sending data packets and/or events when the next event exceeds either an allowable number of bytes or an allowable number of permitted events to be synchronized. Transmission of events in such cases can be performed by sending the parent of an event before sending the event if both events are being synchronized.

In some instances, when two events, for example, event X and event Y, being synchronized are not related (i.e., neither is a direct descendent of the other), and if sending event X would mean that a global limit of the number bytes (Bx) associated with the first member is reached during a current synchronization process for events created by the creator of event X (and similarly global limit for bytes associated with second member (By) by event Y's creator), then the synchronization process includes sending event X before event Y if Bx<By, and sending event Y before event X if By<Bx, and can send them in either order if Bx=By. This prevents large events from controlling the synchronization process.

In some instances, a first member and a second member start a synchronization process by sharing their list of first/last sequence numbers for each member. It may be that they discover that the first member had events that she later discarded, but the second member still needs those events. In such a case, a modified version of the synchronization process is executed, in which the first member sends the latest signed state stored in the instance of the distributed database associated with the first member to the instance of the database associated with the second member. Thereafter, the first member sends the events stored in the instance of the database associated with the first member registered after the latest signed state except for events the second member already has in the instance of the database associated with the second member. Accordingly, the second member can sleep or turn-off his local instance of the database for a long period time (i.e., go offline) and after waking up or turning on, the execution of the modified version of the synchronization process allows the second member to participate in the distribute database. Stated differently, in some instances, the second member can only receive a signed state, and all the events since that signed state from the first member to continue to participate. This reduces the number of events that would be exchanged without a signed state.

While the example systems shown and described above are described with reference to other systems, in other embodiments any combination of the example systems and their associated functionalities can be implemented to create and/or define a distributed database. For example, Example System 1, Example System 2, and Example System 3 can be combined to create and/or define a distributed database. For another example, in some embodiments, Example System 10 can be implemented with Example System 1 but without Example System 9. For yet another example, Example System 7 can be combined and implemented with Example System 6. In still other embodiments, any other suitable combinations of the example systems can be implemented.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a memory associated with an instance of a distributed database at a first compute device configured to be included within a plurality of compute devices that implement the distributed database via a network operatively coupled to the plurality of compute devices,
a processor operatively coupled to the memory,
the processor configured to:
receive an event from a second compute device from the plurality of compute devices, the event being a sequence of bytes associated with a set of parent events, each parent event from the set of parent events associated with (1) a hash value and (2) a round created value,
exclude the received event from a determination of an order of events when at least one of a first criterion or a second criterion is satisfied, the first criterion is satisfied when:
(1) at least one parent event from the set of parent events does not have an identifier in the instance of the distributed database, and
(2) the at least one parent event is associated with a round created value that is greater than a first round created threshold, and
the second criterion is satisfied when:
(1) the first criterion is not satisfied, and
(2) each parent event from the set of parent events is associated with a round created value that is less than a second round created threshold, and
store the event in the instance of the distributed database when the event is not excluded based on the first criterion or the second criterion.

2. The apparatus of claim 1, wherein the first round created threshold is based on a current received round number identified by the instance of the distributed database.

3. The apparatus of claim 1, wherein the second round created threshold is based on a current received round number identified by the instance of the distributed database.

4. The apparatus of claim 1, wherein the first round created threshold corresponds to the second round created threshold.

5. The apparatus of claim 1, wherein the first round created threshold is different from the second round created threshold.

6. The apparatus of claim 1, wherein the received event includes a set of transactions, the received event is excluded from the determination of the order of events at a first time, and the set of transactions are executed at a second time prior to the first time.

7. A method, comprising:
receiving, at a first compute device from a plurality of compute devices that implements a distributed database via a network, an event from a second compute device from the plurality of compute devices, the event including an identifier of each parent event from a set of parent events of the event, each parent event from the set of parent events having an attribute value;
rejecting the event when at least one of a first criterion or a second criterion is satisfied, the first criterion is satisfied when:
(1) the identifier for at least one parent event from the set of parent events is not in an instance of the distributed database at the first compute device, and
(2) the attribute value for the at least one parent event is greater than a first attribute threshold, and
the second criterion is satisfied when:
(1) the first criterion is not satisfied, and
(2) the attribute value for each parent event from the set of parent events is less than a second attribute threshold, and
storing the event in the instance of the distributed database when the event is not rejected based on the first criterion or the second criterion.

8. The method of claim 7, wherein the event includes the attribute value for each parent event from the set of parent events.

9. The method of claim 7, wherein the event includes the attribute value for each parent event from the set of parent events, the attribute value being a round created of each parent event from the set of parent events, the first attribute threshold being a first round created threshold and the second attribute threshold being a second round created threshold.

10. The method of claim 7, wherein the identifier of each parent event from the set of parent events is a hash value associated with that parent event from the set of parent events.

11. The method of claim 7, further comprising:
calculating, using a consensus protocol, a consensus order of a plurality of events based at least in part on the event and the identifier of each parent event from the set of parent events when the event is not rejected based on the first criterion or the second criterion.

12. The method of claim 7, further comprising:
defining a directed acyclic graph (DAG) based at least in part on the event and the identifier of each parent event from the set of parent events when the event is not rejected based on the first criterion or the second criterion; and
calculating a consensus order of a plurality of events based on the DAG.

13. The method of claim 7, wherein the first attribute threshold corresponds to the second attribute threshold.

14. The method of claim 7, wherein the first attribute threshold is different from the second attribute threshold.

15. A non-transitory processor-readable medium storing code representing instructions to be executed by a processor, the code comprising code to cause the processor to:
receive, at a first compute device from a plurality of compute devices that implements a distributed database via a network, an event from a second compute device from the plurality of compute devices, the event including an identifier of each parent event from a set of parent events of the event and an attribute value for each parent event from the set of parent events;
exclude the event from a determination of an order of events when at least one of a first criterion or a second criterion is satisfied, the first criterion is satisfied when:
(1) the identifier for at least one parent event from the set of parent events is not in an instance of the distributed database at the first compute device, and
(2) the attribute value for the at least one parent event is greater than a first attribute threshold;
the second criterion is satisfied when:
(1) the identifier for at least one parent event from the set of parent events is in the instance of the distributed database at the first compute device or the attribute value for the at least one parent event is not greater than the first attribute threshold, and (2) the attribute value for each parent event from the set of parent events is less than a second attribute threshold; and store the event in the instance of the distributed database when the event is not excluded.

16. The non-transitory processor-readable medium of claim 15, wherein the attribute value for each parent event from the set of parent events is a round created value for that parent event.

17. The non-transitory processor-readable medium of claim 15, wherein the identifier of each parent event from the set of parent events is a hash value associated with that parent event from the set of parent events.

18. The non-transitory processor-readable medium of claim 15, wherein the set of parent events includes a plurality of parent events.

19. The non-transitory processor-readable medium of claim 15, further comprising code to cause the processor to:

define a directed acyclic graph (DAG) based at least in part on the event and the identifier of each parent event from the set of parent events when the event is not excluded; and calculate a consensus order of a plurality of events based on the DAG.

20. The non-transitory processor-readable medium of claim 15, further comprising code to cause the processor to:

calculate, when the event is not excluded and using a consensus protocol, a consensus order of a plurality of events based at least in part on the event and the identifier of each parent event from the set of parent events.

* * * * *